US012123232B2

(12) United States Patent
Raz

(10) Patent No.: US 12,123,232 B2
(45) Date of Patent: Oct. 22, 2024

(54) PANEL LOCK ASSEMBLY

(71) Applicant: Dan Raz Ltd., Tirat Carmel (IL)

(72) Inventor: Amir Raz, Haifa (IL)

(73) Assignee: DAN RAZ LTD., Tirat Carmel (IL)

( * ) Notice: Subject to any disclaimer, the term of this patent is extended or adjusted under 35 U.S.C. 154(b) by 582 days.

(21) Appl. No.: 17/278,310

(22) PCT Filed: Sep. 23, 2019

(86) PCT No.: PCT/IB2019/058054
§ 371 (c)(1),
(2) Date: Mar. 21, 2021

(87) PCT Pub. No.: WO2020/058965
PCT Pub. Date: Mar. 26, 2020

(65) Prior Publication Data

US 2021/0332621 A1 Oct. 28, 2021

Related U.S. Application Data

(60) Provisional application No. 62/735,124, filed on Sep. 23, 2018, provisional application No. 62/735,125, (Continued)

(51) Int. Cl.
*E05C 19/00* (2006.01)
*E05B 17/00* (2006.01)
(Continued)

(52) U.S. Cl.
CPC ........ *E05C 19/002* (2013.01); *E05B 17/0025* (2013.01); *E05B 63/0052* (2013.01);
(Continued)

(58) Field of Classification Search
CPC ...... E05C 19/002; E05C 19/026; E05C 3/124; E05B 17/0025; E05B 63/0052; E05B 2047/0094
See application file for complete search history.

(56) References Cited

U.S. PATENT DOCUMENTS 313,742 A 3/1885 Kintner
317,268 A 5/1885 Wright
(Continued)

FOREIGN PATENT DOCUMENTS

AU 641561 B2 5/1992
AU 627346 B2 8/1992
(Continued)

*Primary Examiner* — Christine M Mills
*Assistant Examiner* — Yahya Sidky
(74) *Attorney, Agent, or Firm* — Rivka Friedman

(57) ABSTRACT

An apparatus for locking a panel to a strike jamb includes a synchronous displacement mechanism associated with a locking element (108) which is responsive to part of a closing motion of a panel (104) from an open position towards a closed position to initiate a motion of locking element (108) towards the locked position during the closing motion of the panel prior to the panel reaching its closed position. The synchronous displacement mechanism preferably has a "deadlock state" when the locking element is in the locked position which prevents displacement of the locking element towards the unlocked position.

24 Claims, 68 Drawing Sheets

Related U.S. Application Data filed on Sep. 23, 2018, provisional application No. 62/792,417, filed on Jan. 15, 2019.

(51) Int. Cl.

| | |
|---|---|
| ***E05B 47/00*** | (2006.01) |
| ***E05B 63/00*** | (2006.01) |
| ***E05C 3/12*** | (2006.01) |
| ***E05C 19/02*** | (2006.01) |

(52) U.S. Cl.

CPC ............ *E05C 3/124* (2013.01); *E05C 19/026* (2013.01); *E05B 2047/0094* (2013.01)

(56) References Cited

U.S. PATENT DOCUMENTS

| | | | |
|---|---|---|---|
| 435,658 | A | 9/1890 | Brennaman |
| 1,231,069 | A | 6/1917 | Schaffert |
| 1,609,342 | A | 12/1926 | Winters |
| 2,561,201 | A | 7/1951 | Hogg |
| 2,572,717 | A | 10/1951 | Gwersten |
| 2,579,675 | A | 12/1951 | Kaplan |
| 2,579,875 | A | 12/1951 | Stanko |
| 2,779,618 | A | 1/1957 | Jewell |
| 2,812,204 | A | 11/1957 | Squire |
| 2,834,066 | A | 5/1958 | Lybarger |
| 2,978,757 | A | 4/1961 | Ammerman |
| 3,019,493 | A | 6/1961 | Walenga |
| 3,002,592 | A | 10/1961 | Quinn |
| 3,019,193 | A | 1/1962 | Spray |
| 3,065,986 | A | 11/1962 | Barker et al. |
| 3,159,093 | A | 12/1964 | Rosenfeld |
| 3,222,098 | A | 12/1965 | Hausfeld |
| 3,841,516 | A | 10/1974 | Marz |
| 3,872,696 | A | 3/1975 | Geringer |
| 3,877,262 | A | 4/1975 | Williams |
| 3,959,927 | A | 6/1976 | Good |
| 4,004,629 | A | 1/1977 | Kelly |
| 4,045,065 | A | 8/1977 | Johnson |
| 4,062,576 | A | 12/1977 | Jennings et al. |
| 4,106,239 | A | 8/1978 | Bancroft et al. |
| 4,110,867 | A | 9/1978 | Gwozdz |
| 4,126,965 | A | 11/1978 | Tivadar |
| 4,133,142 | A | 1/1979 | Dzus, Jr. |
| 4,180,287 | A | 12/1979 | Youngblood et al. |
| 4,203,255 | A | 5/1980 | Naslund et al. |
| 4,216,986 | A | 8/1980 | McNinch et al. |
| 4,230,351 | A | 10/1980 | Bisbing |
| 4,300,795 | A | 11/1981 | Jennings |
| 4,367,610 | A | 1/1983 | Goode |
| 4,441,277 | A | 4/1984 | Naylor |
| 4,428,153 | A | 12/1984 | Klinger |
| 4,534,587 | A | 8/1985 | Fleming |
| 4,610,472 | A | 9/1986 | Billingsley |
| 4,765,662 | A | 8/1988 | Suska |
| 4,831,779 | A | 5/1989 | Kehrli et al. |
| 5,172,520 | A | 12/1992 | Hostetler |
| 5,224,297 | A | 7/1993 | Watkins |
| 5,326,141 | A | 7/1994 | Gorman |
| 5,349,782 | A | 9/1994 | Yulkowski |
| 5,409,272 | A | 1/1995 | McCormack |
| 5,403,047 | A | 4/1995 | Walls |
| 5,465,460 | A | 11/1995 | Cantone |
| 5,615,919 | A | 4/1997 | Ivey |
| 5,901,501 | A | 5/1999 | Fountaine |
| 5,927,773 | A | 7/1999 | Larsen |
| 5,931,415 | A | 8/1999 | Lingard et al. |
| 6,185,871 | B1 | 2/2001 | Wang |
| 6,286,274 | B1 | 9/2001 | McKann |
| 7,578,531 | B1 | 8/2009 | Leontaridis |
| 7,707,776 | B2 | 5/2010 | Weissofner et al. |
| 8,038,184 | B2 | 10/2011 | Grigis |
| 8,534,000 | B1 | 9/2013 | Fadlon |
| 8,627,606 | B2 | 1/2014 | Salerno |
| 8,680,360 | B2 | 3/2014 | Greener et al. |
| 8,813,427 | B2 | 8/2014 | Meeks |
| 9,702,168 | B2 | 7/2017 | Jadallah et al. |
| 2002/0046501 | A1 | 4/2002 | Webb |
| 2002/0163208 | A1 | 11/2002 | Quigley |
| 2005/0001436 | A1 | 1/2005 | Ramsauer |
| 2006/0021400 | A1 | 2/2006 | Jackson |
| 2007/0290456 | A1 | 12/2007 | Speyer |
| 2009/0178344 | A1 | 7/2009 | Salerno et al. |
| 2013/0000205 | A1 | 1/2013 | Raz et al. |
| 2017/0152676 | A1* | 6/2017 | Raz ......................... E05B 65/06 |
| 2017/0254125 | A1* | 9/2017 | Raz ..................... E05B 65/1046 |

FOREIGN PATENT DOCUMENTS

| | | | |
|---|---|---|---|
| CA | 1029063 | A | 4/1978 |
| DE | 929592 | C | 6/1955 |
| DE | 2628036 | A1 | 1/1977 |
| DE | 3447796 | A1 | 7/1986 |
| DE | 8900012 | U1 | 3/1989 |
| DE | 29517077 | U1 | 2/1997 |
| DE | 19745180 | A1 | 4/1999 |
| DE | 19944050 | A1 | 3/2001 |
| DE | 10117173 | A1 | 10/2002 |
| DE | 10329560 | A1 | 2/2004 |
| DE | 10322788 | A1 | 12/2004 |
| DE | 10322798 | A1 | 12/2004 |
| DE | 102004054981 | A1 | 8/2007 |
| EP | 0067065 | B1 | 1/1987 |
| EP | 1422368 | A1 | 5/2004 |
| EP | 1574657 | A3 | 9/2005 |
| EP | 1832508 | B1 | 1/2009 |
| FR | 2631068 | B1 | 12/1994 |
| FR | 2891295 | B1 | 2/2009 |
| GB | 1399058 | A | 6/1975 |
| GB | 2233701 | A | 1/1991 |
| GB | 2250772 | A | 6/1992 |
| JP | S60-135460 | U | 9/1985 |
| JP | 05245768 | A | 1/1993 |
| JP | 06299970 | A | 10/1994 |
| WO | 2013018496 | A1 | 3/2015 |

* cited by examiner

FIG. 5A(2)
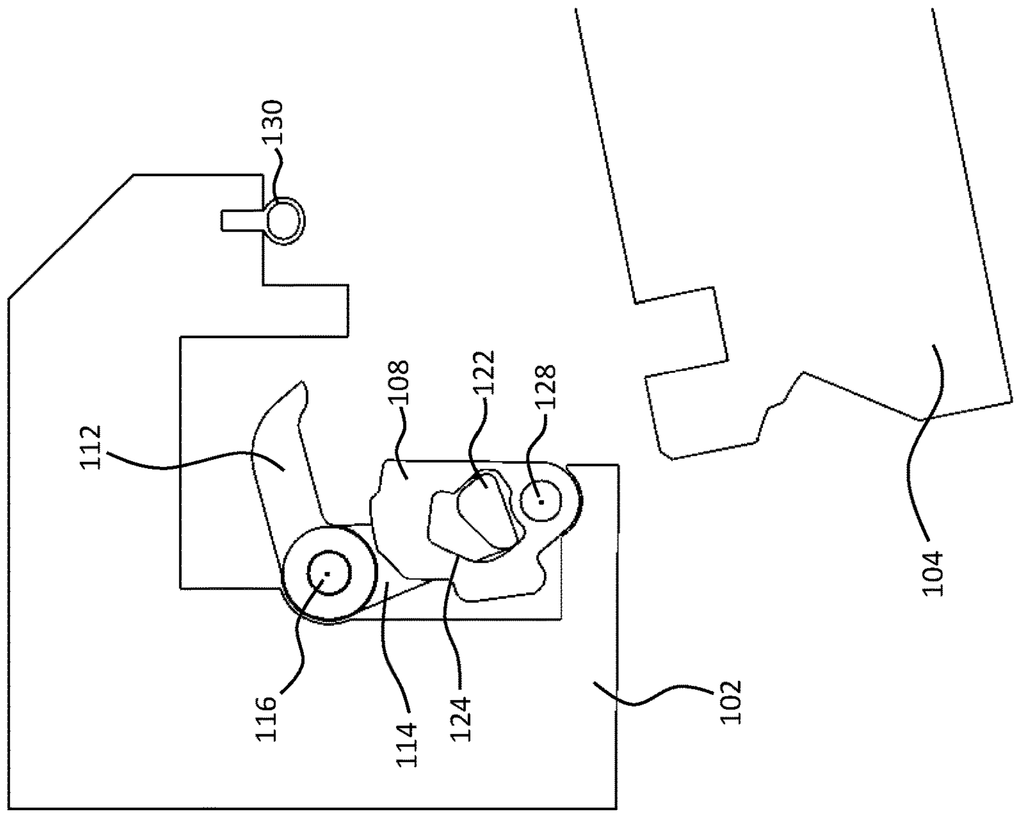
FIG. 5A(1)
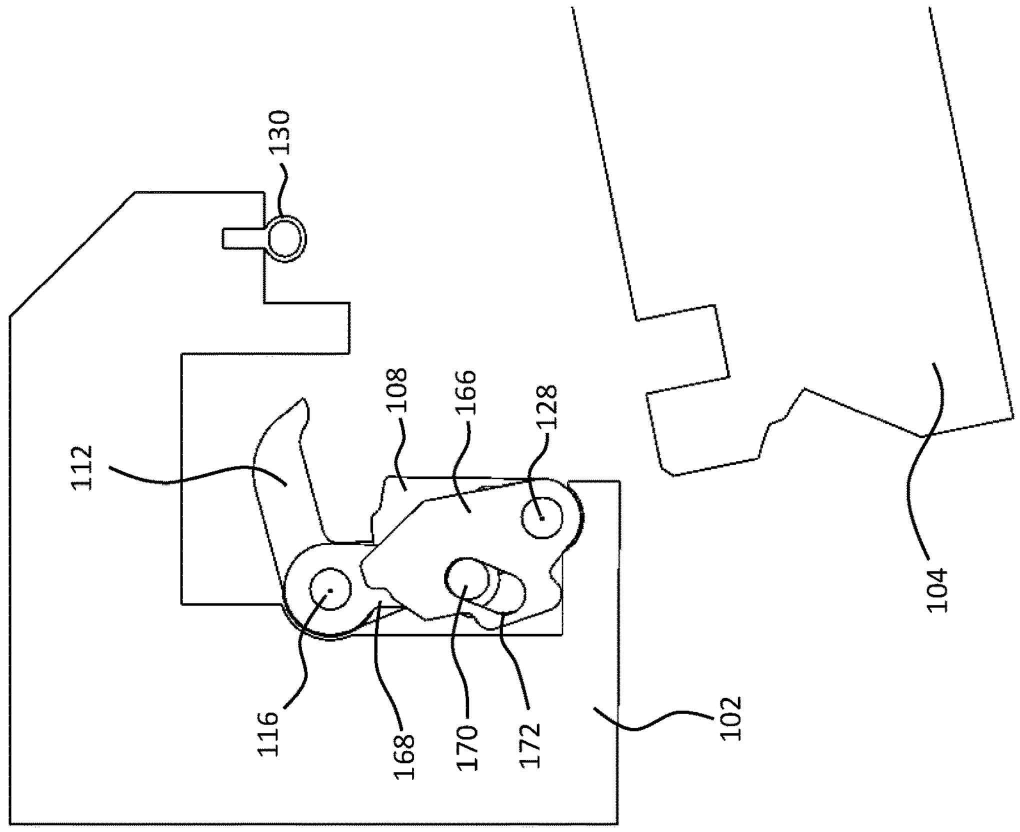

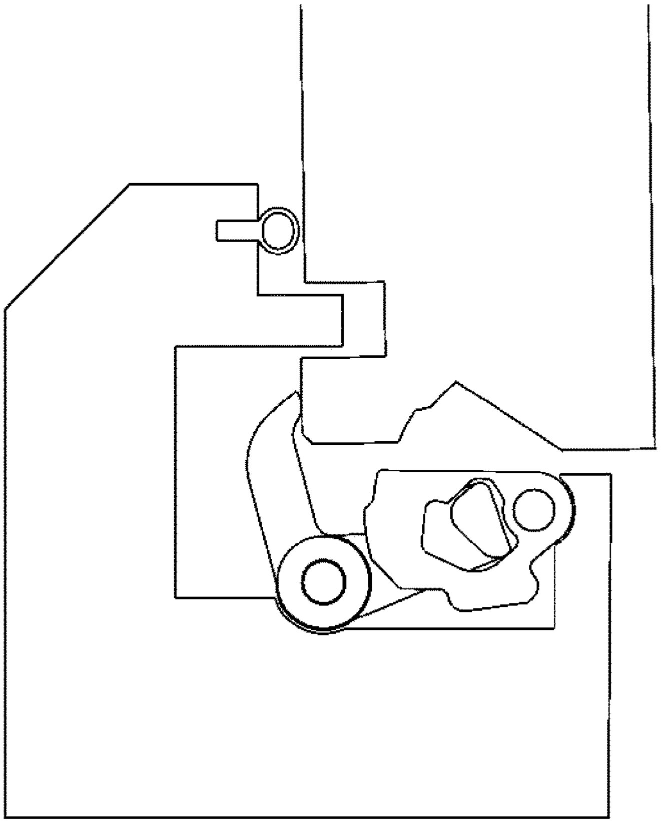
FIG. 5B(2)
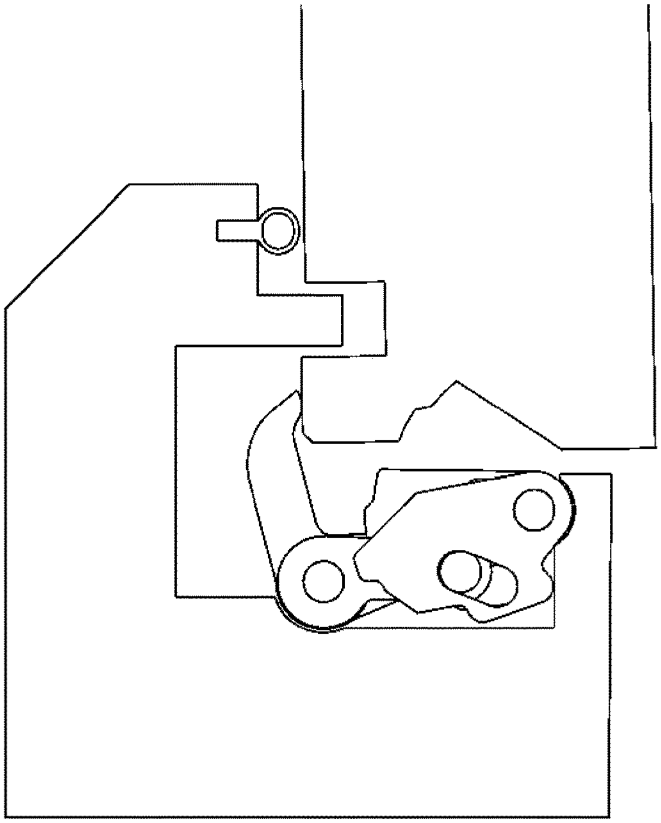
FIG. 5B(1)

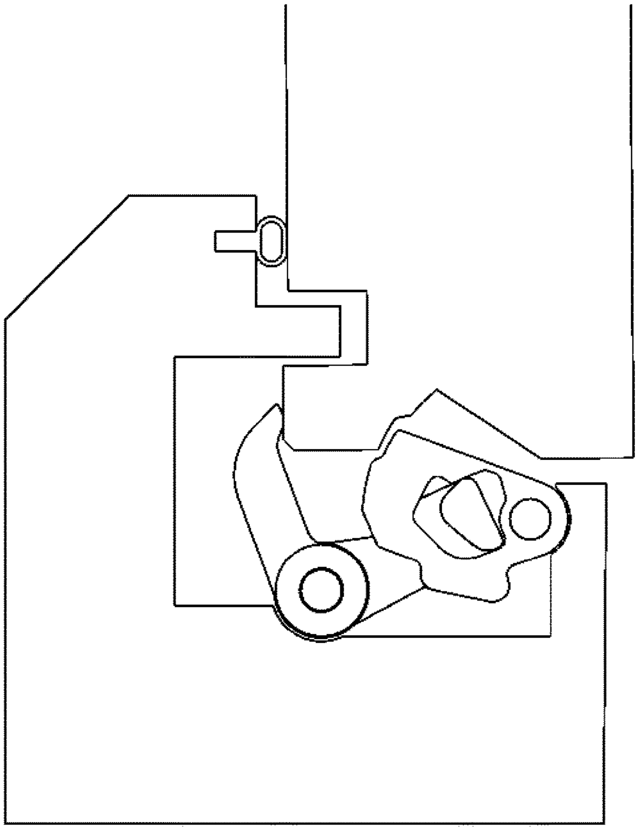
FIG. 5C(2)
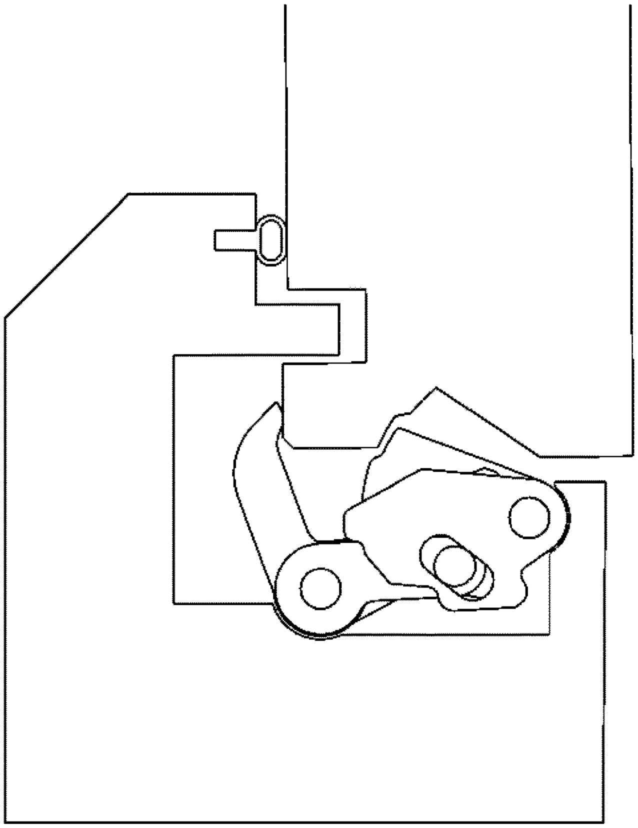
FIG. 5C(1)

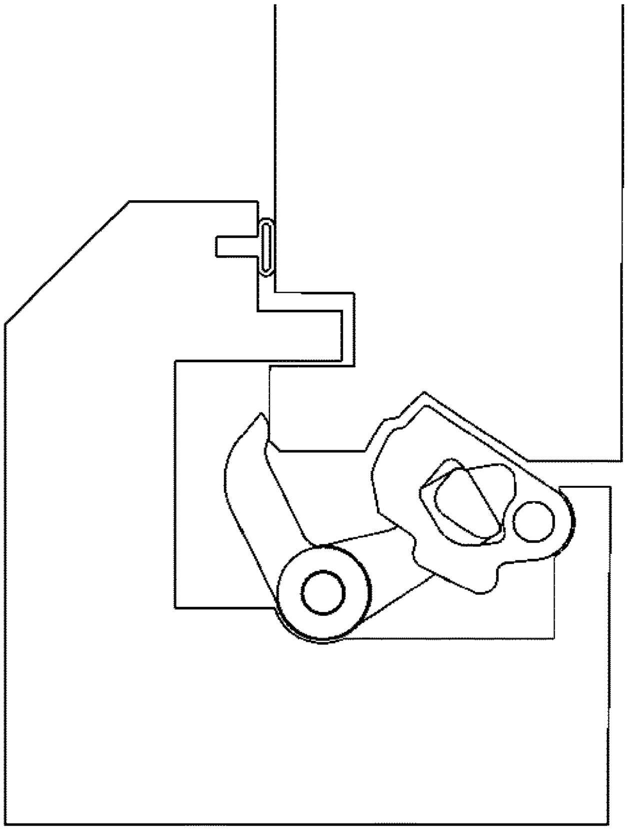
FIG. 5D(2)
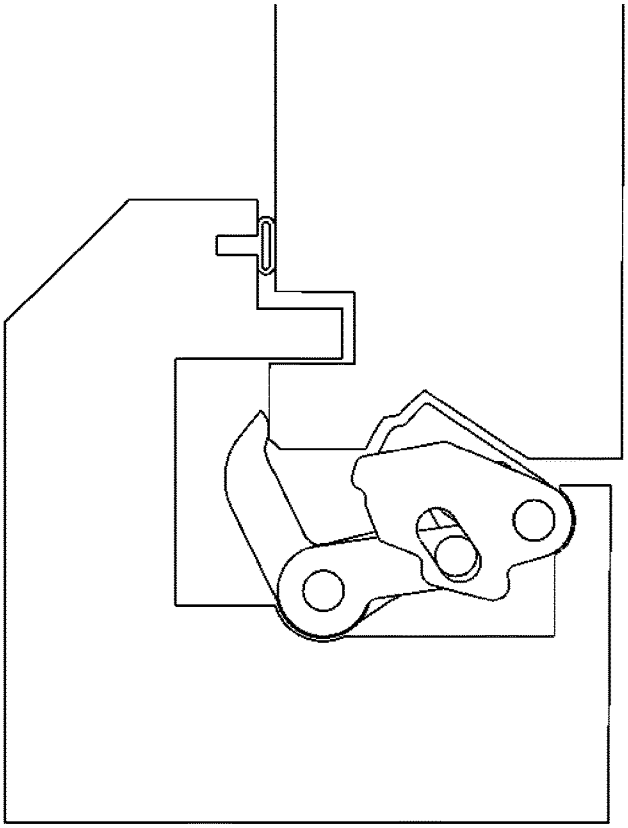
FIG. 5D(1)

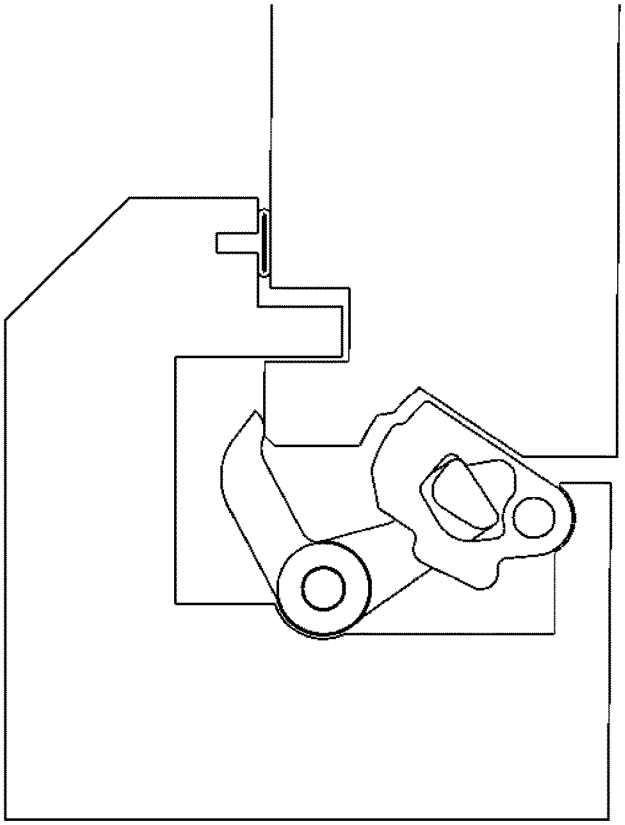
FIG. 5E(2)
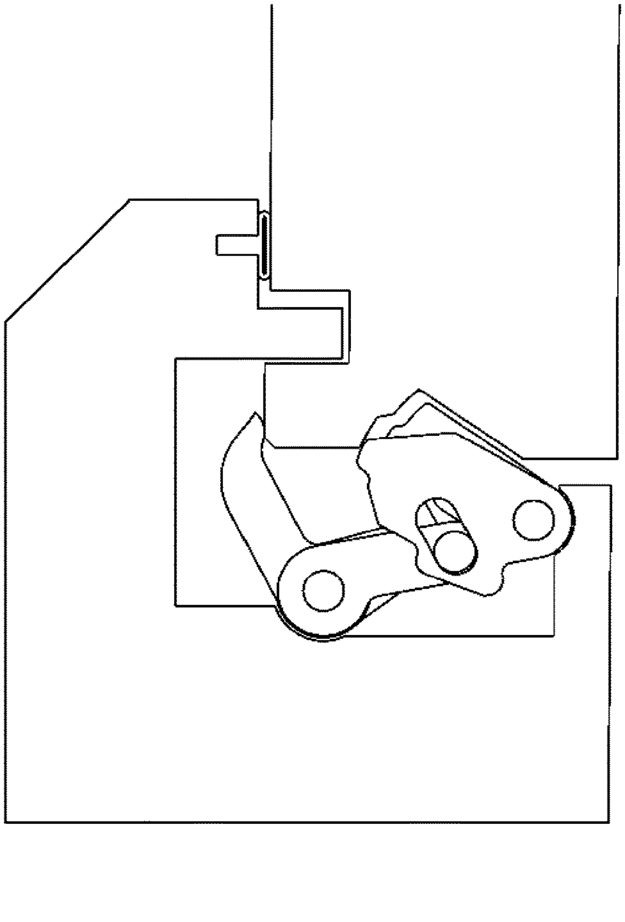
FIG. 5E(1)

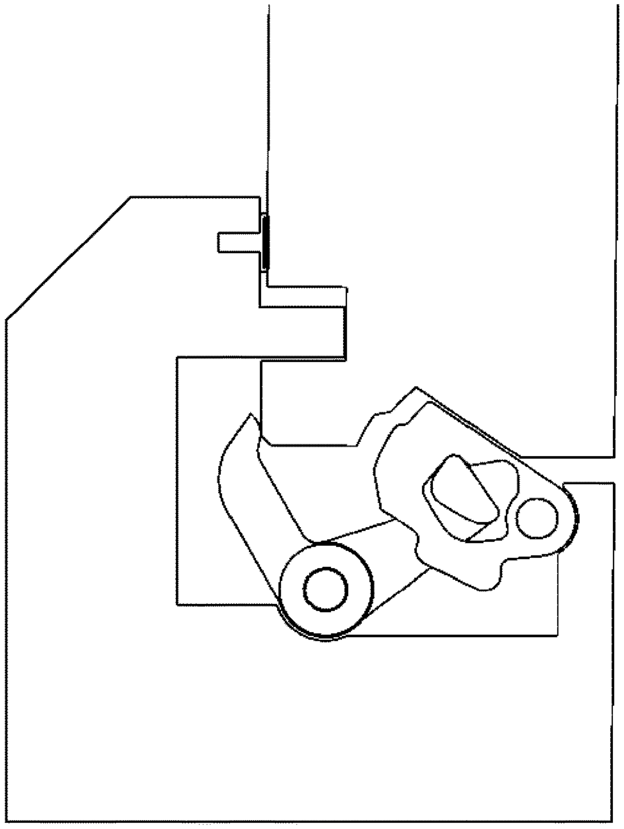
FIG. 5F(2)
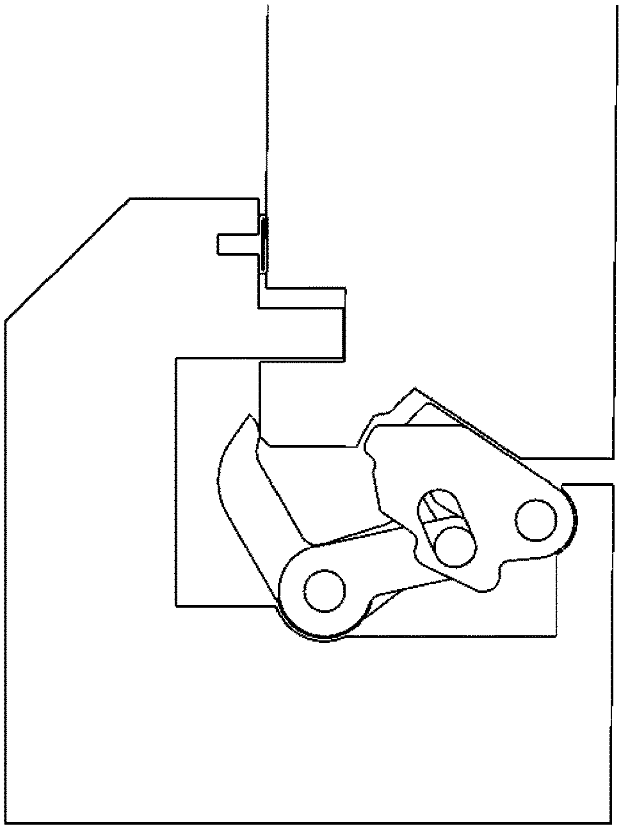
FIG. 5F(1)

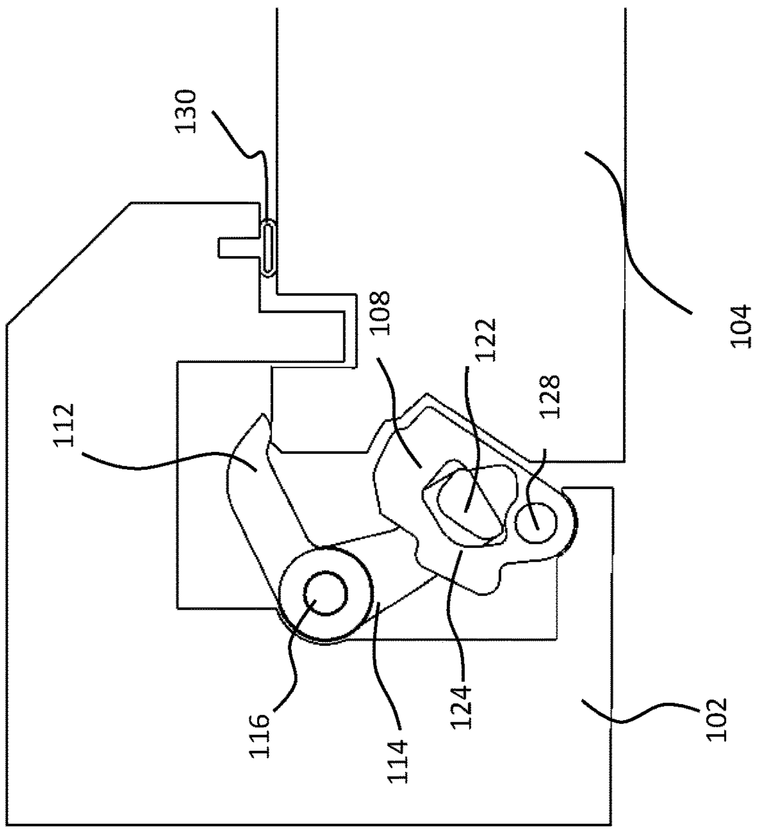
FIG. 6A(2)
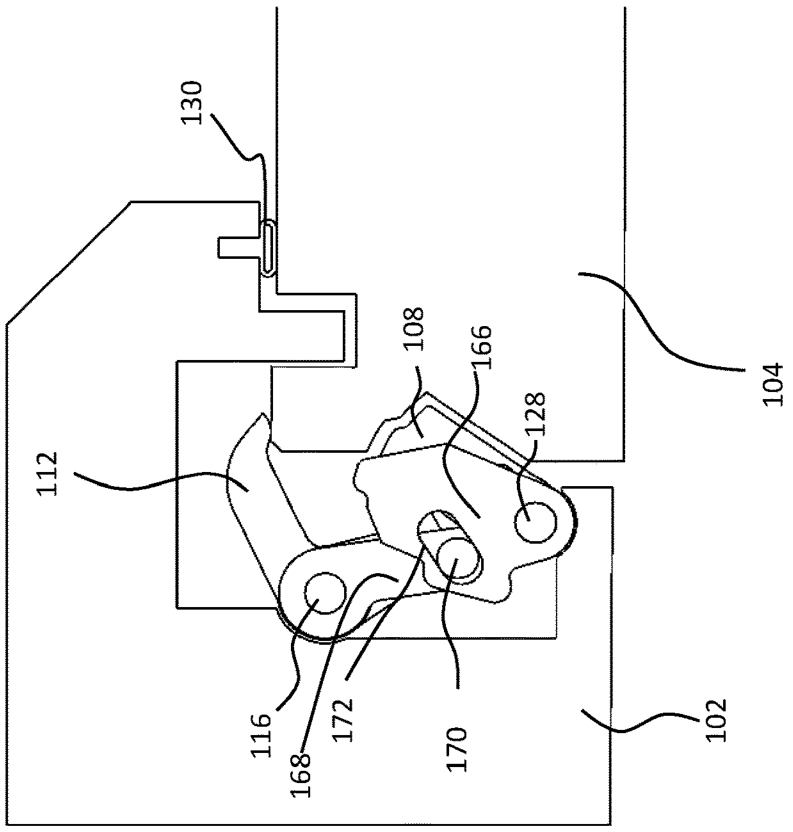
FIG. 6A(1)

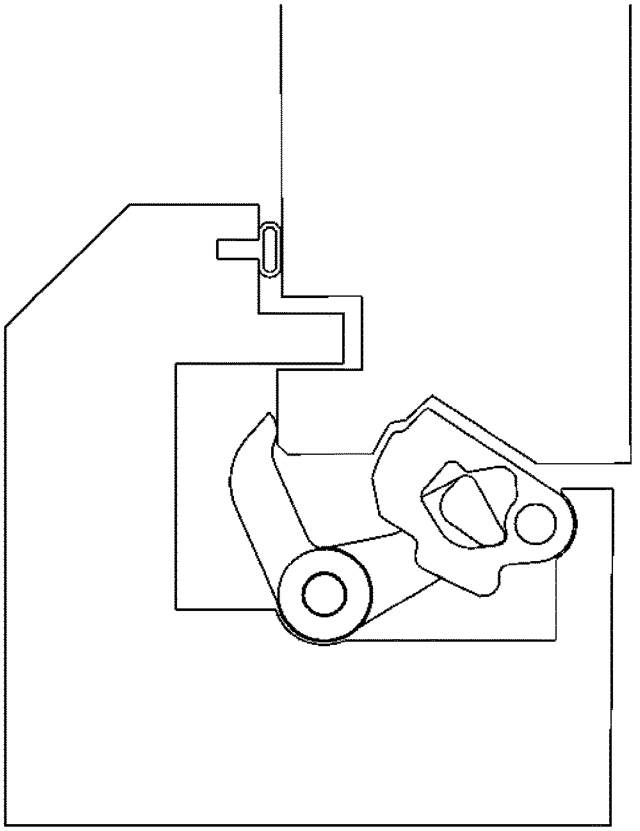
FIG. 6B(2)
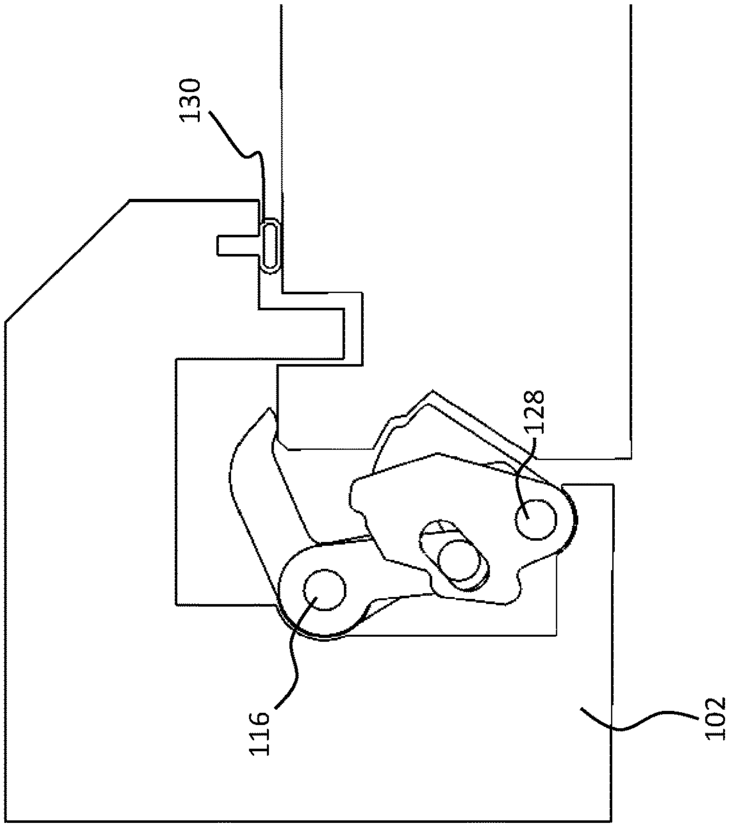
FIG. 6B(1)

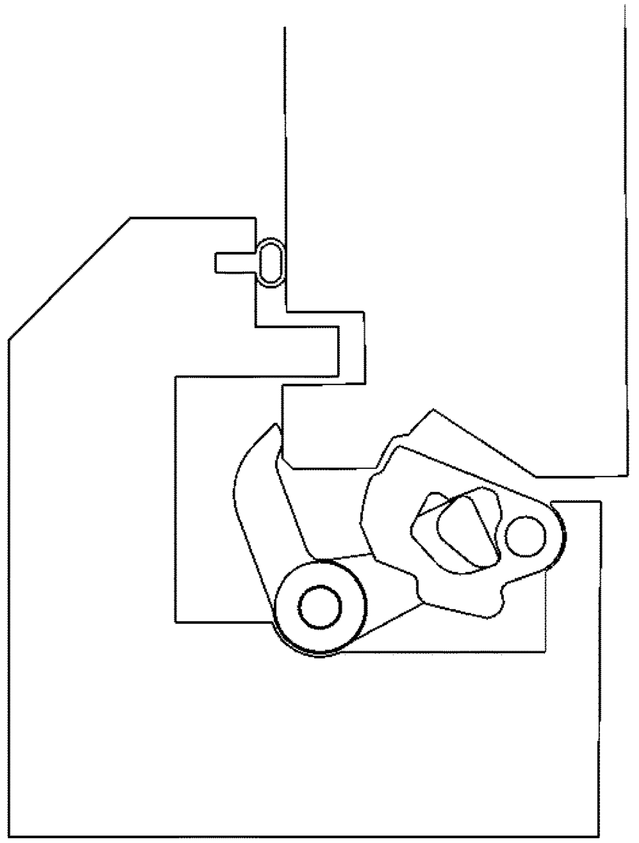
FIG. 6C(2)
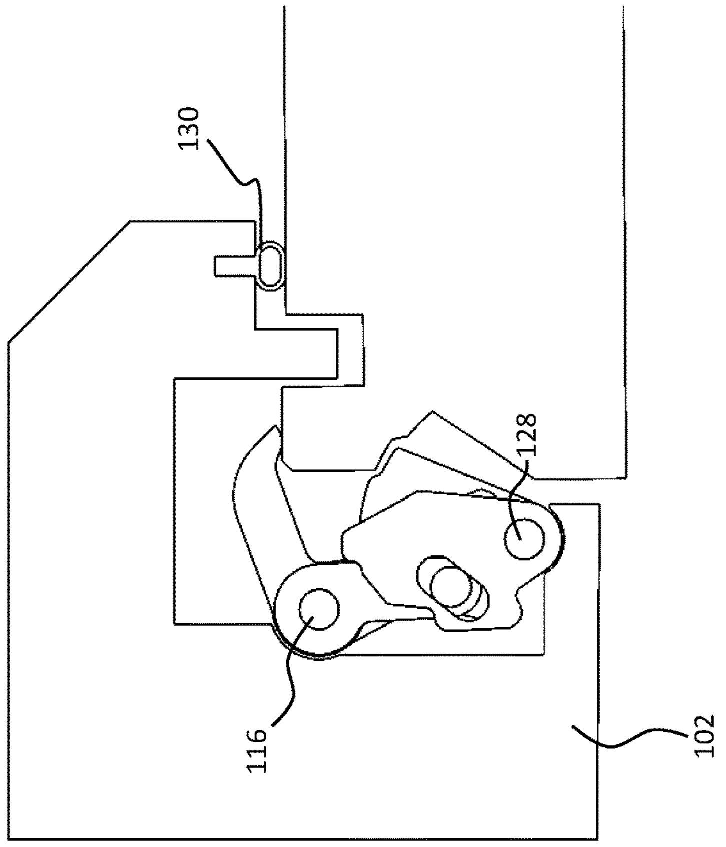
FIG. 6C(1)

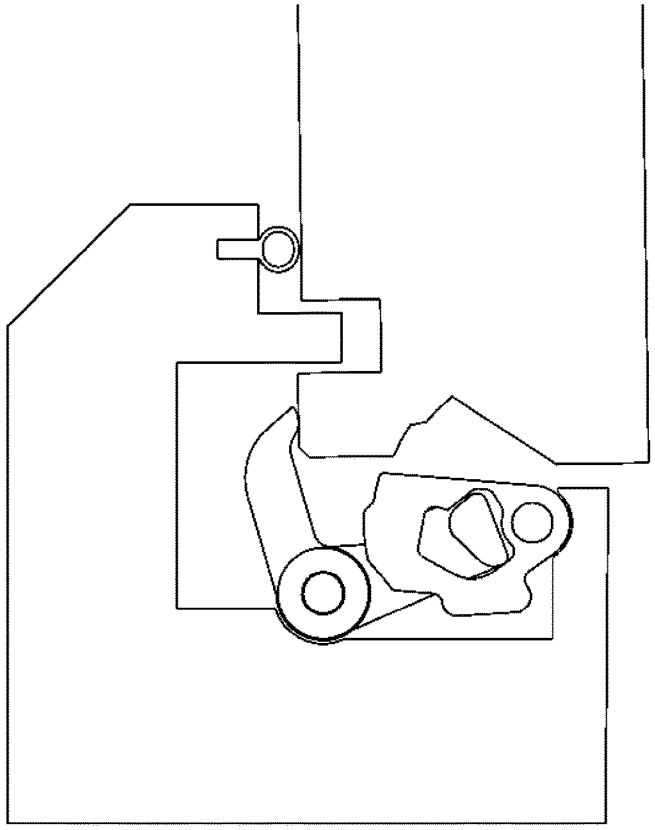
FIG. 6D(2)
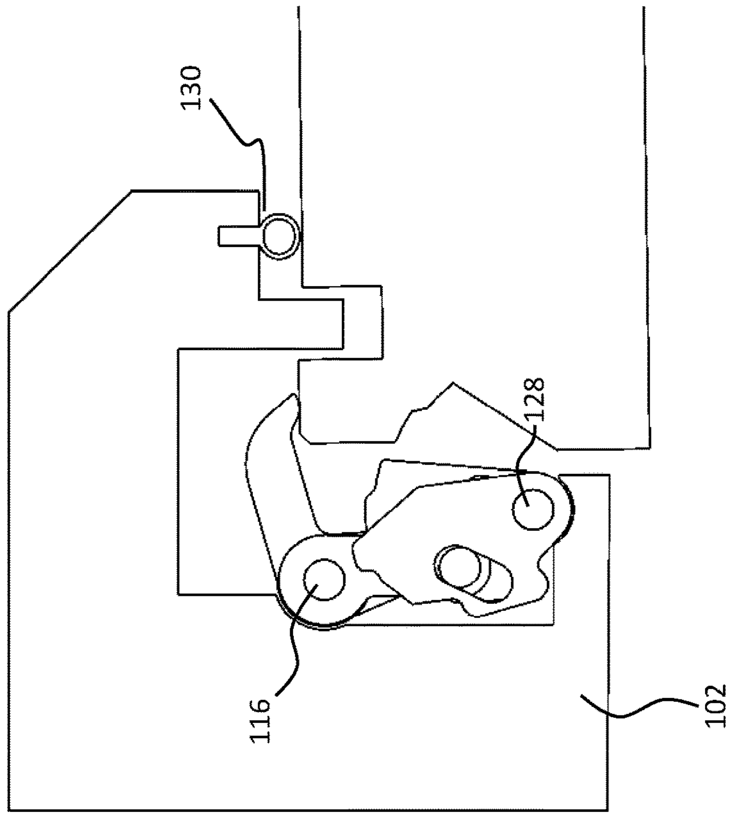
FIG. 6D(1)

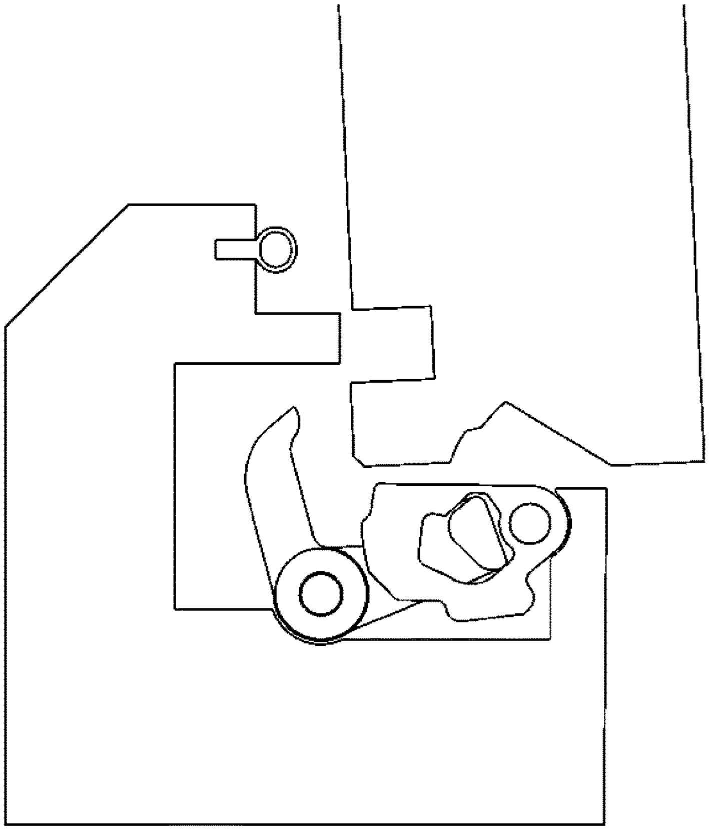
FIG. 6E(2)
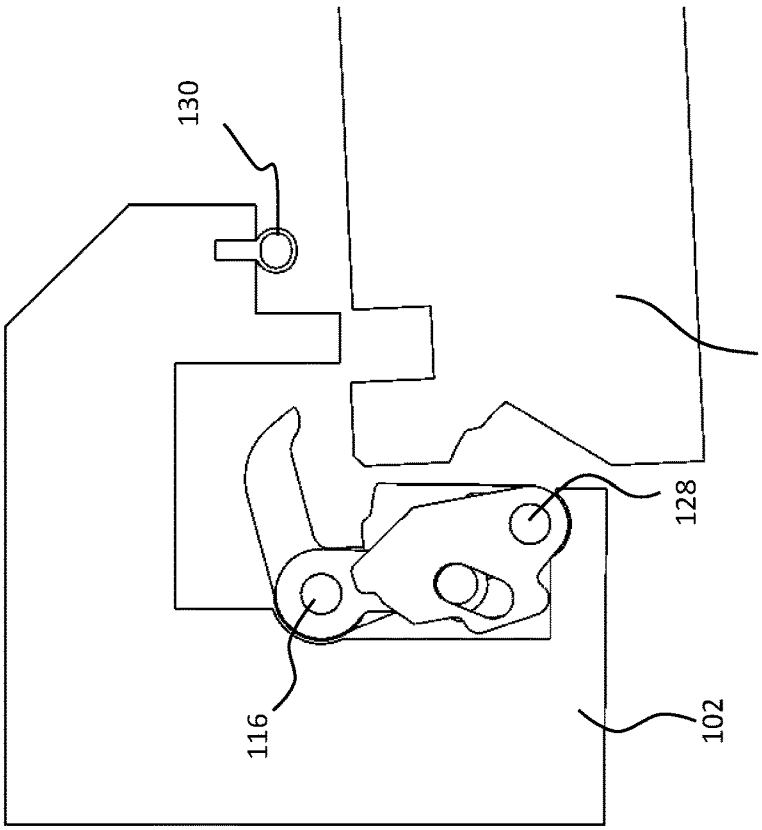
FIG. 6E(1)

154
156

156
154

144
154
148
150
152
156
140
138
136

144
148
150
152
156
140
154
138
136

PANEL LOCK ASSEMBLY

FIELD AND BACKGROUND OF THE INVENTION

The present invention relates to locks and, in particular, it concerns a panel lock assembly for locking a panel in a closed position relative to a strike jamb.

The applicant's prior U.S. Pat. No. 9,970,214 (hereafter "the '214 patent") discloses a lock mechanism in which a terminal part of a closing motion of a panel actuates a linkage which displaces a locking element towards its locked position. Motion of the locking element is thus synchronized with the closing motion of the panel, and begins before the panel reaches its fully closed position.

SUMMARY OF THE INVENTION

The present invention is a panel lock assembly for locking a panel in a closed position relative to a strike jamb.

According to the teachings of an embodiment of the present invention there is provided, an apparatus comprising: (a) an opening bounded on one side by a strike jamb; (b) a panel mounted relative to the opening so as to be displaceable between an open position in which the panel is separated from the strike jamb to leave the opening open and a closed position in which the panel closes at least part of the opening; (c) a locking element associated with the strike jamb or the panel and displaceable between a locked position in which the locking element is interposed between surfaces of the panel and the strike jamb to oppose forces directed to displace the panel towards the open position, thereby locking the panel to the strike jamb, and an unlocked position in which the locking element is positioned so as not to obstruct motion of the panel to the open position; (d) a synchronous displacement mechanism associated with the locking element and responsive to at least part of a closing motion of the panel from the open position towards the closed position to initiate a motion of the locking element towards the locked position during the closing motion of the panel prior to the panel reaching the closed position, the synchronous displacement mechanism having a deadlock state when the locking element is in the locked position, the deadlock state preventing displacement of the locking element towards the unlocked position.

According to a further feature of an embodiment of the present invention, the synchronous displacement mechanism is configured to displace the locking element to an engagement position interposed between surfaces of the panel and the strike jamb during the closing motion of the panel prior to the panel reaching the closed position.

According to a further feature of an embodiment of the present invention, the synchronous displacement mechanism is configured to complete displacement of the locking element to the locked position no later than when the panel reaches the closed position.

According to a further feature of an embodiment of the present invention, the synchronous displacement mechanism is configured to complete displacement of the locking element to the locked position when the panel reaches a first position during the closing motion of the panel, and wherein a further motion of the synchronous displacement mechanism towards the deadlock state occurs during a further part of the closing motion beyond the first position.

According to a further feature of an embodiment of the present invention, there is also provided a displaceable spacer, and wherein the synchronous displacement mechanism is further configured to displace the displaceable spacer during the further part of the closing motion so that the displaceable spacer is interposed between surfaces of the panel and the strike jamb to prevent the panel from returning to the first position.

According to a further feature of an embodiment of the present invention, there is also provided a resilient biasing element associated with the strike jamb or the panel and deployed to be elastically deformed by the further part of the closing motion so that the resilient biasing element biases the panel to return towards the first position.

According to a further feature of an embodiment of the present invention, the synchronous displacement mechanism includes a bistable spring configuration biasing the synchronous displacement mechanism to assume either a releasing state or the deadlock state, the bistable spring configuration having an intermediate tipping point, the synchronous displacement mechanism being configured to move during the closing motion of the panel beyond the intermediate tipping point no later than when the panel reaches the closed position.

According to a further feature of an embodiment of the present invention, the synchronous displacement mechanism comprises a lever deployed to be displaced by relative motion of the panel and the strike jamb during a terminal portion of the closing motion.

According to a further feature of an embodiment of the present invention, the synchronous displacement mechanism further comprises an actuating linkage mechanically associated with the lever so as to be displaced by relative motion of the panel and the strike jamb during a terminal portion of the closing motion, wherein a first range of displacement of the actuating linkage displaces the locking element to the locked position, and a further displacement of the actuating linkage beyond the first range achieves the deadlock state.

According to a further feature of an embodiment of the present invention, the actuating linkage comprises an actuator arm, and wherein the actuator arm and the lever are both pivotally mounted, the lever and the actuator arm being mechanically linked via a unidirectional linkage such that pivoting of the lever in a first direction caused by the closing motion generates a corresponding pivoting of the actuator arm while a reverse motion of the lever can occur without motion of the actuator arm.

According to a further feature of an embodiment of the present invention, the actuator arm has an actuator surface deployed for engaging a contact surface of the locking element such that, when the actuator arm pivots, the actuator surface bears on the contact surface so as to displace the locking element towards the locked position.

According to a further feature of an embodiment of the present invention, the actuator surface and the contact surface are configured to define a contact profile having a cutoff beyond which further pivoting of the actuator arm occurs without further motion of the locking element and achieves the deadlock state.

According to a further feature of an embodiment of the present invention, the contact surface has a smooth portion terminating at a corner, the corner defining the cutoff.

According to a further feature of an embodiment of the present invention, the actuating linkage further comprises a release mechanism mechanically linked to the actuator arm such that operation of the release mechanism is effective to displace the actuator arm to disengage the deadlock state.

According to a further feature of an embodiment of the present invention, the actuator arm has a supplementary actuating surface deployed for contacting a supplementary contact surface of the locking element such that a reverse pivoting motion of the actuator arm is effective to displace the locking element towards the unlocked state.

According to a further feature of an embodiment of the present invention, the actuating surface and the supplementary actuating surface of the actuator arm are provided by surfaces of a projection of the actuator arm, and wherein the contact surface and the supplementary contact surface are provided by edges of a shaped slot of the locking element, the projection being engaged within the shaped slot.

According to a further feature of an embodiment of the present invention, the release mechanism is mechanically linked to the actuator arm via a unidirectional linkage such that operation of the release mechanism is effective to displace the actuator arm to disengage the deadlock state while a reverse motion of the release mechanism can occur without motion of the actuator arm.

According to a further feature of an embodiment of the present invention, the lever, the actuator arm and the release mechanism are all pivotally mounted so as to be pivotable about a common pivot axis.

According to a further feature of an embodiment of the present invention, the locking element is pivotally mounted so as to be pivotable about a locking element axis, the locking element axis being parallel to the common pivot axis.

According to a further feature of an embodiment of the present invention, the release mechanism further comprises a plurality of input arms projecting radially from the common pivot axis, each of the input arms being associated with a corresponding manually or electrically operated lock-releaser deployed to displace the corresponding input arm so as to operate the release mechanism.

According to a further feature of an embodiment of the present invention, the actuating linkage further comprises a connecting link pivotally interconnected with the actuator arm and with the locking element, the actuator arm and the connecting link assuming an over-center locking configuration in the deadlock state.

According to a further feature of an embodiment of the present invention, the synchronous displacement mechanism comprises: (a) a sensor arrangement comprising at least one sensor deployed for sensing a relative position of the panel relative to the strike jamb prior to the panel reaching the closed position; (b) an electrically controllable actuator associated with the locking element and configured for selectively displacing the locking element between the locked position and the unlocked position; and (c) a controller associated with the sensor arrangement and with the electrically controllable actuator, the controller being responsive to sensing of at least part of a closing motion of the panel from the open position towards the closed position to initiate a motion of the locking element towards the locked position during the closing motion of the panel prior to the panel reaching the closed position.

There is also provided according to the teachings of an embodiment of the present invention, an apparatus comprising: (a) an opening bounded on one side by a strike jamb; (b) a panel mounted relative to the opening so as to be displaceable between an open position in which the panel is separated from the strike jamb to leave the opening open and a closed position in which the panel closes at least part of the opening; (c) a plurality of locking elements associated with the strike jamb or the panel, each of the locking elements being displaceable between a locked position in which the locking element is interposed between surfaces of the panel and the strike jamb to oppose forces directed to displace the panel towards the open position, thereby locking the panel to the strike jamb, and an unlocked position in which the locking element is positioned so as not to obstruct motion of the panel to the open position; (d) a synchronous displacement mechanism associated with the locking elements and responsive to at least part of a closing motion of the panel from the open position towards the closed position to initiate a motion of each of the locking elements towards the locked position during the closing motion of the panel prior to the panel reaching the closed position, wherein the synchronous displacement mechanism further comprises a release mechanism mechanically linked to each of the locking elements via a unidirectional linkage such that operation of the release mechanism is effective to displace all of the plurality of locking elements from the locked position to the unlocked position, while direct displacement of one of the locking elements from the locked position to the unlocked position does not displace another of the plurality of locking elements away from the locked position.

There is also provided according to the teachings of an embodiment of the present invention, an apparatus comprising: (a) an opening bounded on one side by a strike jamb; (b) a panel mounted relative to the opening so as to be displaceable between an open position in which the panel is separated from the strike jamb to leave at least part of the opening open and a closed position in which the panel closes at least part of the opening; (c) a locking element associated with the strike jamb or the panel and displaceable between a locked position in which the locking element presents an abutment surface positioned to be engaged by a contact surface of the panel or the strike jamb and to oppose forces directed to displace the panel towards the open position, thereby locking the panel to the strike jamb, and an unlocked position in which the locking element is positioned so as not to obstruct motion of the panel to the open position; (d) a synchronous displacement mechanism associated with the locking element and responsive to at least part of a closing motion of the panel from the open position towards the closed position to initiate a motion of the locking element towards the locked position during the closing motion of the panel prior to the panel reaching the closed position, wherein the synchronous displacement mechanism is configured to bring the locking element to an engaged position in which the locking element is effective to lock the panel to the strike jamb when the panel reaches a first intermediate position prior to the closed position, and wherein the synchronous displacement mechanism is responsive to further displacement of the panel beyond the first intermediate position to generate displacement of at least one element other than the locking element.

According to a further feature of an embodiment of the present invention, the at least one element comprises a stop latch selectively deployable from a released position to a securing position in which the stop latch secures the locking element in the locked position, thereby precluding displacement of the locking element to the unlocked position.

According to a further feature of an embodiment of the present invention, the at least one element comprises at least one spacer element deployed to limit a range of free motion of the panel relative to the opening when the locking element is in the locked position.

There is also provided according to the teachings of an embodiment of the present invention, an apparatus comprising: (a) an opening bounded on one side by a strike jamb; (b) a panel mounted relative to the opening so as to be displaceable between an open position in which the panel is separated from the strike jamb to leave the opening open and a closed position in which the panel closes at least part of the opening; (c) a locking element associated with the strike jamb or the panel and displaceable between a locked position in which the locking element is interposed between surfaces of the panel and the strike jamb to oppose forces directed to displace the panel towards the open position, thereby locking the panel to the strike jamb, and an unlocked position in which the locking element is positioned so as not to obstruct motion of the panel to the open position; (d) a ratchet configuration associated with the locking element and configured to engage the locking element at a plurality of positions along a motion from the unlocked position towards the locked position so as to prevent a reverse motion towards the unlocked position.

According to a further feature of an embodiment of the present invention, the locking element is spring biased towards the locked position.

According to a further feature of an embodiment of the present invention, the ratchet configuration is selectively releasable to allow retraction of the locking element to the unlocked position.

According to a further feature of an embodiment of the present invention, release of the ratchet configuration is actuated by relative motion of the panel relative to the strike jamb during closing of the panel.

According to a further feature of an embodiment of the present invention, the locking element is a pivotable locking element pivotable about a pivot axis.

According to a further feature of an embodiment of the present invention, the ratchet configuration comprises a plurality of ratchet teeth integrated with the locking element and a spring-biased pawl biased so as to sequentially engage the ratchet teeth during displacement of the locking element towards the locked position.

According to a further feature of an embodiment of the present invention, the locking element is associated with the strike jamb. According to an alternative feature of an embodiment of the present invention, the locking element is associated with the panel.

BRIEF DESCRIPTION OF THE DRAWINGS

The invention is herein described, by way of example only, with reference to the accompanying drawings, wherein:

FIGS. 5A-5F are a sequence of pairs of horizontal cross-sectional views taken at two levels through a modified version of the locking configuration of FIG. 2 showing a displaceable spacer and a corresponding position of a locking element during a closing motion of the panel;

FIGS. 6A-6E are a sequence of pairs of views similar to FIGS. 5A-5F during unlocking of the panel;

DESCRIPTION OF THE PREFERRED EMBODIMENTS

The present invention is a panel lock assembly for locking a panel in a closed position relative to a strike jamb.

The principles and operation of an apparatus incorporating various aspects of a panel lock assembly according to the present invention may be better understood with reference to the drawings and the accompanying description.

Overview

The present invention includes a number of different aspects, each of which is believed to be of patentable significance in its own right, and which will be presented here in various non-limiting combinations. Certain aspects of the invention relate to synchronous operation of a lock mechanism, where operation of one or more part of a lock mechanism is synchronized, preferably spatially, with a closing motion of a panel, particularly where the operation involves positive displacement of components synchronized with the closing motion rather than just spring bias. Additional aspects of the invention relate to various features and subassemblies of such lock assemblies, relating, for example, to provision of multiple independent locking elements which can be centrally unlocked, and mechanisms for selectively disabling certain locking functions. A further aspect of the present invention relates to a ratchet-based deadlock (or "dead bolt") arrangement in which a sequence of positions of a locking element are successively secured ("deadlocked") during a locking motion, thereby preventing release of the panel even before full engagement of the locking element has been achieved. Each of these aspects is believed to be independently patentable, even where described in the context of certain other aspects of the invention.

Figure 1B:
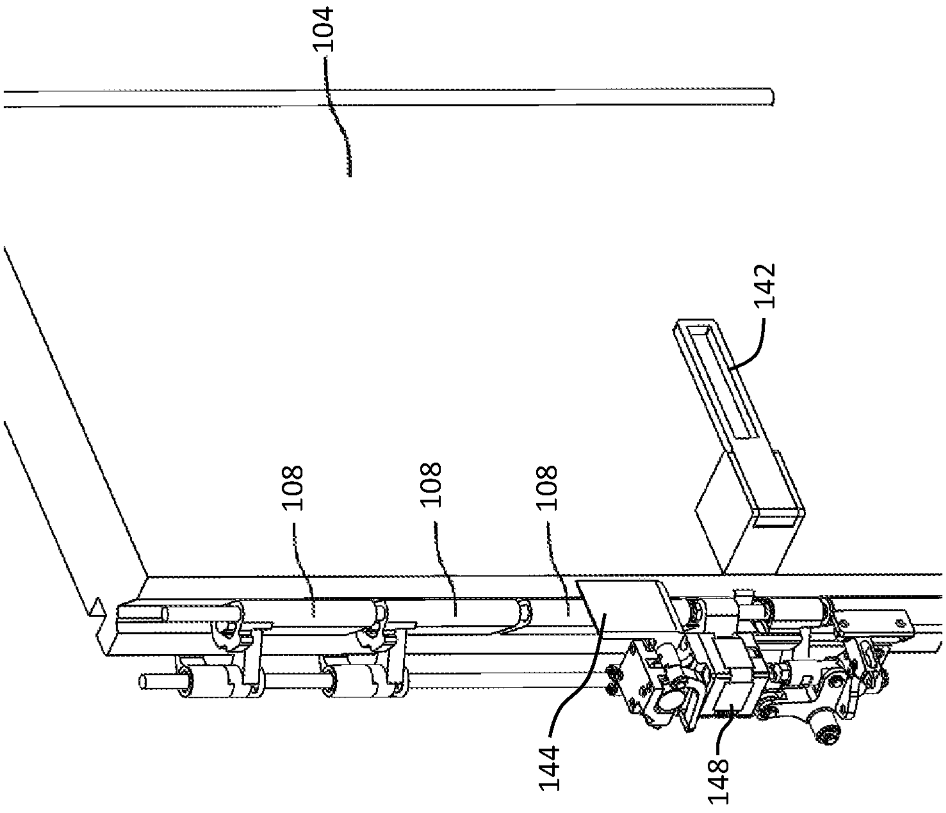
FIGS. 1B-1D are partial cut-away isometric views of the apparatus of FIG. 1A revealing parts of a panel lock assembly including a number of locking configurations.
Figure 1A:
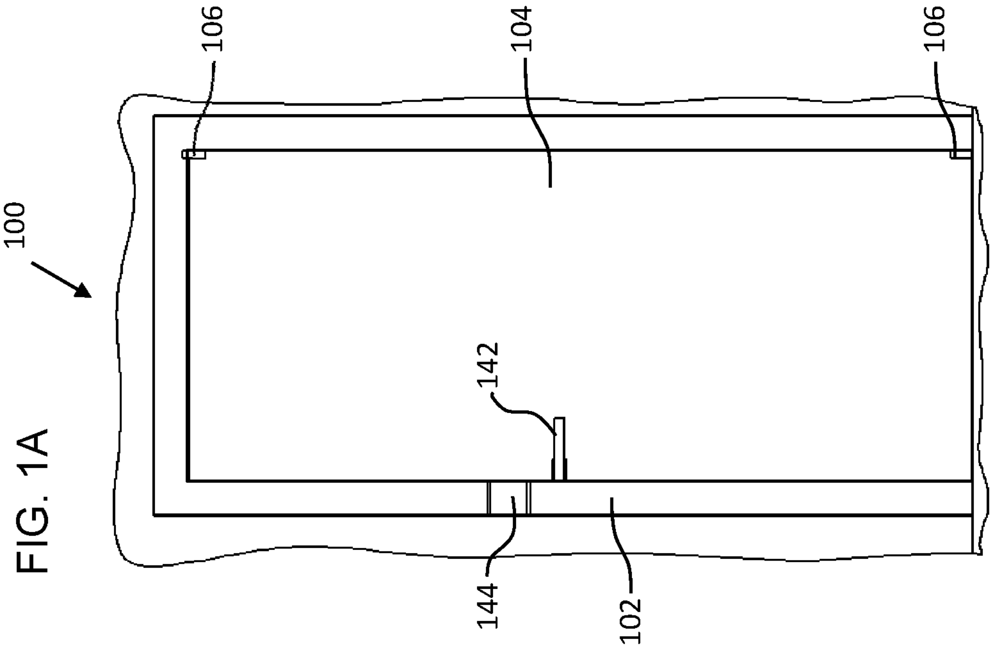
FIG. 1A is a schematic front view of an apparatus including a panel lock assembly, constructed and operative according to an embodiment of the present invention, for locking and releasing a panel within an opening.

Referring now to the drawings, FIG. 1A is a schematic overview of an apparatus 100 which includes an opening bounded on one side by a strike jamb 102, and a panel 104, mounted relative to the opening so as to be displaceable between an open position in which the panel is separated from the strike jamb to leave the opening open and a closed position in which panel 104 closes at least part of the opening. In the non-limiting exemplary embodiments illustrated herein, panel 104 is illustrated as a hinge-mounted panel which moves through a swinging motion about hinges 106 between the open and closed positions. It should be noted however that, except where explicitly stated otherwise, the principles and teachings of the present invention are also applicable to panels that undergo other forms of opening motion such as, for example, sliding doors. The required modifications to the various structures disclosed herein will be clear to a person having ordinary skill in the art according to the particular application.

Apparatus 100 also includes a locking element 108 associated with strike jamb 102 or with panel 104 and displaceable between a locked position in which the locking element is interposed between surfaces of the panel and the strike jamb to oppose forces directed to displace the panel towards the open position, thereby locking panel 104 to strike jamb 102, and an unlocked position in which the locking element is positioned so as not to obstruct motion of panel 104 to the open position.

Spatially Synchronous Locking Mechanism with Deadlock Function

According to a first aspect of the present invention, the apparatus also includes a synchronous displacement mechanism associated with locking element 108 and responsive to at least part of a closing motion of panel 104 from the open position towards the closed position to initiate a motion of locking element 108 towards the locked position during the closing motion of the panel prior to the panel reaching the closed position. The synchronous displacement mechanism preferably has a "deadlock state" when the locking element is in the locked position, the deadlock state preventing displacement of the locking element towards the unlocked position.

The synchronous displacement mechanism may be implemented in various different forms, such as the non-limiting examples discussed in detail below, and is preferably configured to displace the locking element to an engagement position during the closing motion of the panel prior to the panel reaching the closed position. An "engagement position" is defined herein as a position of the locking element interposed between surfaces of the panel and the strike jamb such that the locking element would mechanically interact with both the strike jamb and the panel during an opening motion of the panel. Most preferably, the engagement position is also effective to achieve locking of the panel to the strike jamb such that forces applied to move the panel away from the strike jamb are opposed by the locking element being trapped between opposing surfaces of the panel and the strike jamb. The locking element is preferably configured such that, in the locked position, and preferably also in any position from the aforementioned intermediate engagement position towards the locked position, the locking element achieves geometrical or frictional locking between the panel and the strike jamb, without requiring any additional mechanism to hold the locking element in place to achieve locking.

In certain particularly preferred cases, the synchronous displacement mechanism is configured to complete displacement of the locking element to the locked position no later than when the panel reaches the closed position. In some cases, the synchronous displacement mechanism is configured to complete displacement of the locking element to the locked position when the panel reaches a first position during the closing motion of the panel, and then a further motion of the synchronous displacement mechanism towards the deadlock state occurs during a further part of the closing motion beyond this first position. Various examples of implementations exemplifying this functionality will be discussed below with reference to FIGS. 3A-7B.

Figure 1C:
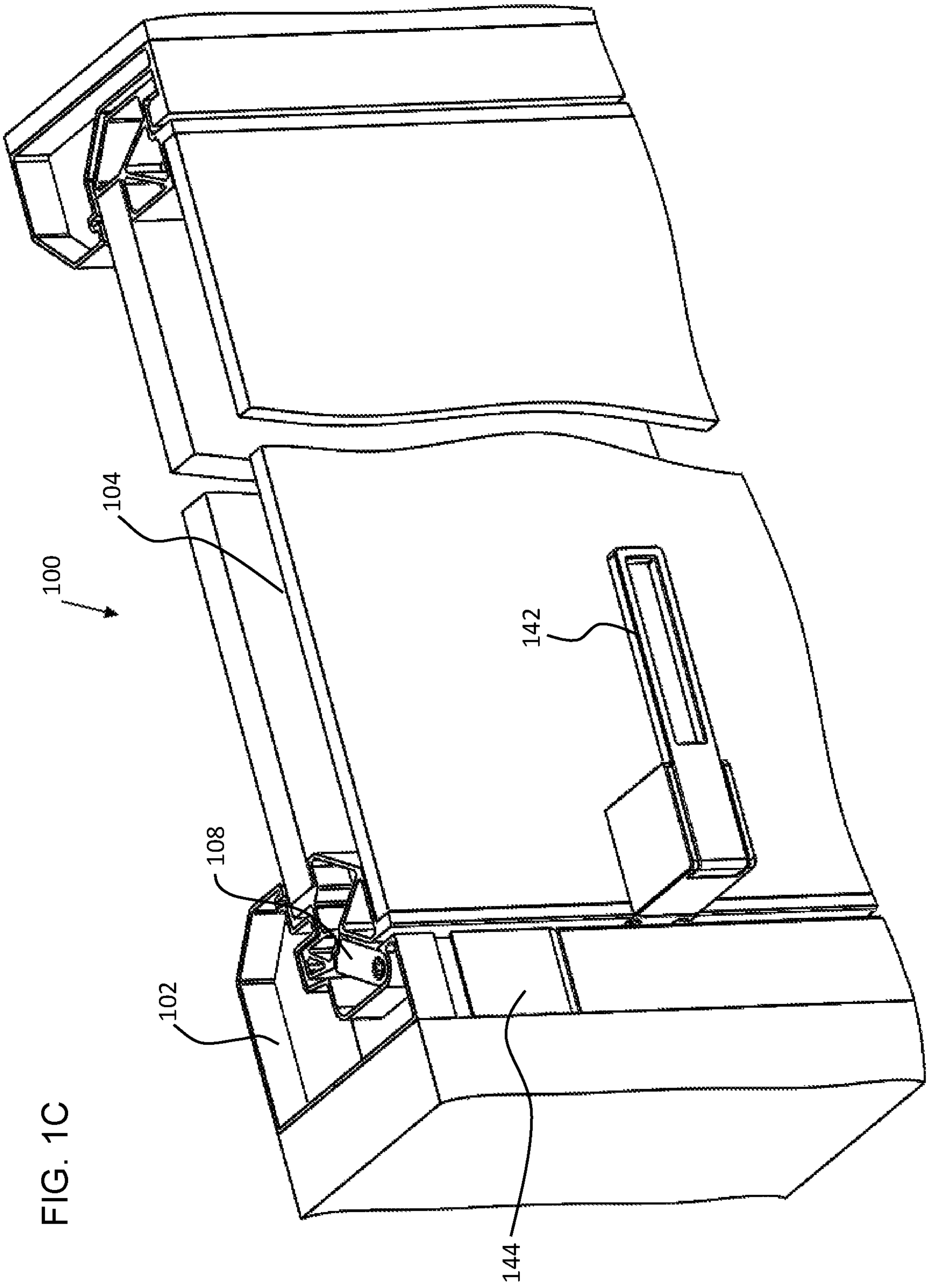
Figure 1D:
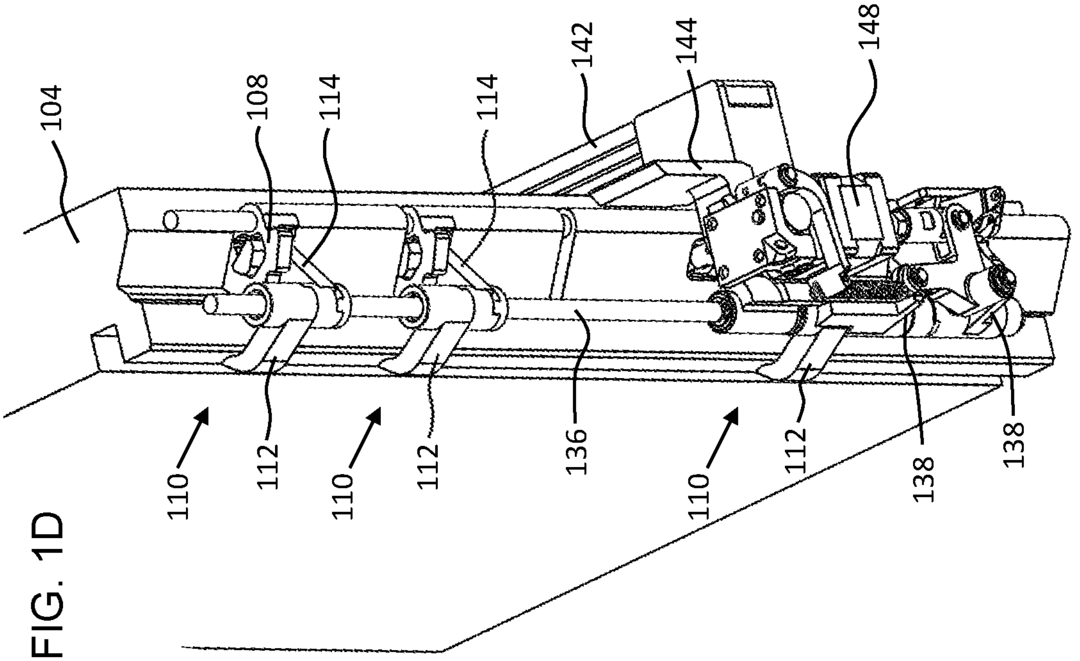

One non-limiting example of an implementation of this aspect of the present invention is illustrated here in the partial and cut-away views of FIGS. 1B-1D which reveal a number of locking configurations 110, each operating a corresponding locking element 108. One of these locking configurations 110 is illustrated in an enlarged view in FIG. 2, and is shown in horizontal cross-section in sequences of different positions in the views of FIGS. 3A-3G during closing and locking of the panel, and in the views of FIGS. 4A-4E during unlocking and opening of the panel.

As illustrated in FIG. 2 and FIGS. 3A-4E, the synchronous displacement mechanism as illustrated here includes as part of locking configuration 110 a lever 112 deployed to be displaced by relative motion of the panel and the strike jamb during a terminal portion of the closing motion, and an actuating linkage, here implemented as a single actuator arm 114, mechanically associated with lever 112 so as to be displaced by relative motion of the panel and the strike jamb during a terminal portion of the closing motion. In certain particularly preferred cases as illustrated here, a first range of displacement of the actuating linkage displaces locking element 108 to its locked position, and a further displacement of the actuating linkage beyond the first range achieves the deadlock state. This sequence will be further illustrated below with reference to FIGS. 3A-3G.

Referring again to FIG. 2, in the preferred but non-limiting case illustrated here, actuator arm 114 and lever 112 are both pivotally mounted so as to pivot about a common axis 116. Advantageously, lever 112 and actuator arm 114 are mechanically linked via a unidirectional linkage such that pivoting of the lever in a first direction (here anticlockwise as viewed from above) caused by the closing motion generates a corresponding pivoting of actuator arm 114 while a reverse motion of the lever (clockwise as viewed from above) can occur without motion of the actuator arm. This is conveniently implemented using an angle-limiting linkage, for example, based on a stepped edge feature 118, which operates at one extreme of its angular range of motion during the locking action. Actuator arm 114 here has an actuator surface deployed for engaging a contact surface 120 of locking element 108 such that, when actuator arm 114 pivots, the actuator surface bears on contact surface 120 so as to displace locking element 108 towards its locked position. In the case illustrated here, the actuator surface is provided by an outer surface of a shaped pin 122 that is engaged in a shaped slot 124 in locking element 108, one edge of which provides contact surface 120.

According to certain particularly preferred implementations, the actuator surface of actuator arm 114 and the contact surface 120 of locking element 108 are configured to define a contact profile having a cutoff beyond which further pivoting of the actuator arm occurs without further motion of the locking element and achieves the deadlock state. This is exemplified in FIGS. 3A-3G by the configuration of contact surface 120 having a smooth portion terminating at a corner 126, where the corner defines the aforementioned cutoff.

The locking function synchronized with closing of the panel will now be clearly understood with reference to FIGS. 3A-3G. As the panel is closed from the position of FIG. 3A to the position of FIG. 3B, a surface of the panel comes in contact with lever 112 and starts to bear against the lever. Rotation of lever 112 about axis 116 transfers a corresponding rotation through the one-way linkage 118 to actuator arm 114. Pivotal motion of actuator arm 114 presses the actuator surface of shaped pin 122 against contact surface 120 of slot 124, thereby generating a corresponding displacement of locking element 108, which is here preferably a pivotably mounted locking element pivotable about a second pivot axis 128. Various stages of the motion of locking element 108 as a function of the relative motion between panel 104 and hinge jamb 102 are seen in FIGS. 3B-3E. At the stage of FIG. 3E, locking element 108 has reached its fully locked position, and shaped pin 122 has reached corner 126. At this point, further motion of the panel 104, and hence actuator arm 114, moves shaped pin 122 beyond corner 126 with no further motion of the locking element, i.e., with a "zero drive ratio" (FIG. 3F), thereby serving as a deadlock that opposes any force applied to try to displace the locking element away from its locked position.

It will be noted that the entire motion of the actuating mechanism and the locking element described so far is spatially synchronized with the closing motion of the panel against the strike jamb, such that each motion of the panel generates a corresponding defined motion of the locking element and/or actuator arm/deadlock, occurring at least in part before the panel is fully closed. This renders the mechanism highly reliable, and largely insensitive to the speed of motion, such that the locking mechanism has been found to operate reliably even under extreme conditions of forceful and rapid slamming of the panel against the strike jamb. This in contrast to spring-operated mechanisms, where the reaction time of the mechanism is limited, and typically fails under extreme conditions of slamming.

Additionally, since the displacement of the locking element is spatially coordinated with motion of the panel, the progressive engagement of the locking element with the panel can advantageous occur without contact between the locking element and the opposing surfaces of, in this case, the panel during most or all of the locking motion. This in contrast to a spring-biased locking element which necessarily rubs against the opposing elements as they pass each other.

Figure 3A:
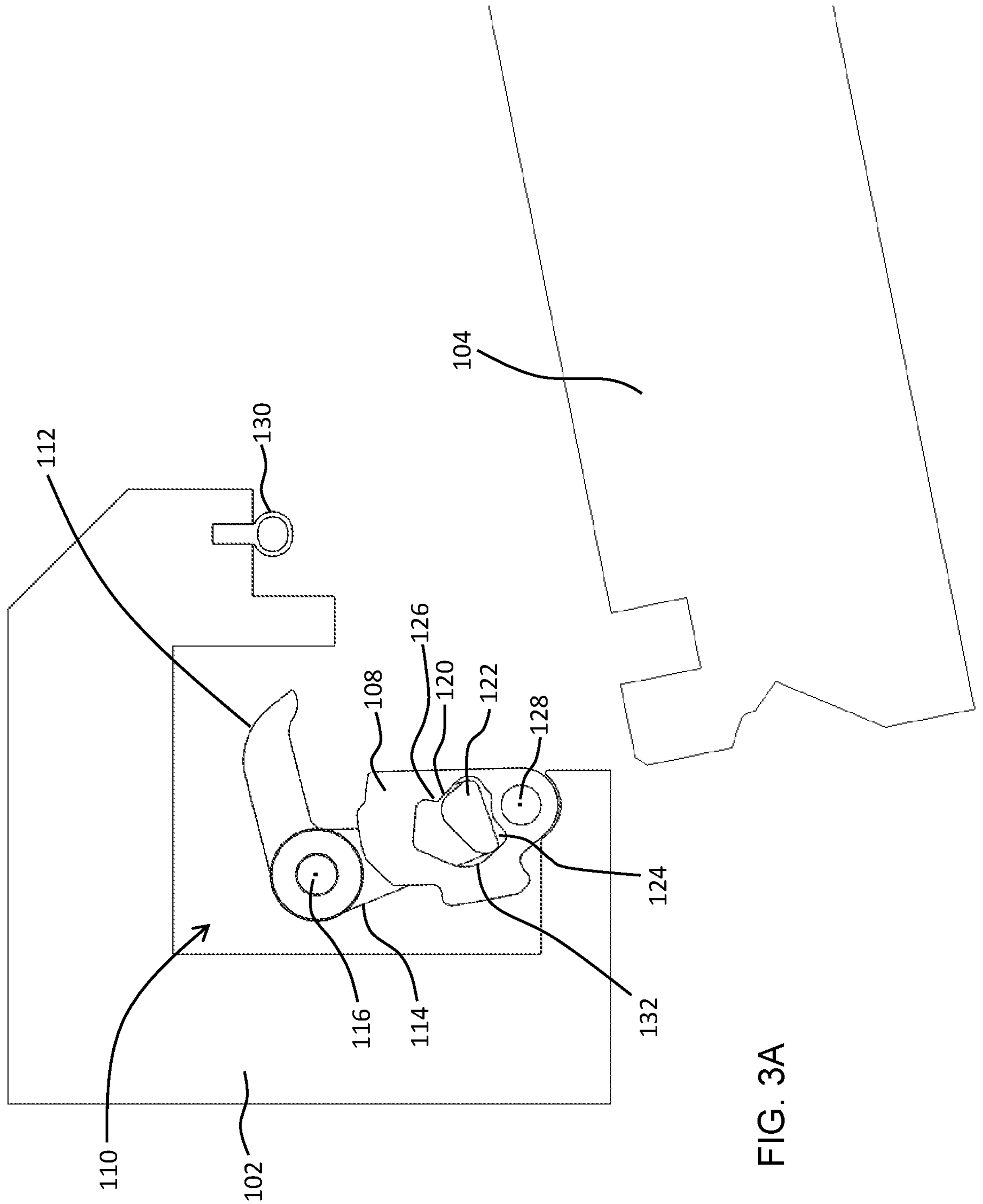
FIGS. 3A-3G are a sequence of horizontal cross-sectional views taken through the locking configuration of FIG. 2 during a closing motion of the panel.
Figure 3C:
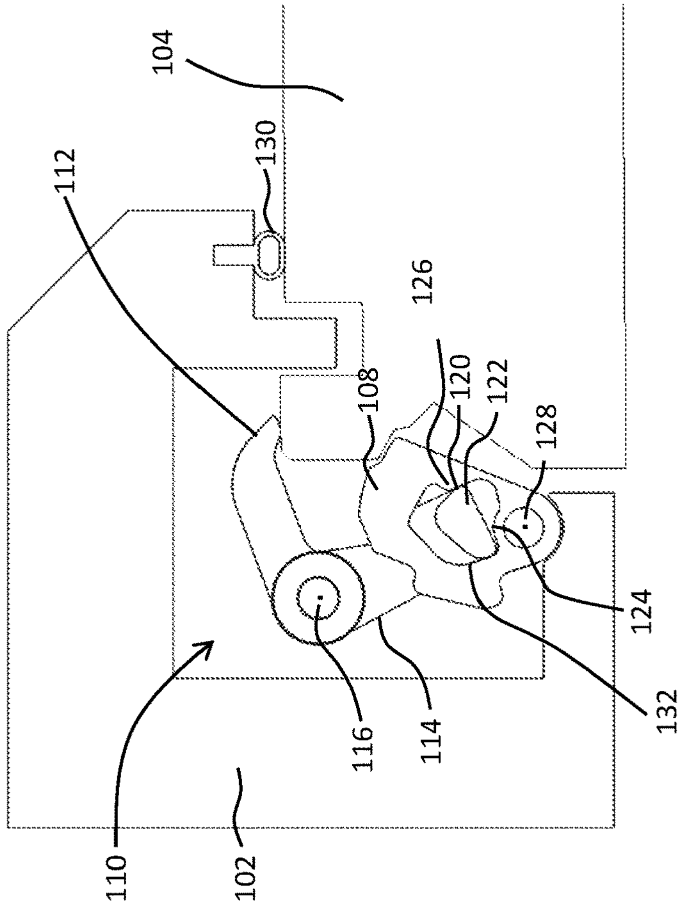
Figure 3B:
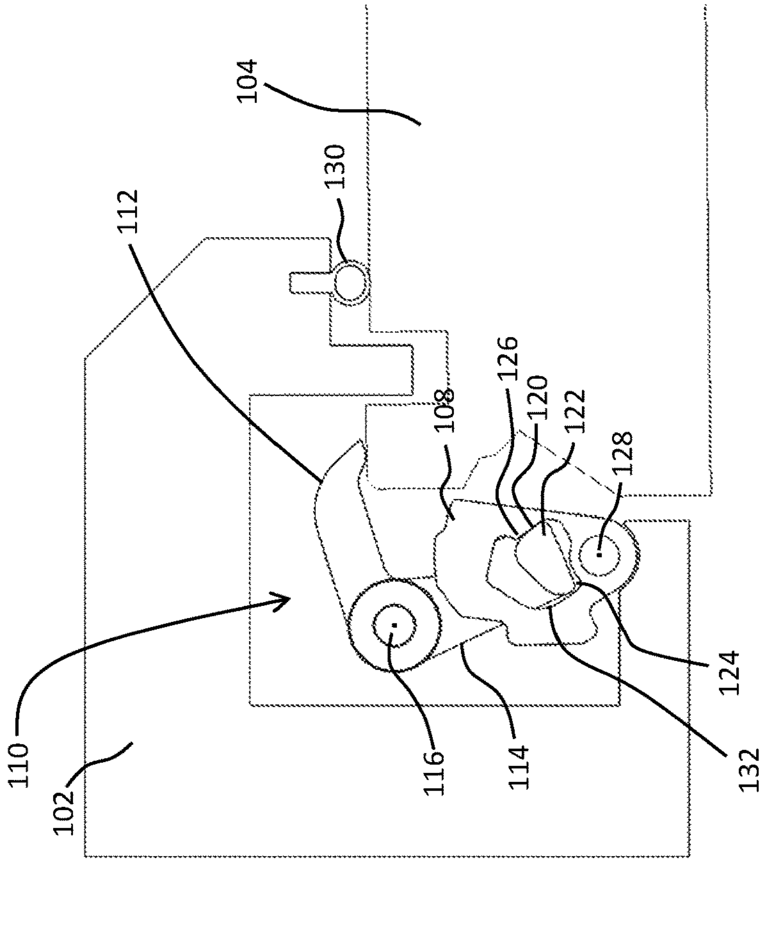
Figure 3E:
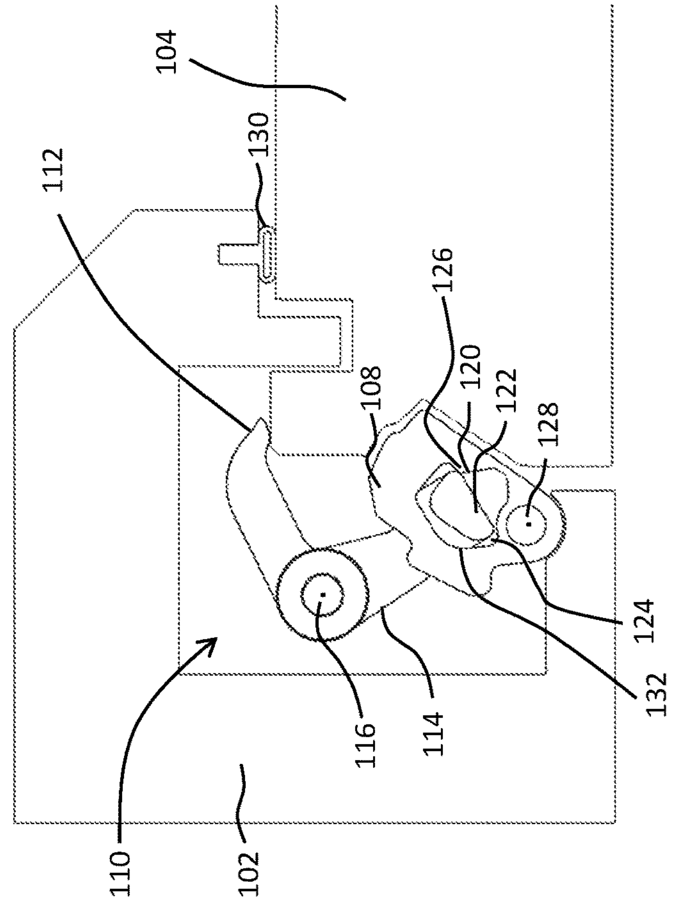
Figure 3D:
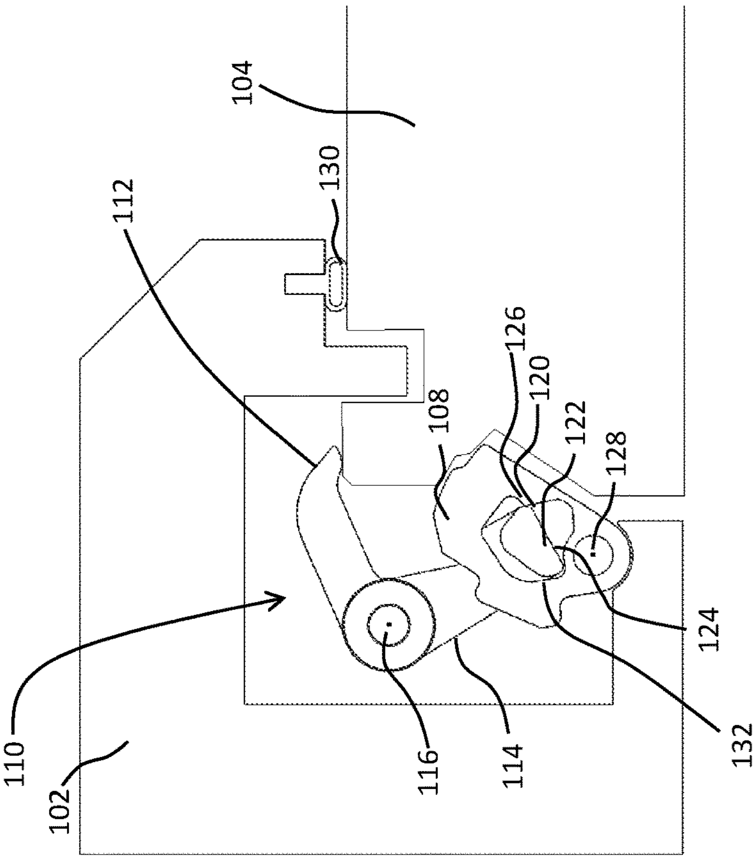
Figure 3G:
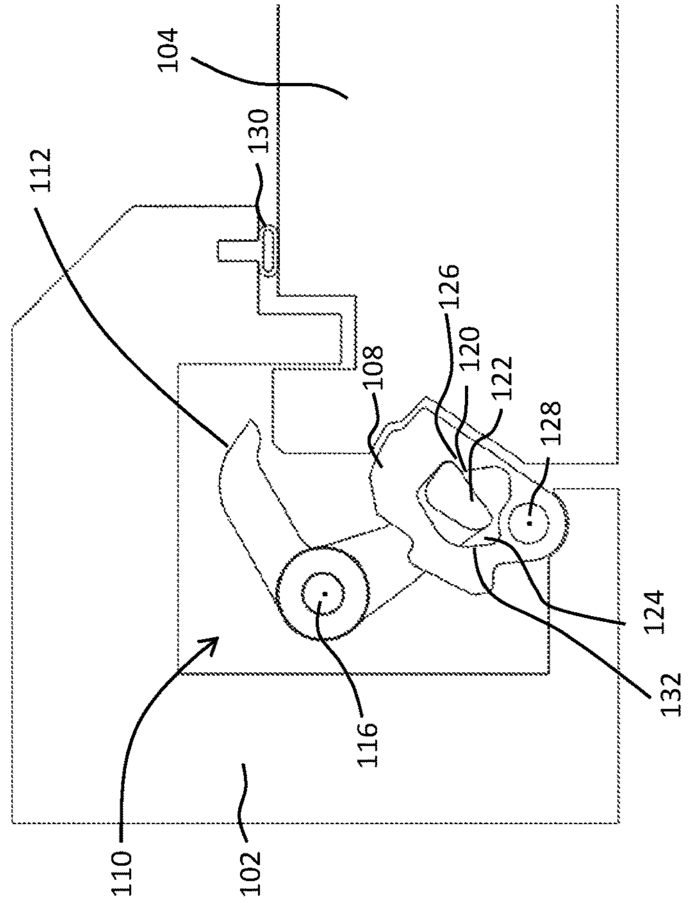
Figure 3F:
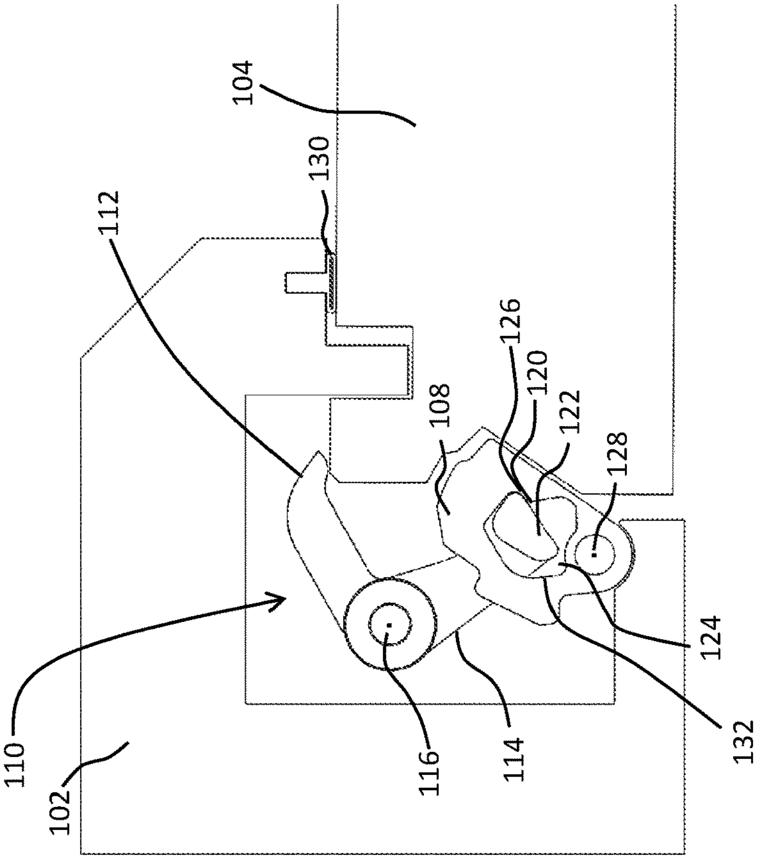
Figure 4B:
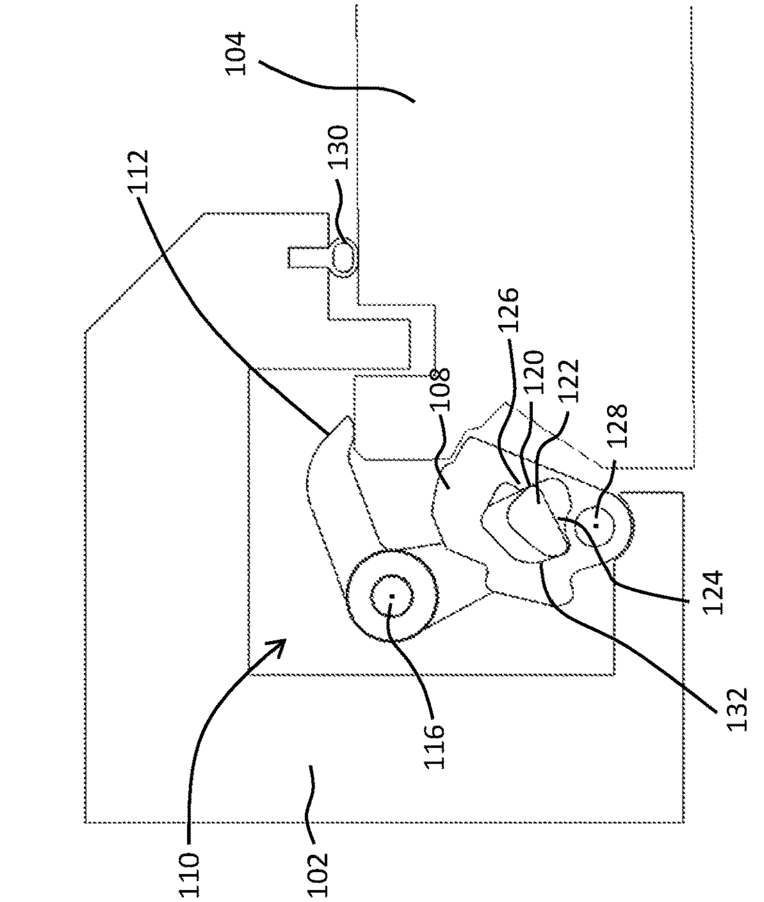
FIGS. 4A-4E are a sequence of horizontal cross-sectional views taken through the locking configuration of FIG. 2 during unlocking of the panel.
Figure 4A:
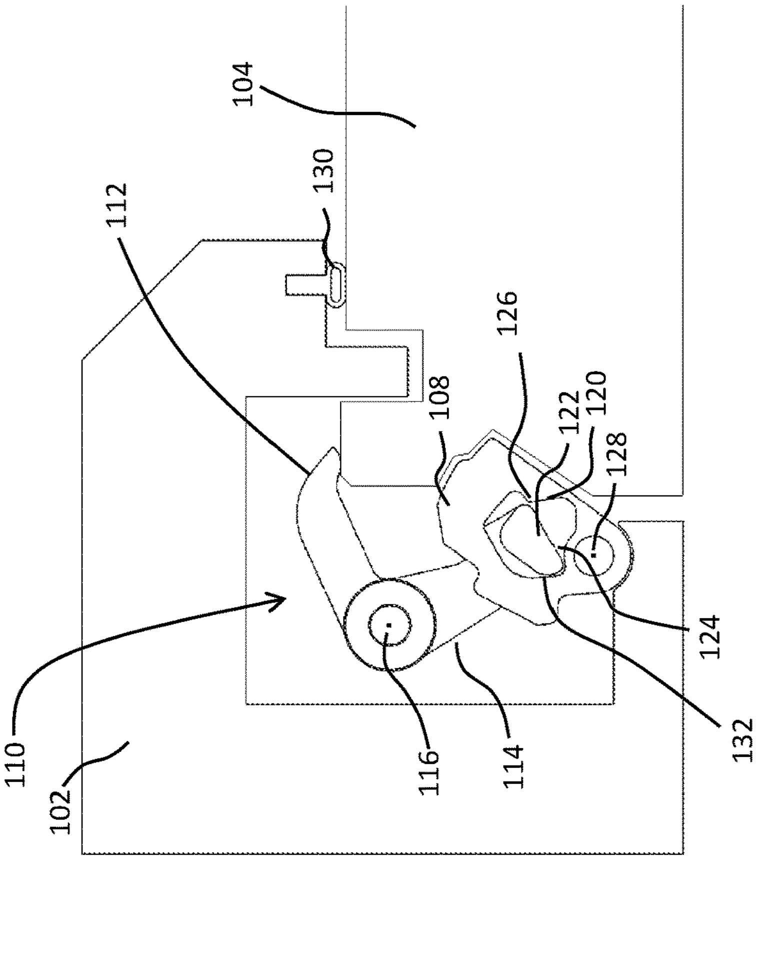
Figure 4C:
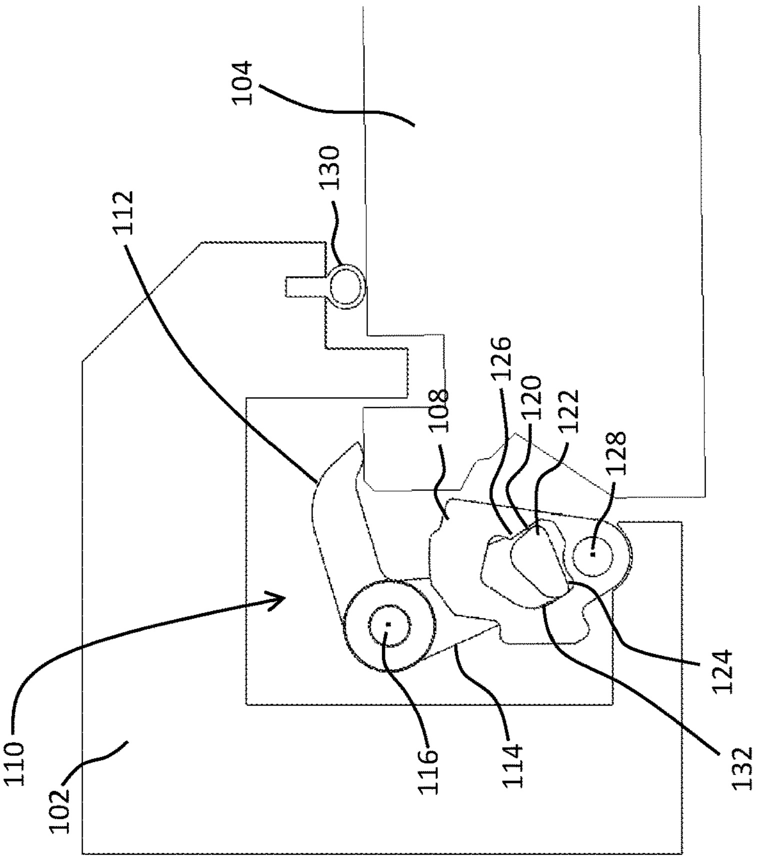
Figure 4D:
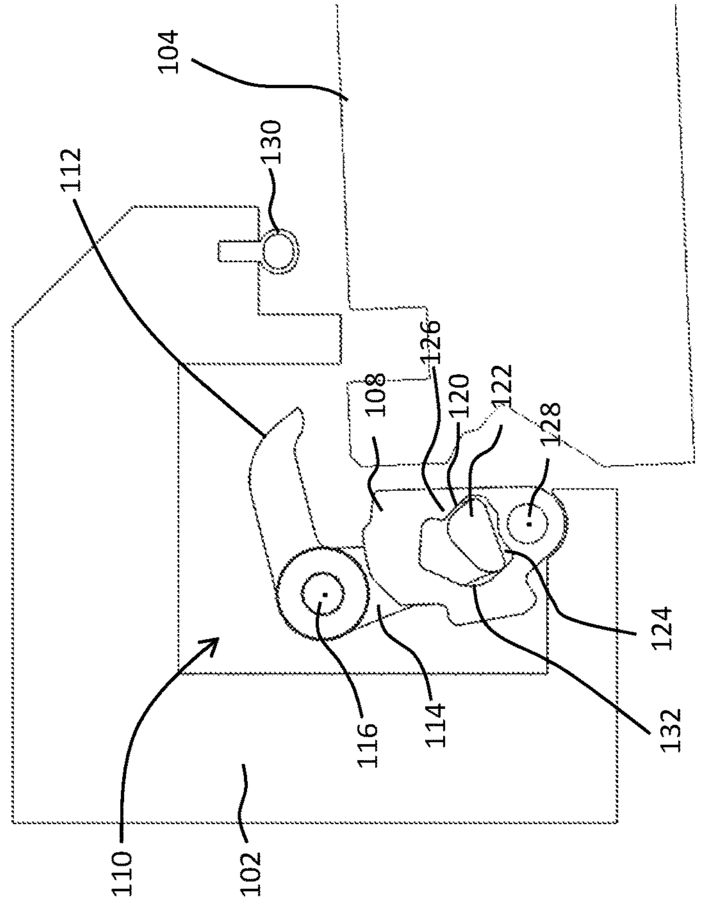
Figure 4E:
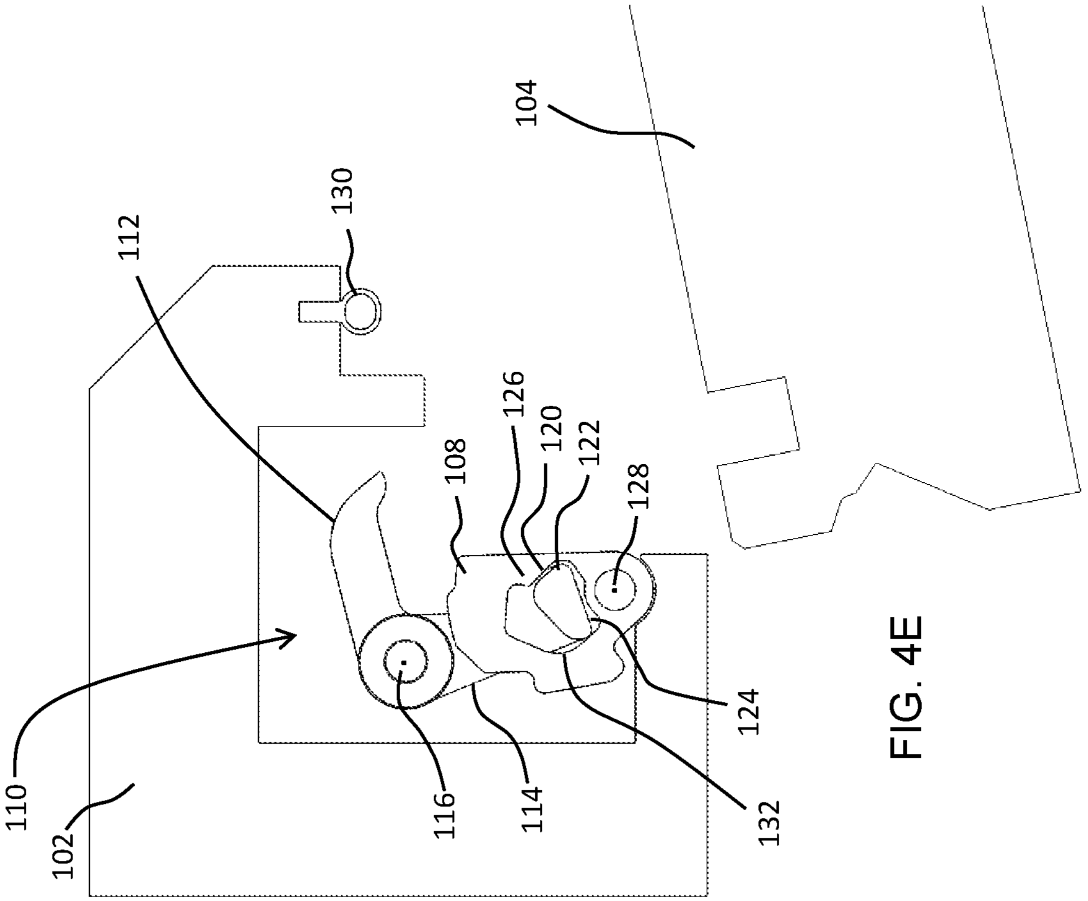

It is noted that the deadlock function of this embodiment is achieved by further motion of the actuating linkage beyond the point at which the locking element 108 reaches its locked position, from the state of FIG. 3E to that of FIG. 3F, which occurs during further motion of the panel relative to the strike jamb. This continued motion of the panel without motion of the locking element opens up a small clearance between the locking element and the opposing surfaces. Where it is desired to avoid any free motion of the panel in its locked state, this can be achieved by use of a resilient biasing element 130, associated with the strike jamb or the panel and deployed to be elastically deformed by the further part of the closing motion so that the resilient biasing element biases the panel to return towards the first position. Resilient biasing element 130 is shown here by way of a non-limiting example as a resilient sealing strip, which is compressed during the closing motion of the panel and then returns the panel resiliently towards the locking element, as illustrated in FIG. 3G, thereby reducing or eliminating the gap. Optionally, a raised strip of low-friction and/or friction-resistant material, such as Teflon, may be provided as a fixed spacer (not shown) on the surface of the locking element facing the panel to maintain a small clearance between the major surfaces under normal working conditions. Under conditions of high load, such as during an attempt to force open the panel, the major surfaces then come into contact and provide the full load-bearing function of the locking element.

An alternative, or additional, set of features employing an "active spacer" for reducing the aforementioned free motion will be discussed below with reference to FIGS. 5A-6E.

Unlocking Mechanism

A further aspect of the present invention relates to a particularly compact, reliable and adaptable mechanism for unlocking a panel lock using multiple different unlocking inputs, such as any combination of a manual handle on the strike jamb, a manual handle on the panel, a lock cylinder and a powered actuator. This aspect of the invention will be illustrated here in a non-limiting example in combination with the above features relating to the synchronous locking mechanism, but is not limited to such an implementation and could also be used to advantage in the context of an otherwise conventional locking mechanism such as a spring-based locking mechanism.

Thus, in the implementation illustrated here, the actuating linkage further includes a release mechanism mechanically linked to actuator arm 114 such that operation of the release mechanism is effective to displace the actuator arm 114 to disengage the deadlock state and/or displace the locking element 108 to its unlocked state. It is noted that the "actuator arm" for this aspect of the invention is not necessarily an element which actuates the locking motion of the locking element, as described thus far, although a particularly preferred implementation as illustrated here does a supplementary actuating surface of the same actuator arm 114, here provided on another side of shaped pin 122, to contact a supplementary contact surface 132 provided by an edge of shaped slot 124 of locking element 108 such that a reverse pivoting motion of the actuator arm is effective to displace the locking element towards the unlocked state.

Figure 2:
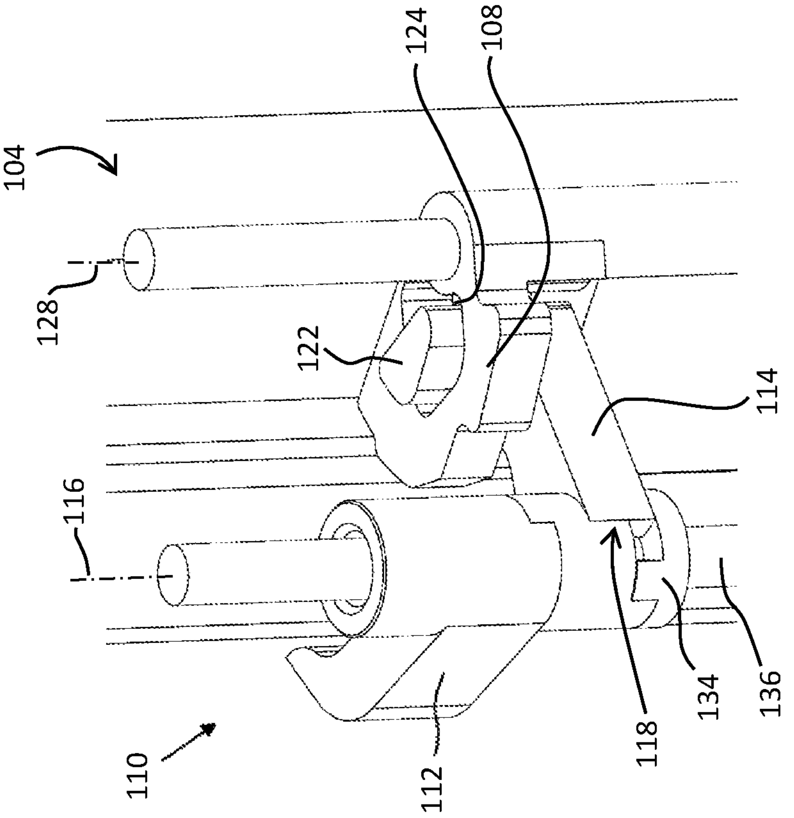
FIG. 2 is an enlarged isometric view of a locking configuration from the apparatus of FIG. 1A.

The release mechanism is preferably mechanically linked to actuator arm 114 via a unidirectional linkage, which here too is advantageously implemented using a limited-rotation linkage formed by an interlocking tooth or projection 134 in a slot, as best seen in FIG. 2, which is shown here rigidly mounted on a release mechanism rotatable rod 136. Operation of the release mechanism, corresponding to rotation of rod 136 in a clockwise direction as viewed here from above, is effective to displace actuator arm 114 to disengage the deadlock state and/or open the locking element 108 towards its unlocked position, while a reverse motion of the release mechanism (counterclockwise as viewed here from above) can occur without motion of the actuator arm.

According to certain particularly preferred implementations, actuator arm 114 and the release mechanism are both pivotally mounted so as to be pivotable about a common pivot axis 116. Where the release mechanism is combined with the locking-actuation lever 112, this too preferably shares common pivot axis 116 with the actuator arm 114 and the release mechanism. In the case of a pivotally mounted locking element 108, a pivot axis 128 of the locking element is most preferably also parallel to, and spaced from, the common pivot axis 116.

Figures 8A, 8B, 8C, 8D:
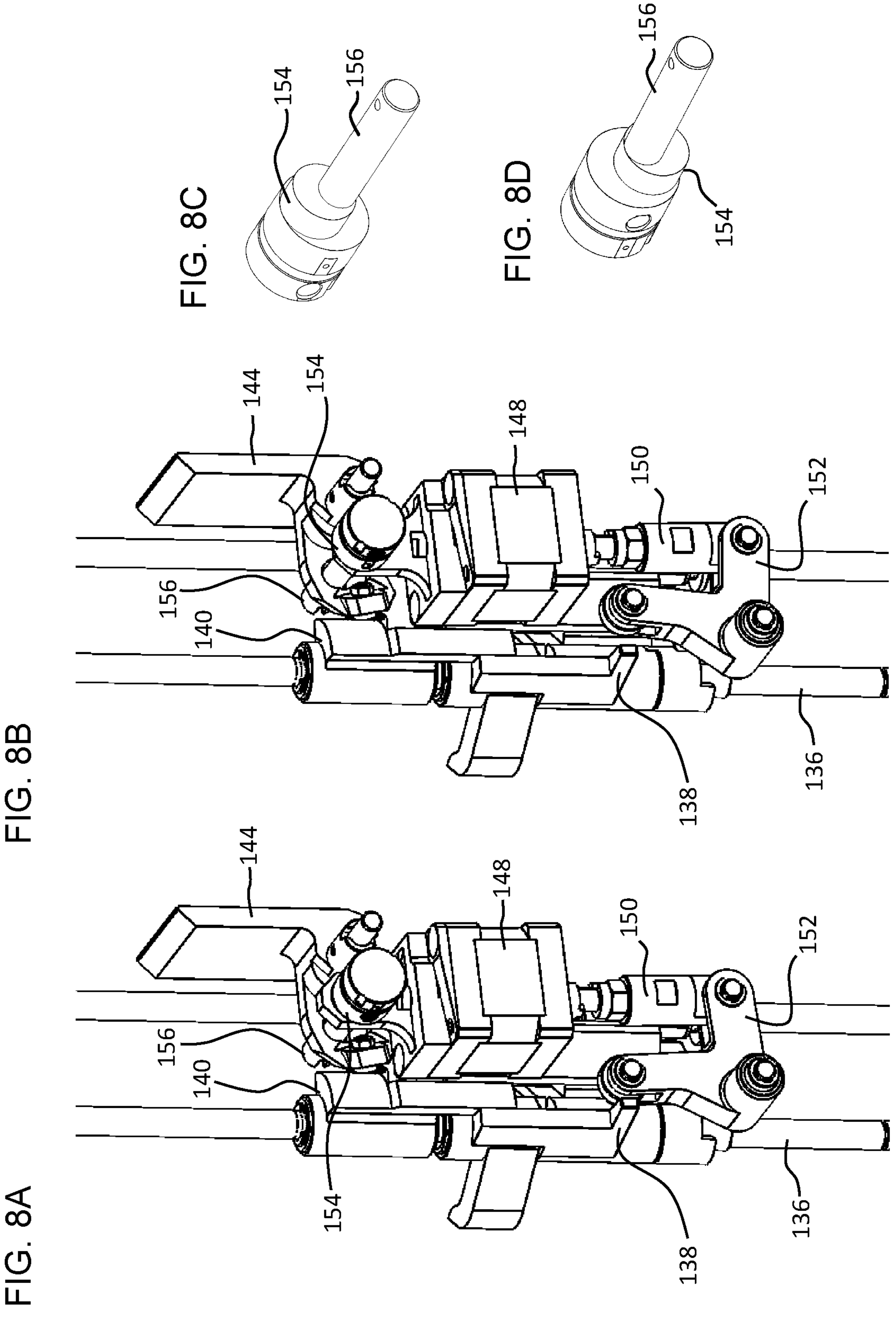
FIGS. 8A and 8B are isometric views of a release mechanism from the apparatus of FIG. 1A, showing a power actuator in an enabled state and a disabled state, respectively.
FIGS. 8C and 8D are enlarged isometric views of an eccentric adjustment mechanism from FIGS. 8A and 8B in positions corresponding to the enabled and disabled states, respectively.

The provision of a unidirectional ("one-way") linkage between the release mechanism and the actuator mechanism for unlocking the locking element provides a number of significant advantages for implementation of the apparatus of the present invention. Firstly, it facilitates the use of a plurality of different lock releaser mechanisms which can be operated individually without any direct mechanical dependence between these mechanisms. For this purpose, the release mechanism preferably further includes a number of inputs, in the form of arms 138 or other input surfaces 140 or linkages, associated with rotatable rod 136 to allow pivoting of the release mechanism about pivot axis 116 by each of a number of corresponding manually or electrically operated lock releaser, such as a manually operated handle 142 on panel 104 (see FIG. 9), a manually operated handle 144 on strike jamb 102 (see FIGS. 8E and 8F), a key-operated lock cylinder 146 (FIG. 10), and a powered actuator 148 (FIG. 8A), each deployed to displace the corresponding input so as to rotate pivot axis 128 and operate the release mechanism.

The operation of each of these lock releasers is largely self-explanatory. As seen best in FIG. 8A, powered actuator 148, which may be a linear motor, a solenoid, a hydraulic actuator, a pneumatic actuator or any other suitable actuator, is here attached to an upper anchoring point, and is selectively actuated to shorten a downwardly extending output shaft 150. The vertical line of action is typically preferred due to compactness of implementation in a strike jamb. Translation of this vertical motion into horizontal force on input arm 138 is achieved using a rocker linkage 152, so that raising (shortening) of the output shaft generates a pushing force on input arm 138, thereby rotating the release mechanism to unlock the panel.

In certain cases, it may be desirable to provide an override mechanism for the event that the powered actuator 148 might fail and become stuck in its actuated position. For this purpose, the "fixed" anchor of the actuator (here at the top) may be mounted on an adjustable mount, here implemented as an eccentric core 154 supported on a horizontal pin 156. In the normal position (FIGS. 8A and 8C), the powered actuator 148 is supported "correctly" positioned so that the range of motion of output shaft 150 selectively actuates or releases the input arm 138. In case of failure of the actuator in a retracted state, or if it is desired for any other motion to cancel the powered actuator option for unlocking the panel, rotation of pin 156 displaces eccentric core 154 to the position of FIGS. 8B and 8D, thereby lowering the anchor of the actuator and distancing rocker linkage 152 from input arm 138 such that, even in the actuated state, the powered actuator does not have a range of action that would actuate the release mechanism. Access to adjustment of pin 156 may, for example, be by use of the tip of a key from an inward-facing surface of the door frame, accessible only when the panel is open. Clearly, a similar mechanism to eccentric core 154 but calibrated differently may be used for a manual override to actively actuate the release mechanism.

Figure 8F:
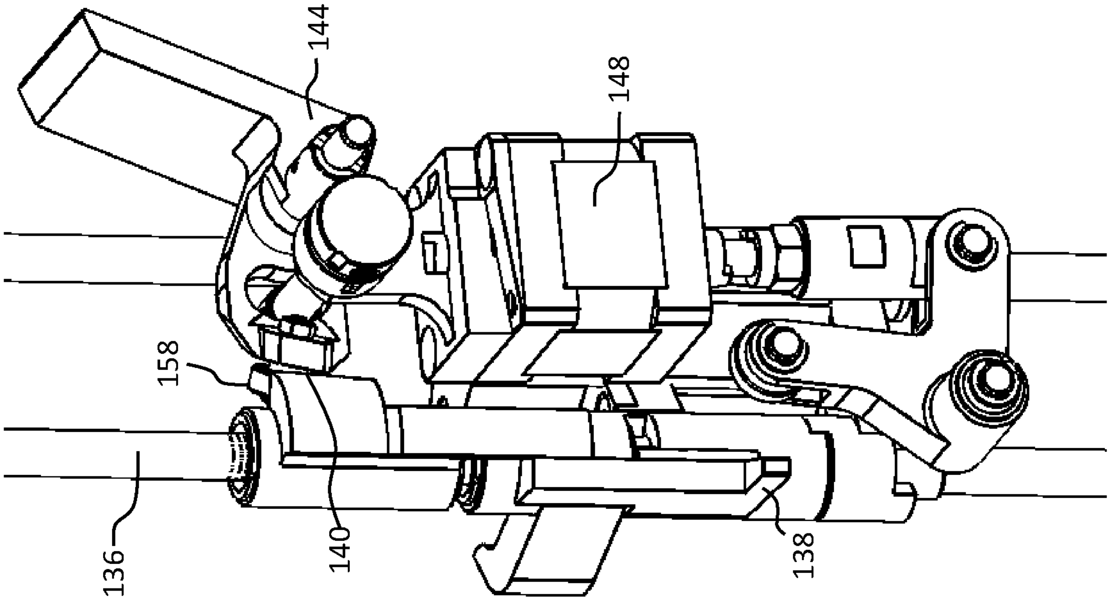
FIGS. 8E and 8F are isometric views similar to FIG. 8A illustrating the operation of a manual handle on the strike jamb of the apparatus.
Figure 8E:
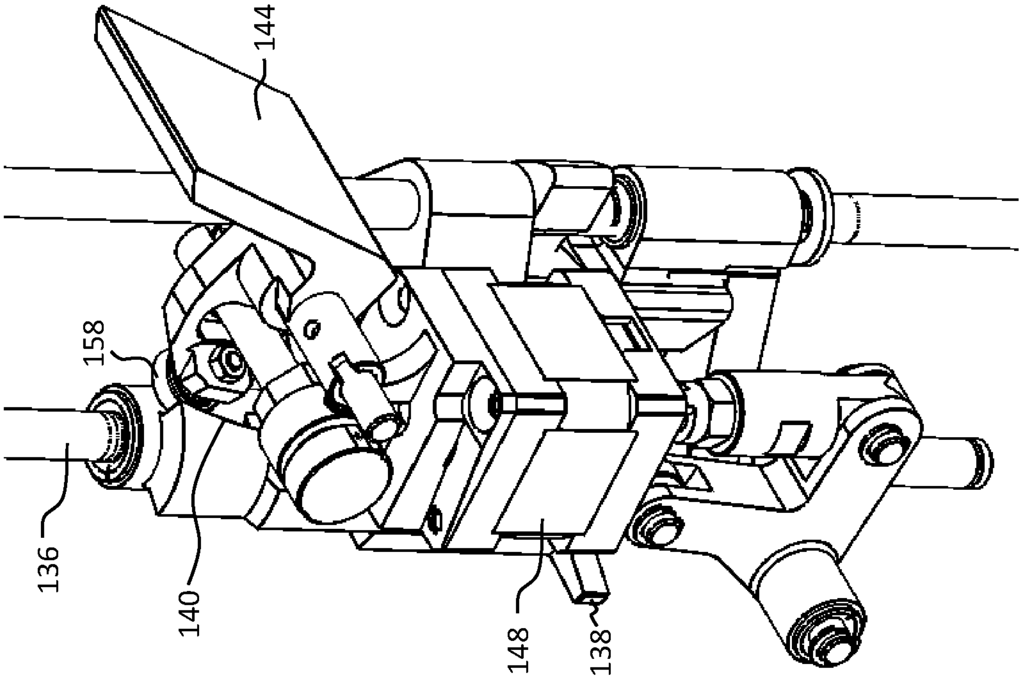

FIGS. 8E and 8F illustrate the operation of manual handle 144, which is preferably independent of the powered actuator and acts directly by pressing a roller 158 against a helical actuation input surface 140, thereby rotating rod 136 to unlock the panel.

Figure 9:
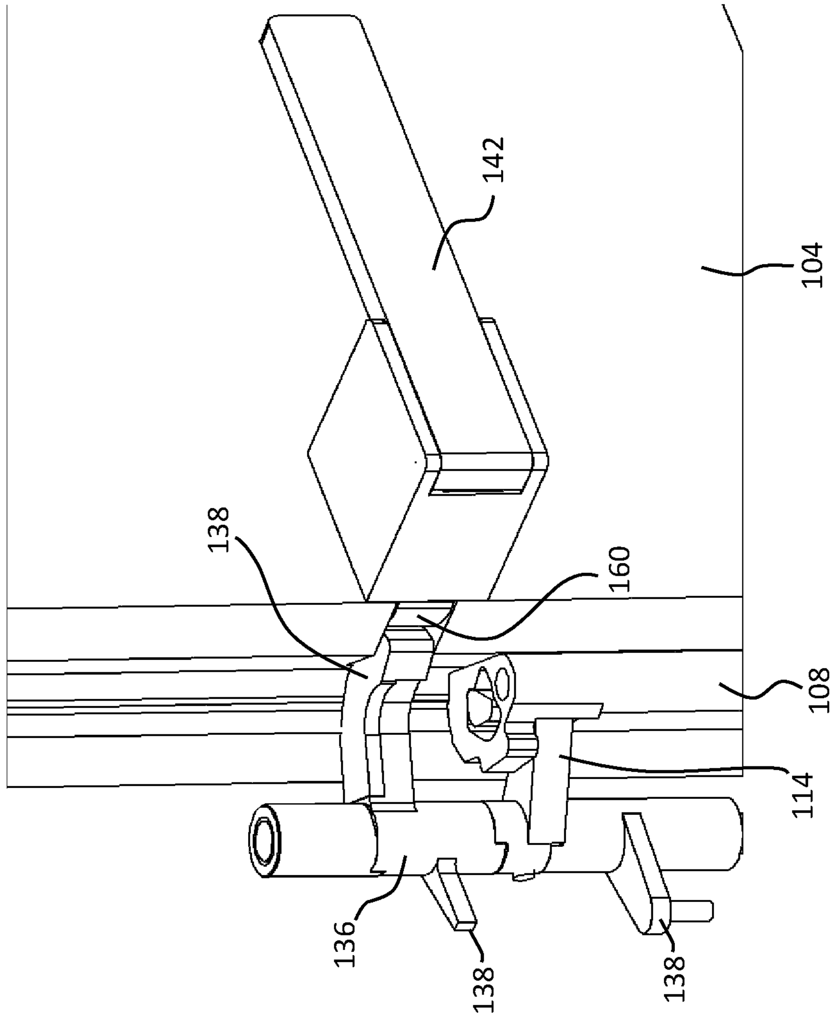
FIG. 9 is an isometric view of another part of the release mechanism illustrating operation of a manual handle mounted on the panel of the apparatus.
Figure 11A:
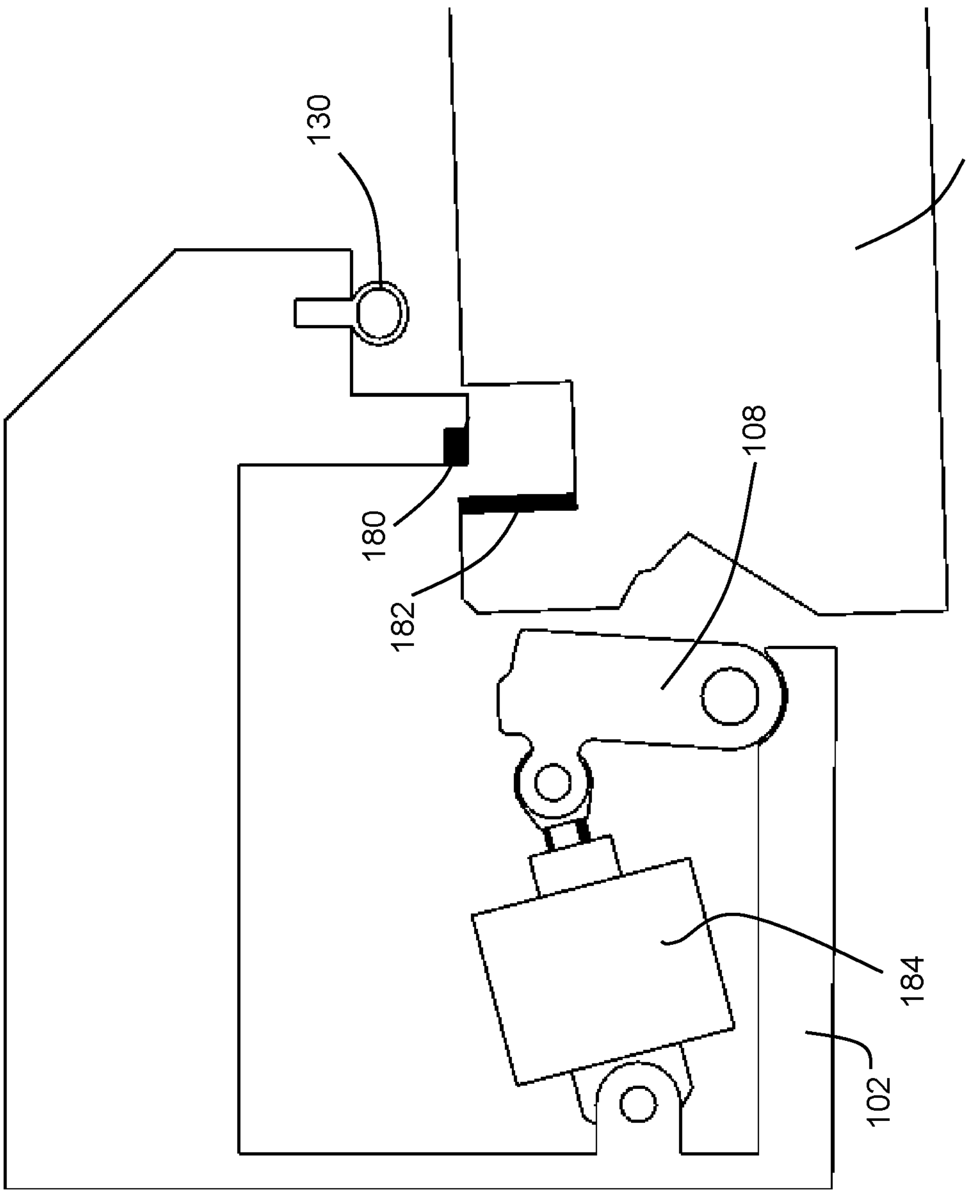
FIGS. 11A-11E are a sequence of horizontal cross-sectional views taken through an alternative implementation of the apparatus of FIG. 1A, illustrating stages during a closing motion of the panel.
Figure 11C:
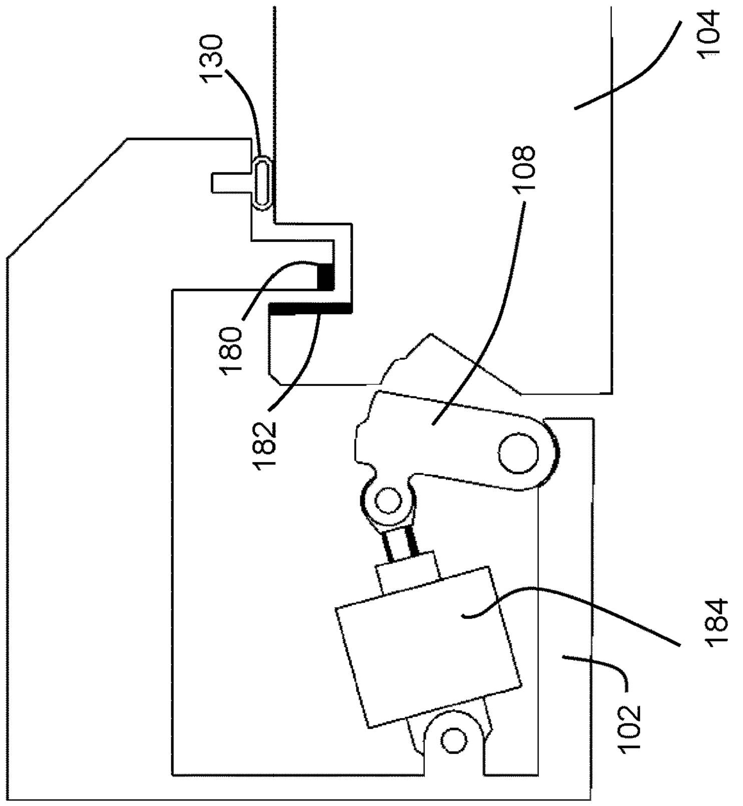
Figure 11B:
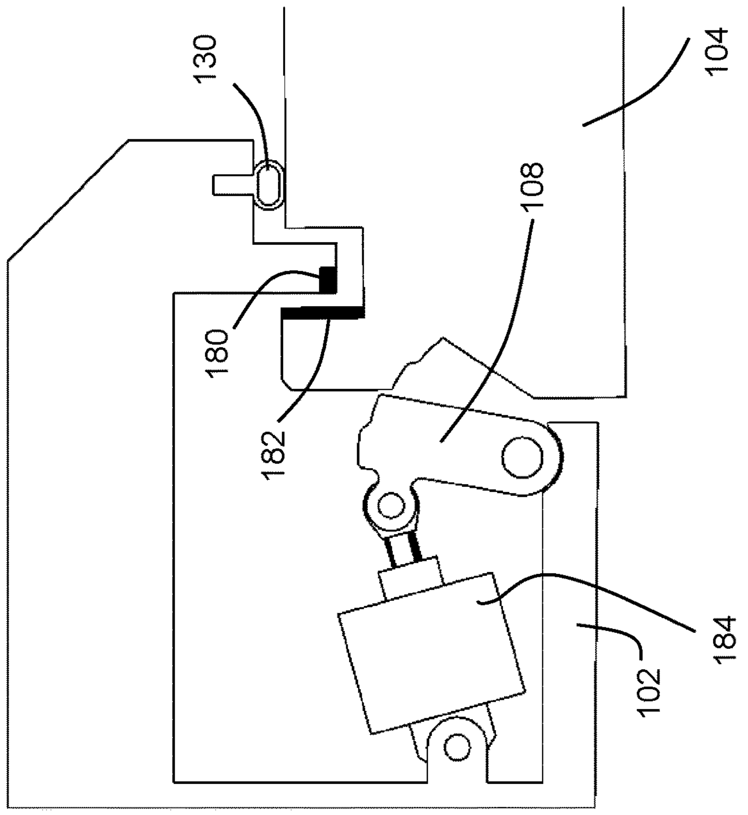
Figure 11E:
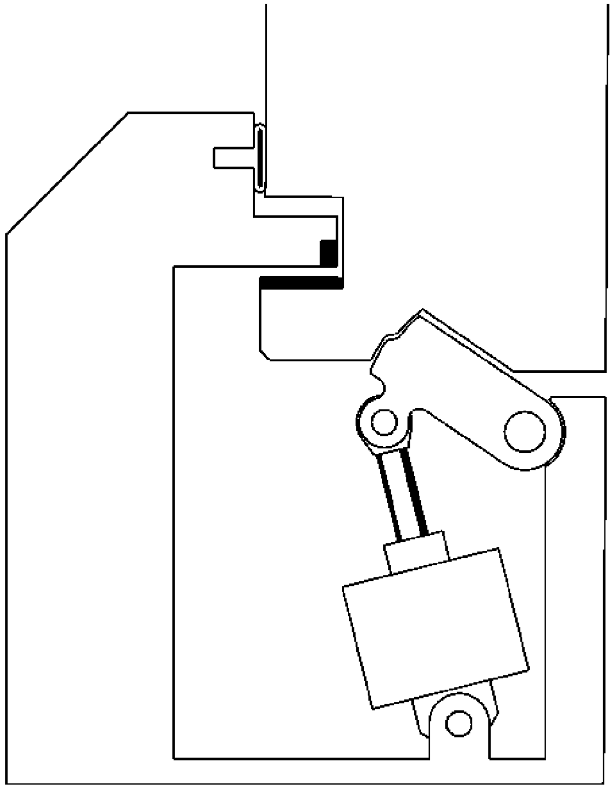
Figure 11D:
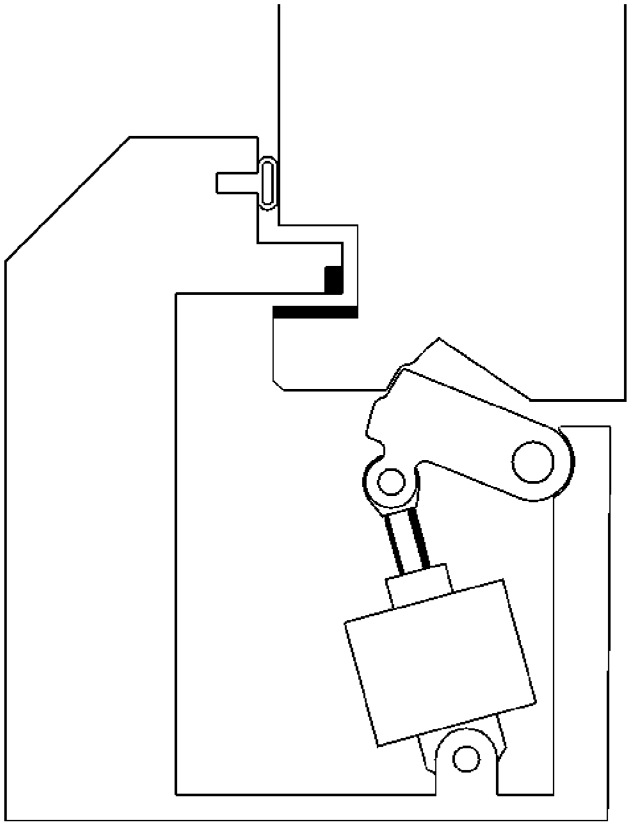
Figure 12A:
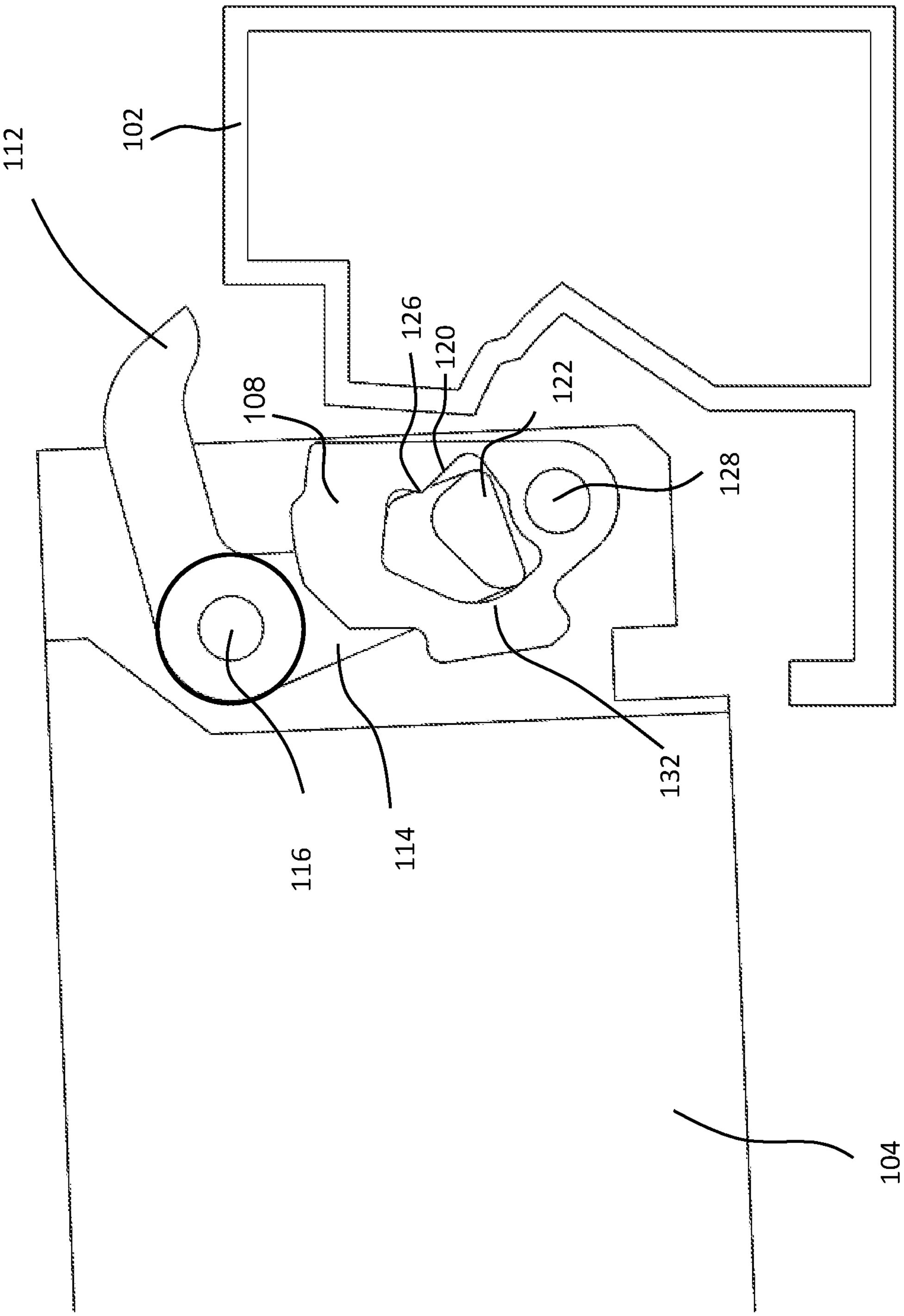
FIGS. 12A-12F are a sequence of horizontal cross-sectional views taken through a locking configuration similar to that of FIG. 2 integrated into the panel of the apparatus during a closing motion of the panel.
Figure 12C:
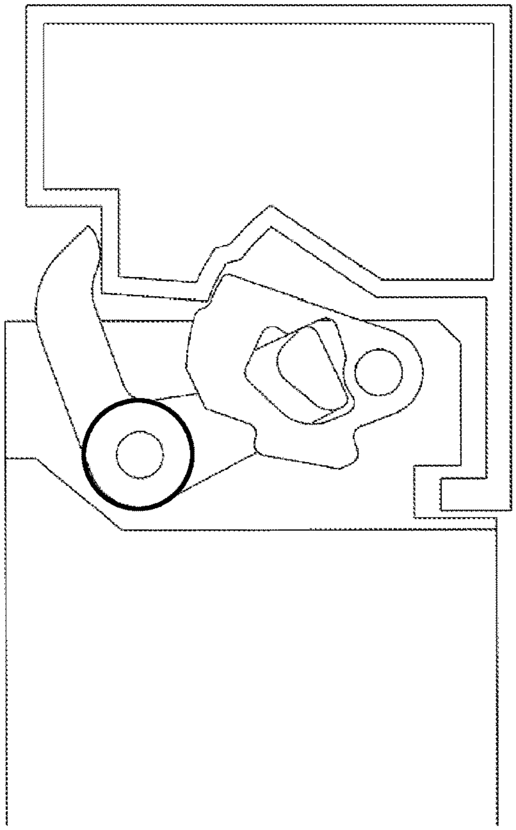
Figure 12B:
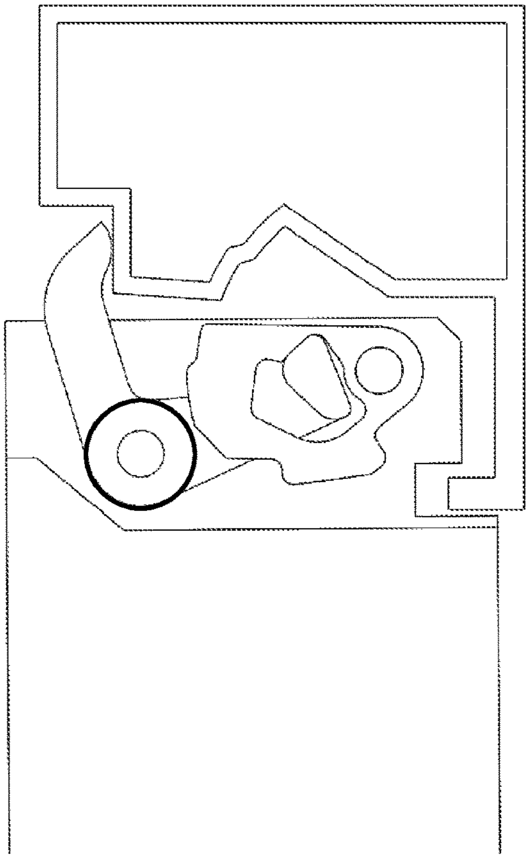
Figure 12E:
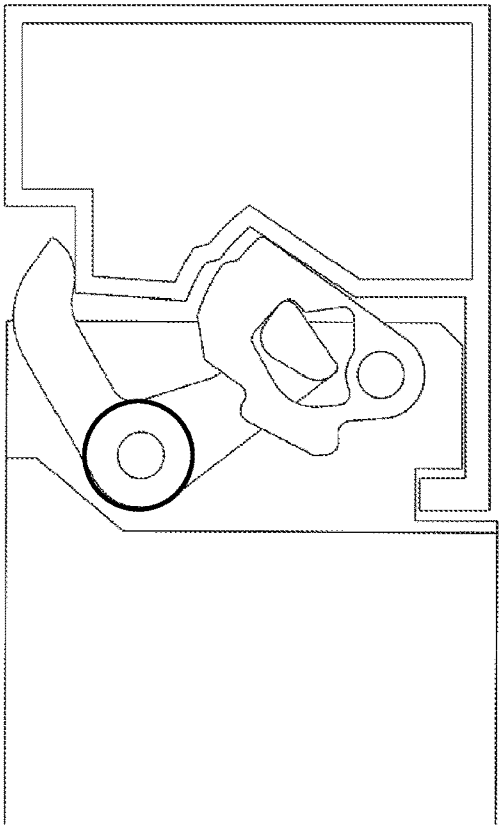
Figure 12D:
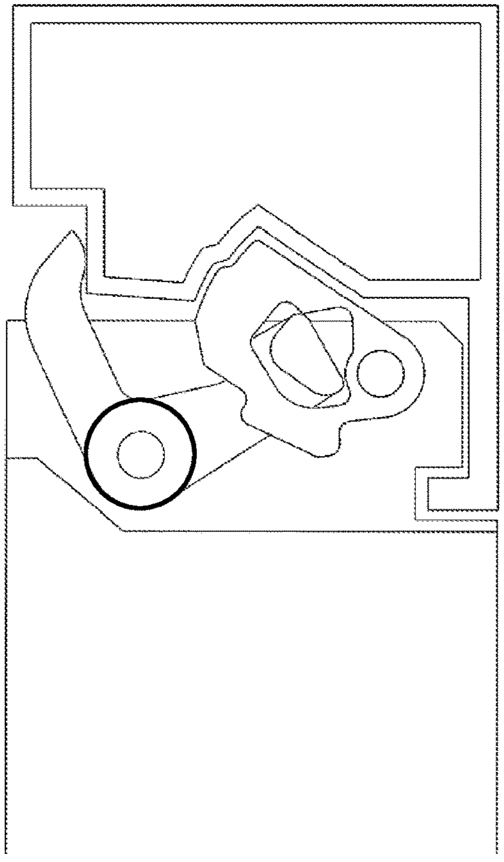
Figure 12F:
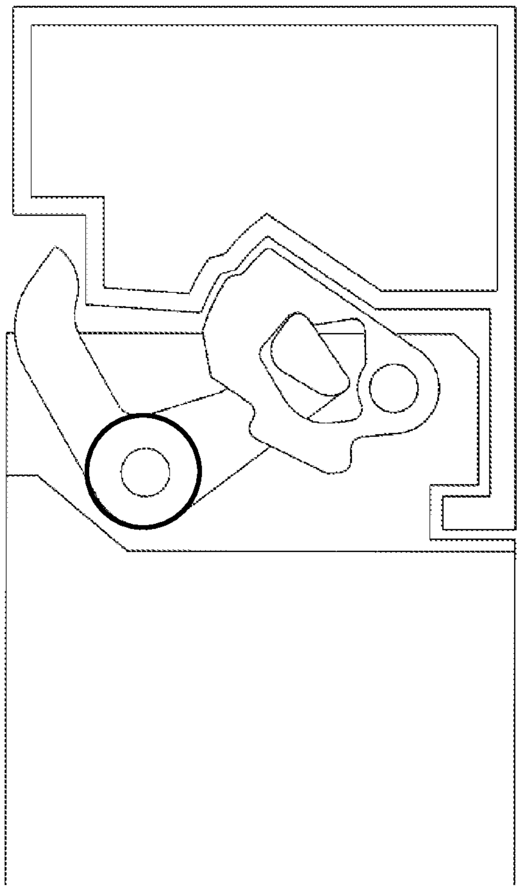
Figure 13B:
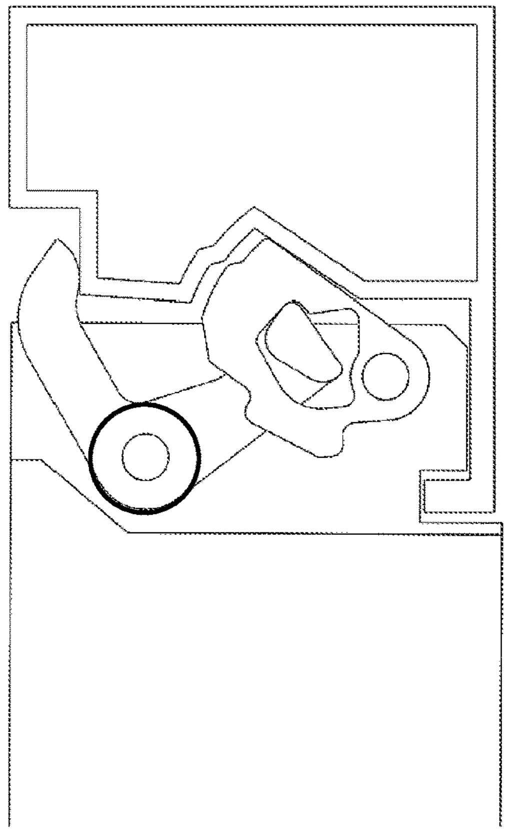
FIGS. 13A-13D are a sequence of views similar to FIGS. 12A-12F during unlocking of the panel.
Figure 13A:
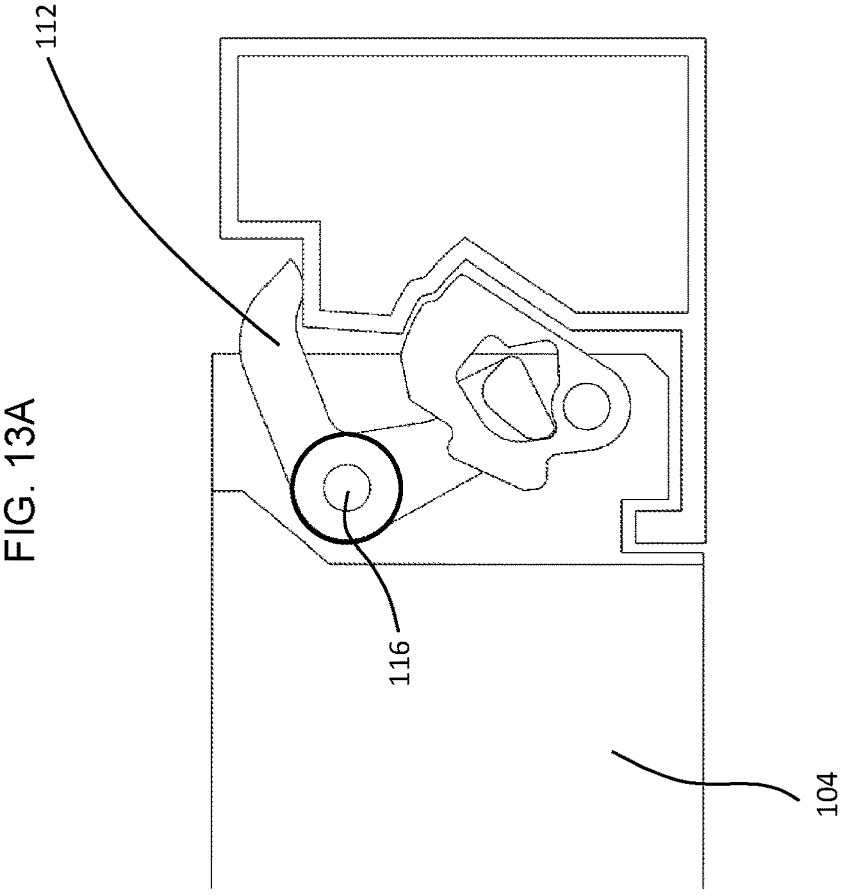
Figure 13D:
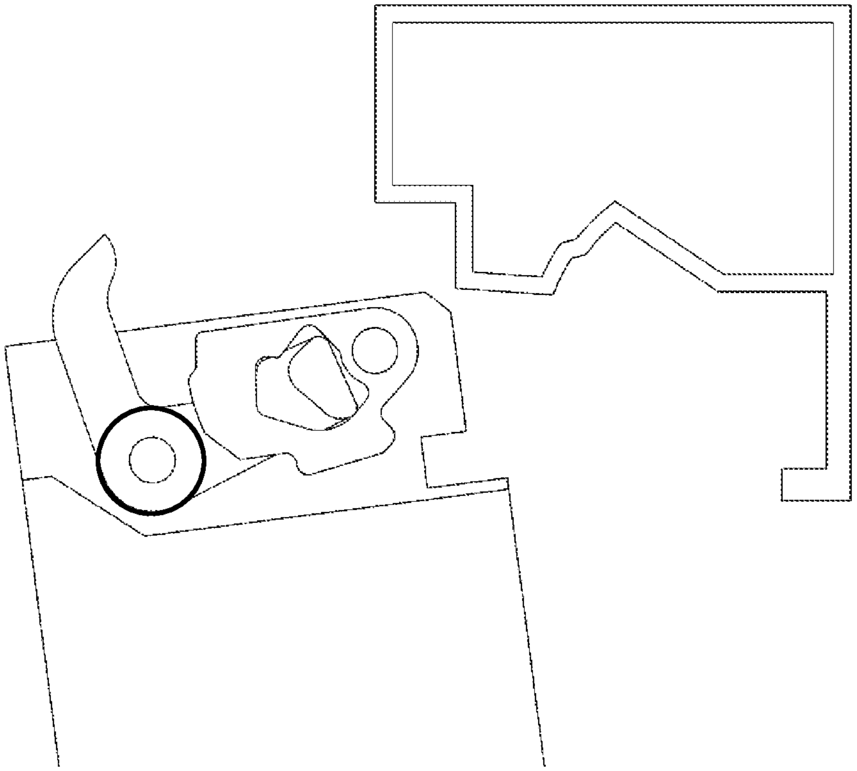
Figure 13C:
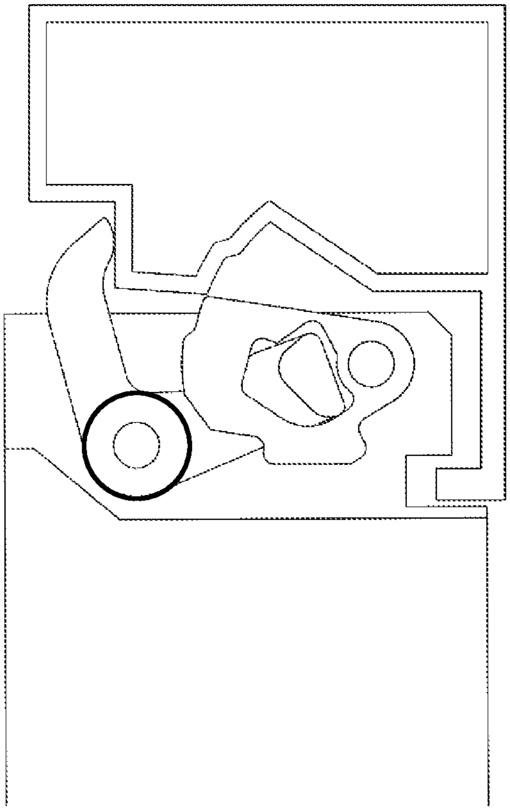

FIG. 9 illustrates how handle 142 mounted on panel 104 may interact with a release mechanism mounted in strike jamb 102. In the example illustrated here, an appropriately shaped input arm 138 extends through a slot in the locking element 108, or in a gap between adjacent locking elements 108, and is acted on by an extensible tongue 160 which is extended when handle 142 is pulled, and displaces input arm 138 to rotate the release mechanism rod 136.

Figure 10:
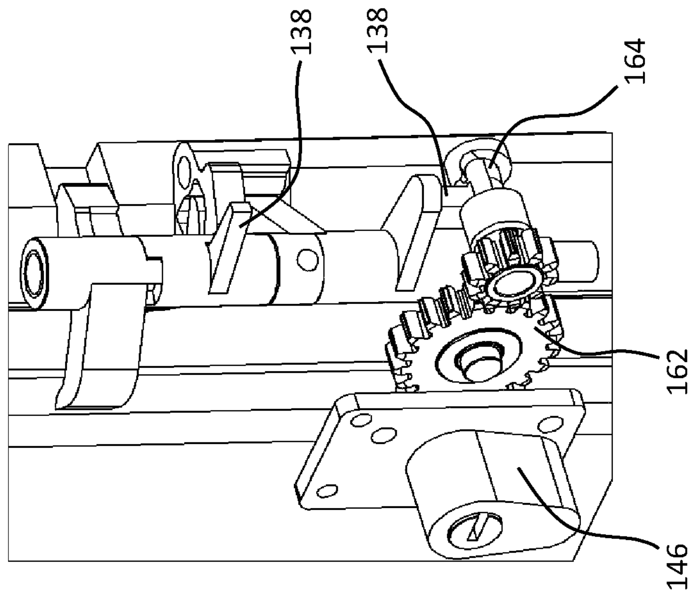
FIG. 10 is an isometric view of another part of the release mechanism illustrating operation of a key-operated cylinder mounted on the strike jamb of the apparatus.

FIG. 10 illustrates linkage of a lock cylinder 146 to an input arm 138, in a non-limiting exemplary configuration via one or more gear wheels 162 and a worm gear type helical actuator 164.

Multi-Level Locking

A further advantage of the unidirectional linkage of the release mechanism arises in the use of multi-level locking, where a plurality of locking elements are arrayed along the edge of the strike jamb or panel, such as is illustrated in FIG. 1B. By using a single release mechanism with a one-way (unidirectional) linkage to each locking element 108, operation of the release mechanism is effective to displace all of the plurality of locking elements from the locked position to the unlocked position, thereby releasing locking of the panel. At the same time, as a result of the one-way linkage, direct displacement of one of the locking elements from the locked position to the unlocked position, for example, through an unauthorized attempt to open the panel by force, does not actuate the release mechanism, and thus does not displace another of the plurality of locking elements away from the locked position.

The above multi-level locking implementation may be used to advantage in a wide range of implementations, not limited to an arrangement of spatially synchronous locking, or to an arrangement that has deadlock functionality. However, certain particularly preferred implementations combine the multi-level locking configuration with the above-described spatially-synchronous locking mechanism, most preferably also providing deadlock functionality which is released by the release mechanism. In the case of locking that is synchronous with the panel motion, each locking element 108 may advantageously be provided with a corresponding lever 112 and actuating arm 114 so that each level is reliably and independently locked on closure of the panel. The arrangement of multiple levers 112 is preferably referred to collectively as the synchronous displacement mechanism of the apparatus. The release mechanism remains common to all of the locking elements in order to allow simultaneous release of all of the locking elements by any one of the authorized lock releasers, as described above.

It is noted that the different levels need not be identical, both in terms of the locking element configuration and in terms of the actuating configuration. For example, if certain regions of a panel need to accommodate a greater degree of temperature-gradient related warping of the panel than other regions, the locking element(s) deployed in those regions may be configured to provide enlarged clearance between the locking element and the facing surface of the panel or strike jamb, while a locking element in a low-warping region may be provided with a smaller clearance gap, or no clearance gap. One variation of this concept is an “active spacer” element, as will now be described with reference to FIGS. 5A(1)-6E(2).

Active Spacer

According to further aspect of the present invention, a displaceable spacer 166 is provided, preferably at a level above, below or between the other locking element(s) 108. For clarity of presentation, each of FIGS. 5A-6E is split between a left view (1) and a right view (2) which are taken at different levels so as to show the state of the displaceable spacer 166 and the corresponding state of locking element 108, respectively, at each stage of operation.

Mechanically, displaceable spacer 166 may be regarded as an alternative locking element, also driven by a corresponding actuator arm 168 including, by way of example, a pin 170 which engages a corresponding slot 172 in displaceable spacer 166, but with shaped different from that of locking element 108, thereby defining a different spatial synchronization motion of the displaceable spacer, as detailed below. Here too, actuator arm 168 is pivotable about axis 116 and is driven in the locking direction by a lever 112, which may be a dedicated lever or may be shared with locking element 108.

As described above and shown here in FIGS. 5A(2)-5D(2), locking element 108 preferably reaches its fully locked position at a first point during closure FIG. 5D(2), and further motion of the panel engages the deadlock configuration (FIGS. 5E(2)-5F(2)). In contrast, the displacement profile of displaceable spacer 166 is configured such that displaceable spacer 166 is displaced during the further part of the closing motion, from FIG. 5D(1) through FIG. 5E(1) to FIG. 5F(1), so that the displaceable spacer is interposed between surfaces of the panel and the strike jamb to prevent the panel from returning to the position of FIG. 5D(1). This effective reduces the free motion of the panel in the locked state, and maintains an increased clearance during normal operation between the panel and the locking elements, thereby accommodating a large degree of thermal warping, misalignments etc. Any residual free motion may optionally be taken up by a resilient biasing element (e.g., seal) 130, as described above.

It will be noted that displaceable spacer 166 may contribute to locking of the panel, but is not deadlocked. Since its function is primarily as a spacer, it may optionally be formed from low-friction material, and may have a small contact area. The higher level of deadlocked security is still provided by the remaining one or more locking elements 108 as described above, which preferably remain non-contact elements which do not contact the panel until or unless a large load is applied to strain the panel.

The opening sequence for displaceable spacer 166 is also fully analogous to that of locking elements 108, and will be self-explanatory from the views of FIGS. 6A(1)-6E(1).

Bistable Spring

In certain particularly preferred implementations of the present invention, the synchronous displacement mechanism in its variant forms described thus far is implemented with a bistable spring configuration biasing the synchronous displacement mechanism to assume either a releasing state or the deadlock state. Although the positive displacement achieved by the action of lever(s) 112 typically results in effective deployment of the locking elements without reliance on any springs, presence of a bistable spring configuration is believed to provide useful additional safeguards and functionality. Firstly, in the open state of the lock, when the panel is open and away from the strike jamb, the bistable spring mechanism preferably ensures that the locking elements (108) are retained in a well-defined retracted and unlocked state, allowing for subsequent closing of the panel without rubbing against the locking elements.

The bistable spring configuration has an intermediate tipping point that is preferably chosen such that the synchronous displacement mechanism moves through the intermediate tipping point during closing of the panel no later than when the panel reaches the closed position, and preferably before the panel reaches the closed position. This helps to ensure that, even if the panel is moved very slowly towards closure, and is even stopped just before fully closed, the locking mechanism will still fully engage.

Figure 7B:
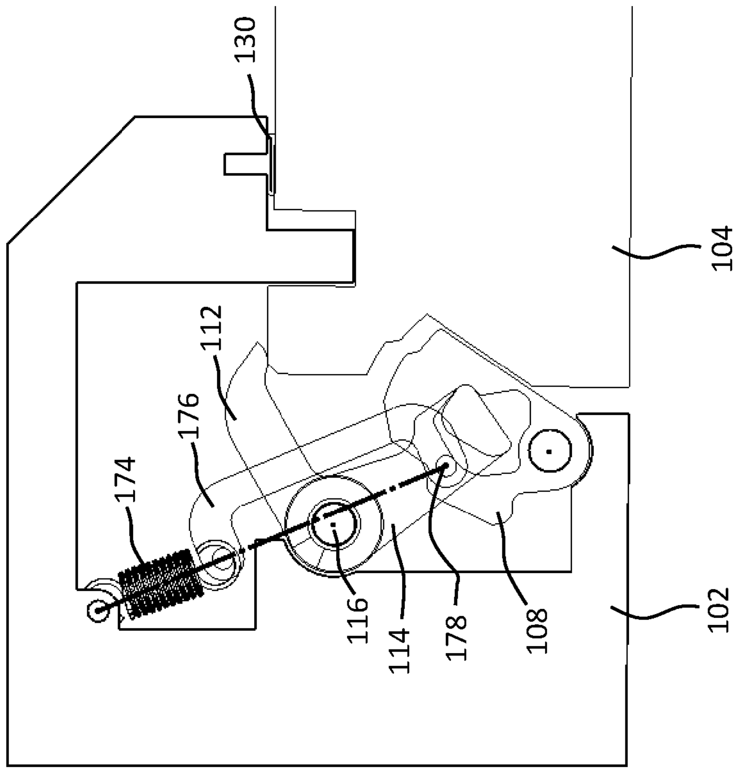
FIGS. 7A and 7B are horizontal cross-sectional views similar to FIG. 3A illustrating a bistable spring configuration in a first and a second state, respectively.
Figure 7A:
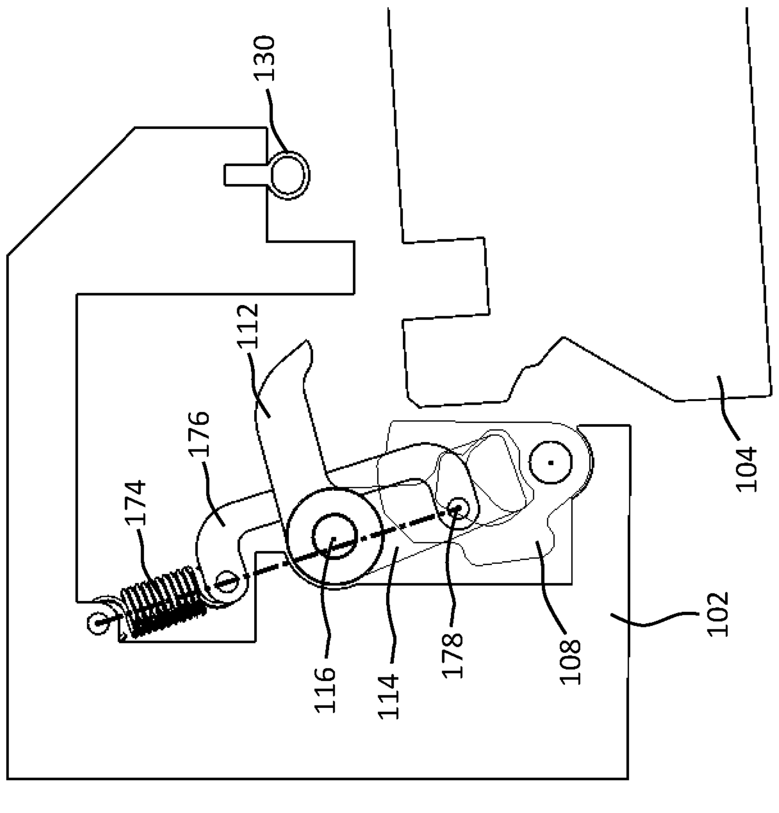

FIGS. 7A and 7B illustrate schematically an implementation of a bistable spring configuration, implemented with a spring 174 anchored to strike jamb 102 at one end and connected via a bracket 176 to an anchoring point 178 on actuator arm 114. As shown by a dashed line, the line of action of tension in spring 174 flips between opposite sides of pivot axis 116 thereby biasing actuator arm 114 to one extreme of its motion or the other. Clearly, equivalent functions can be achieve with other configurations, such as by replacing tension spring 174 with a compression spring mounted on the opposite side of the pivot axis, all as will be clear to one ordinarily skilled in the art.

Variant Implementations

Although the actuating mechanism of the various implementations illustrated thus far have all been shown using a simple single actuator arm 114, alternative actuating mechanisms, such as an actuator arm with an associated connecting link (not shown) forming an over-center locking configuration in the deadlock state, may also be used.

Similarly, the synchronous displacement mechanism need not be implemented mechanically. In certain preferred implementations, the synchronous displacement may be achieved instead by use of a suitable actuator, which may be a linear actuator or motor which may be electrically, hydraulically or pneumatically powered, and which may be subject to electrical control or, in some cases, controlled by a hydraulic circuit.

By way of one non-limiting schematic example, FIGS. 11A-11E illustrate an implementation of the synchronous displacement aspect of the present invention in which a sensor arrangement includes at least one sensor 180 deployed for sensing a relative position of panel 104 relative to strike jamb 102 prior to the panel reaching the closed position. Sensor 180 may be implemented as any suitable sensor that is capable of determining a plurality of positions, or a continuous measurement of positions, of the panel relative to the strike jamb, at least during a terminal part of the closing motion. In the example illustrated here, sensor 180 is a reader (typically optical or magnetic) which cooperates with a corresponding encoder track 182, where the reader and the encoder track are located on facing surfaces of the strike jamb and the panel (or elsewhere in the region surrounding the panel). Other examples of suitable sensors include, but are not limited to, proximity sensors, range sensors, and microswitches.

An electrically controllable actuator 184 is linked to locking element 108 and configured to selectively displace the locking element between the locked position and the unlocked position. A controller (not shown) is associated with the sensor arrangement and with electrically controllable actuator 184, and is responsive to sensing of at least part of a closing motion of the panel from the open position towards the closed position to initiate a motion of the locking element towards the locked position during the closing motion of the panel prior to the panel reaching the closed position. An example of a suitable actuation profile is illustrated in FIGS. 11A-11E.

While all of the implementations illustrated thus far have shown the locking element 108 associated with the strike jamb 102, it should be noted that alternative embodiments in which the structure is reversed, with locking element 108 mounted to panel 104 also fall within the scope of the present invention. By way of one basic exemplary implementations, FIGS. 12A-12F illustrate the closing and locking sequence of such an embodiment, resulting in a closed, locked and deadlocked panel closure, while FIGS. 13A-13D illustrate the unlocking and opening sequence. Details of the releasing mechanism are omitted for simplicity of presentation.

The structure and function of this implementation, as well as variations thereof according to the various features described herein above, will be clear to a person ordinarily skilled in the art by direct analogy to the strike jamb-mounted implementation.

The above-described implementations in which the stop-latch and actuating linkage undergo a simple pivotal motion about a common axis is believed to be particularly advantageous due to its simplicity and reliability. It is noted however that implementations of the present invention also encompass arrangements with equivalent functionality where the stop-latch undergoes a different type of motion, such as a linear motion or a more complex non-linear motion. In each case, a suitable actuation linkage structure can readily be designed to actuate the motion on the basis of the last part of the closing motion of the panel.

Similarly, the motion of the locking elements of the present invention is not limited to pivotal motion, and may in some cases be a linear sliding motion, or other more complex or compound motions.

Ratchet-Based Synchronous Displacement Configuration

As a further variant of the synchronous displacement configurations discussed thus far, deadlock functionality can be further enhanced by providing the locking element 108 with an integrated ratchet configuration, thereby ensuring reliable securing of locking element 108, and locking of the panel, as soon as even partial overlap is achieved between the panel and the locking element. An exemplary implementation of this aspect of the invention is illustrated schematically in FIGS. 14A-14E.

Specifically, as before, a locking element 108 is deployed synchronously during closing of the panel (FIGS. 14A through 14C) by lever 112 which pivots actuator arm 114 which has a pin 122 engaged in a slot 124. The pin and slot here are preferably a simple pin and slot configuration which do not need to provide any deadlock functionality, and which typically cause the locking element to complete its locking motion when the panel reaches its fully closed position. In the implementation illustrated here, a sequence of teeth 186 formed on the locking element 108 pass across a spring-loaded pawl 188 during displacement of the locking element towards its locked position, thereby securing the locking element in a sequence of positions against retraction towards its unlocked position.

Clearly, the ratchet arrangement may be reversed to use an external ratchet track which engages a single detent on the locking element. Similarly, various toothless ratchet configurations, optionally with a continuum of locking positions, may be used.

Figure 14A:
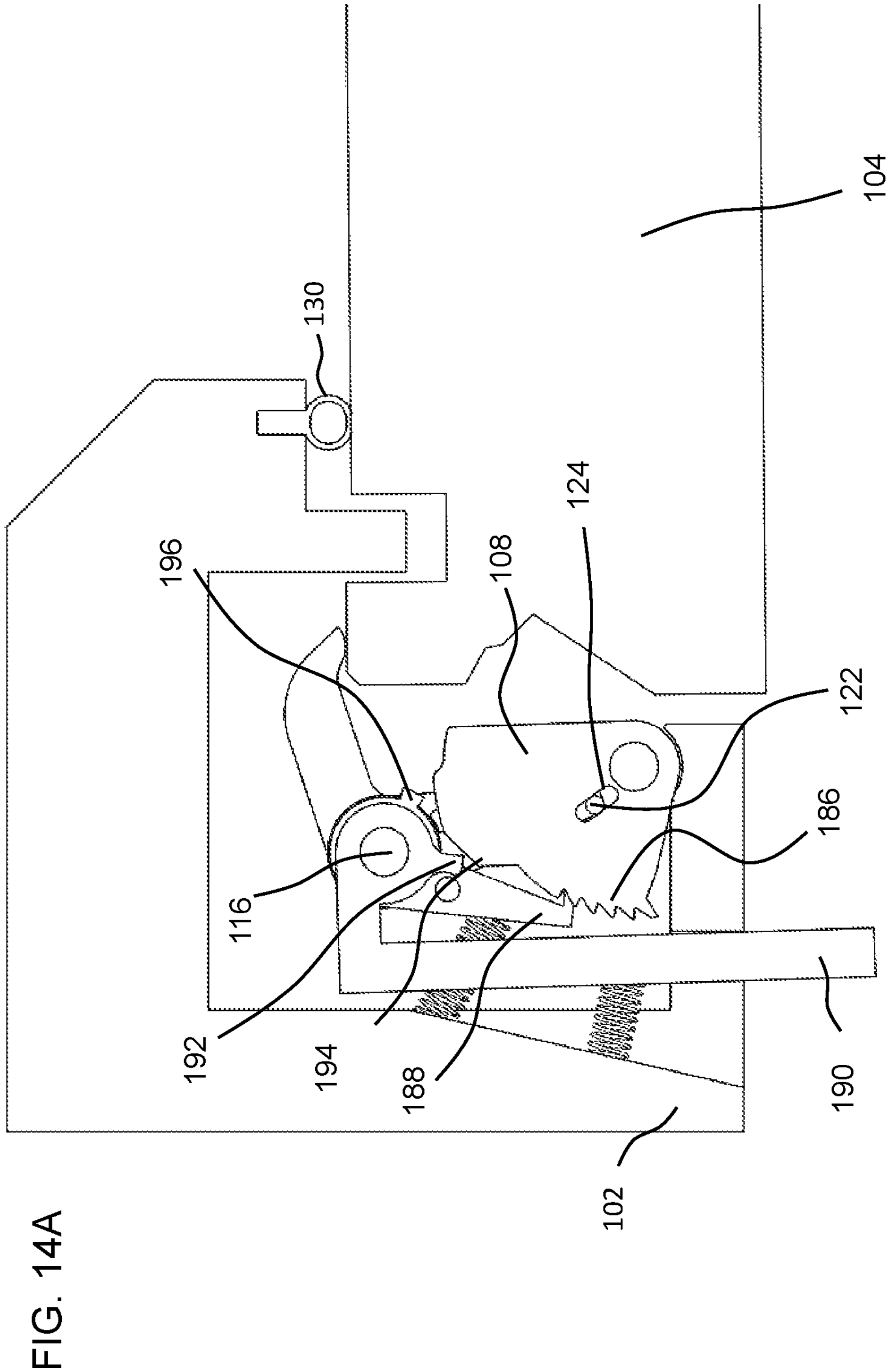
FIGS. 14A-14C are a sequence of horizontal cross-sectional views taken through an alternative implementation of a locking configuration of the apparatus of FIG. 1A employing a ratchet-based deadlock, during a closing motion of the panel.
Figure 14C:
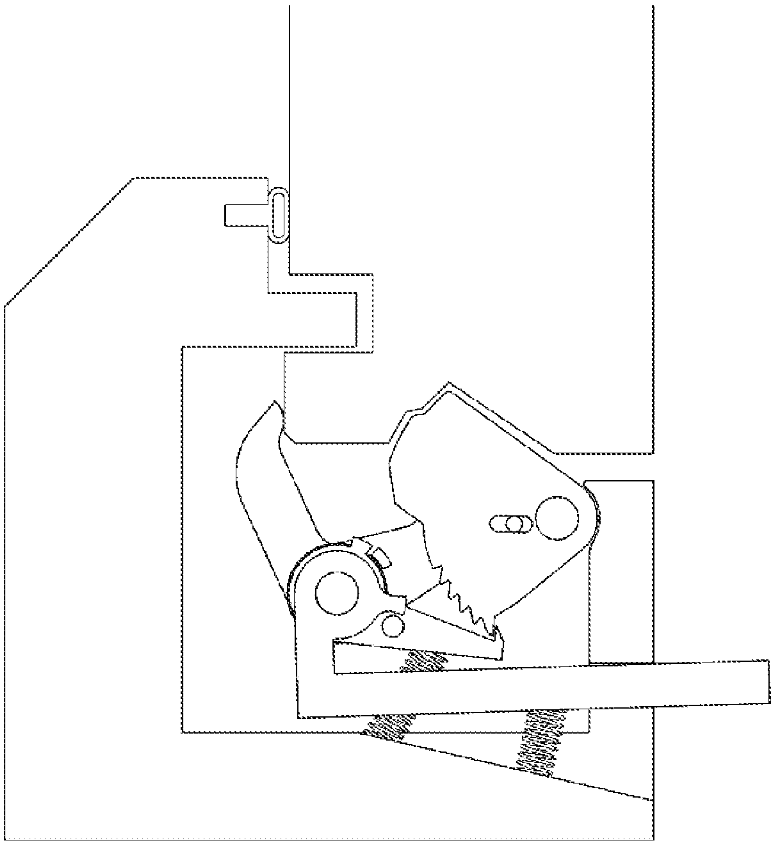
Figure 14B:
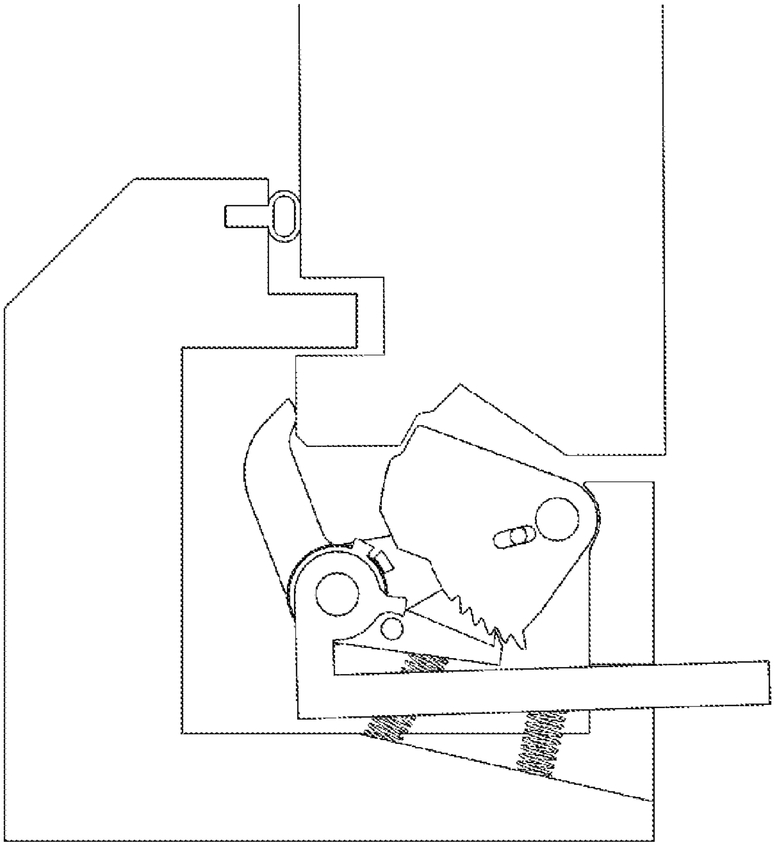
Figure 14E:
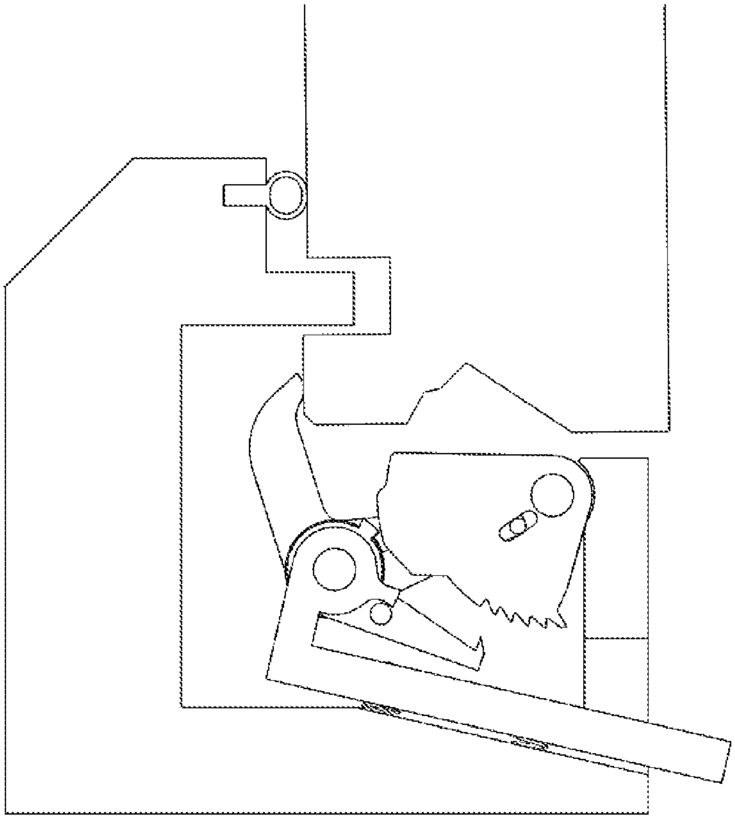
FIGS. 14D and 14E are a sequence of views similar to FIGS. 14A-14C during unlocking of the panel.
Figure 14D:
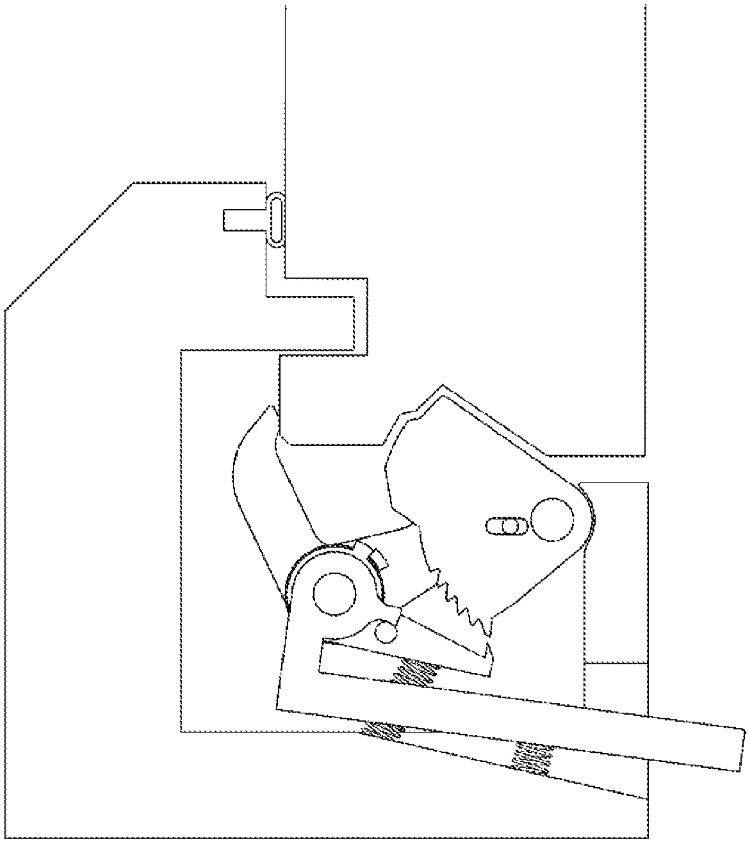

For the purpose of illustration, this implementation is shown with a manually operable unlocking handle 190, pivotable about axis 116 which has a first feature 192 for engaging a feature 194 of pawl 188 so as to disengage the pawl, and a second feature 196 for engaging a complementary feature of actuator arm 114 so as to actuate retraction of locking element 108 to its unlocked state (FIGS. 14D-14E).

Manually operable handle 190 may be supplemented, or replaced, by the various release mechanisms discussed above, so long as the release mechanism is provided with suitable engagement features for sequentially releasing pawl 188 and actuating actuator arm 114 in the retraction direction.

Basic Ratchet Embodiment

While the integrated ratchet of FIGS. 14A-14E may be used to advantage in the context of a synchronous displacement configuration, as presented above, use of a ratchet arrangement to provide a progressive deadlock effect, i.e., where a locking element is retained against retraction at a sequence of stages of engagement, or along a continuous range of states of engagement, is believed to be widely applicable to a large range of applications. By way of a further example, FIGS. 15A-17 illustrate various states of an exemplary but non-limiting implementation of a lock mechanism with a ratchet-based deadlock, constructed and operative according to an embodiment of the present invention.

The lock mechanism operates in the context of a panel 12 (typically a door or a window) with a locking element 14 which is pivotally mounted relative to a frame 10 so as to pivot about an axis parallel to the adjacent edge of the panel. Thus, in the examples illustrated here, a panel lock assembly ("an apparatus") is implemented in the context of an opening bounded by a frame 10 including a strike jamb (the part of the frame shown in the horizontal cross-sectional views of FIGS. 15A-16D), and a panel 12 mounted relative to the opening so as to be displaceable between an open position in which the panel is separated from the strike jamb to leave at least part of the opening open and a closed position in which the panel closes against the strike jamb. A locking element 14 is pivotally mounted on the frame about a pivot axis 32 (visible from FIG. 15D onwards) and displaceable between a locked position (FIGS. 15A-15C) in which the locking element is engaged with the panel, thereby locking the panel to the frame, and an unlocked position (FIGS. 15D-15L) in which the locking element is disengaged from the panel, thereby unlocking the panel from the frame.

It is a particular feature of certain preferred embodiments of the present invention that a ratchet configuration is used to provide a latched (or "deadlock") locked state in which the locking element is prevented from being displaced to its unlocked position by force applied directly to the locking element. The use of a ratchet is particularly advantageous in that a sequence of teeth engage in a sequence of positions of the locking element during movement to the locked position, thereby ensuring reliable locking of the panel as soon as even partial overlap is achieved between the panel and the locking element.

This principle may be implemented in a wide range of mechanical configurations, and using a wide range of different actuation mechanisms for disengaging the ratchet and displacing the locking element to its unlocked position when the panel is to be opened. In a particularly preferred subset of embodiments, the ratchet configuration includes a set of ratchet teeth 16 deployed on an (inner or outer) arcuate surface of locking element 14, and a complementary ratchet pawl 20 for engaging successive ratchet teeth as the locking element moves towards its locked position. In the preferred example illustrated here, locking element 14 is resiliently biased to its locked position, for example, by a spring 18 (omitted from some of the drawings for clarity of presentation), and ratchet pawl 20 is resiliently biased to engage ratchet teeth 16, for example, by a spring 22. This provides the aforementioned functionality of the locking element tending to engage the panel in its locked position, and the ratchet arrangement preventing reopening of the locking element at a sequence of partially and fully locked positions.

In order to provide full functioning of the locking arrangement, a mechanism is provided for freeing (releasing) the ratchet engagement both during closing of the door and on operation of an opening mechanism, schematically illustrated herein with reference to a manually operated handle 26 pivotally mounted to the panel 12. It will be noted that the manually operated handle is given only as one example, and is typically supplemented (or replaced) by a number of other types and configurations of actuator, including but not limited to, electric actuators (e.g., motor or solenoid), key-operated cylinder locks, and various other manual actuators.

In the non-limiting example illustrated here, release of the ratchet is facilitated by providing a projecting arm with a shaped abutment surface 24, which is integrated (or otherwise mechanically linked) to ratchet pawl 20 so that force applied to shaped abutment surface 24 pivots ratchet pawl 20 to a disengaged position. In the example illustrated here, this is done by operation of handle 26 which has a lever portion 28 which bears on the shaped abutment surface, displacing it from the engaged position of FIG. 15B to the released position of FIG. 15C. Further motion of the handle causes another region of lever portion 28 to bear directly on the locking element, displacing it from its locked position of FIGS. 15A-15C to the unlocked position of FIGS. 15D-15K. The panel can then be opened. Handle 26 is preferably resiliently biased, such as by spring 30 to return to its home position, as in FIG. 15A.

Figure 15A:
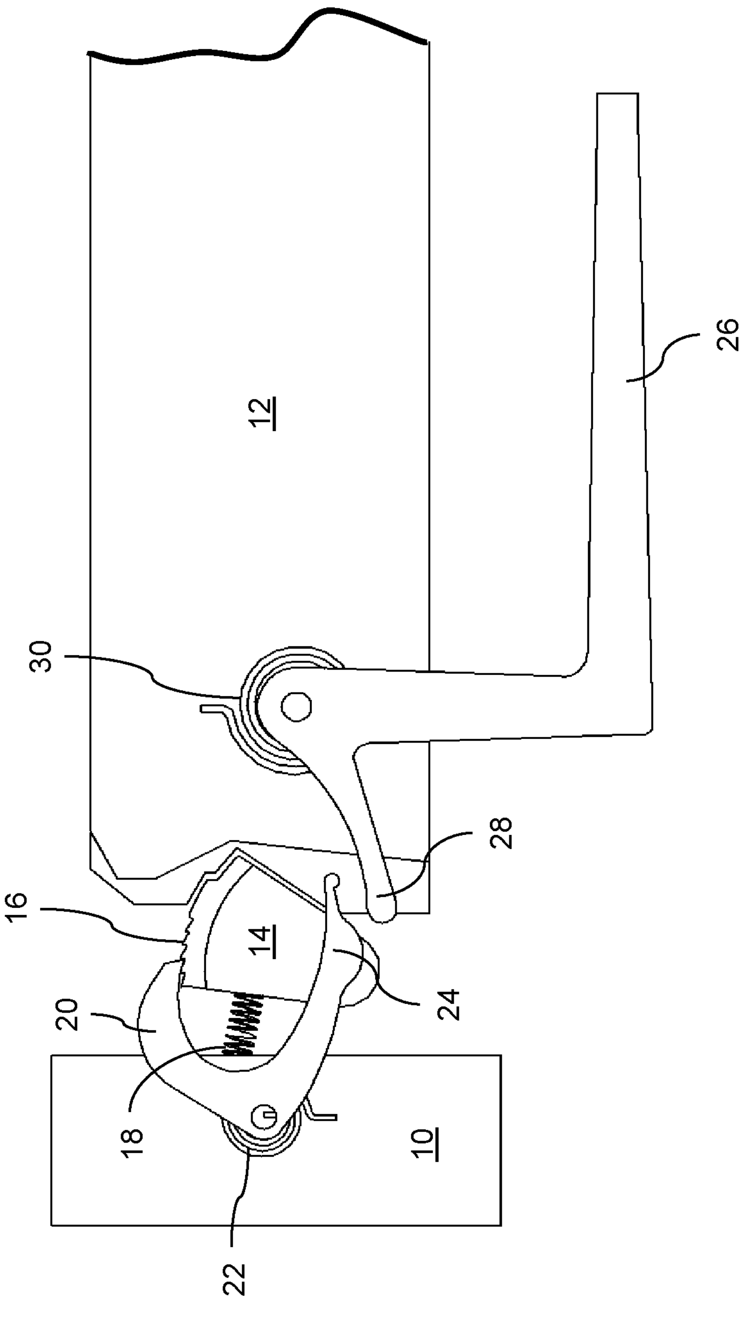
FIGS. 15A-15L are a sequence of horizontal cross-sectional views taken through an alternative ratchet-based lock mechanism according to a further aspect of the present invention during unlocking and opening of the panel.
Figure 15B:
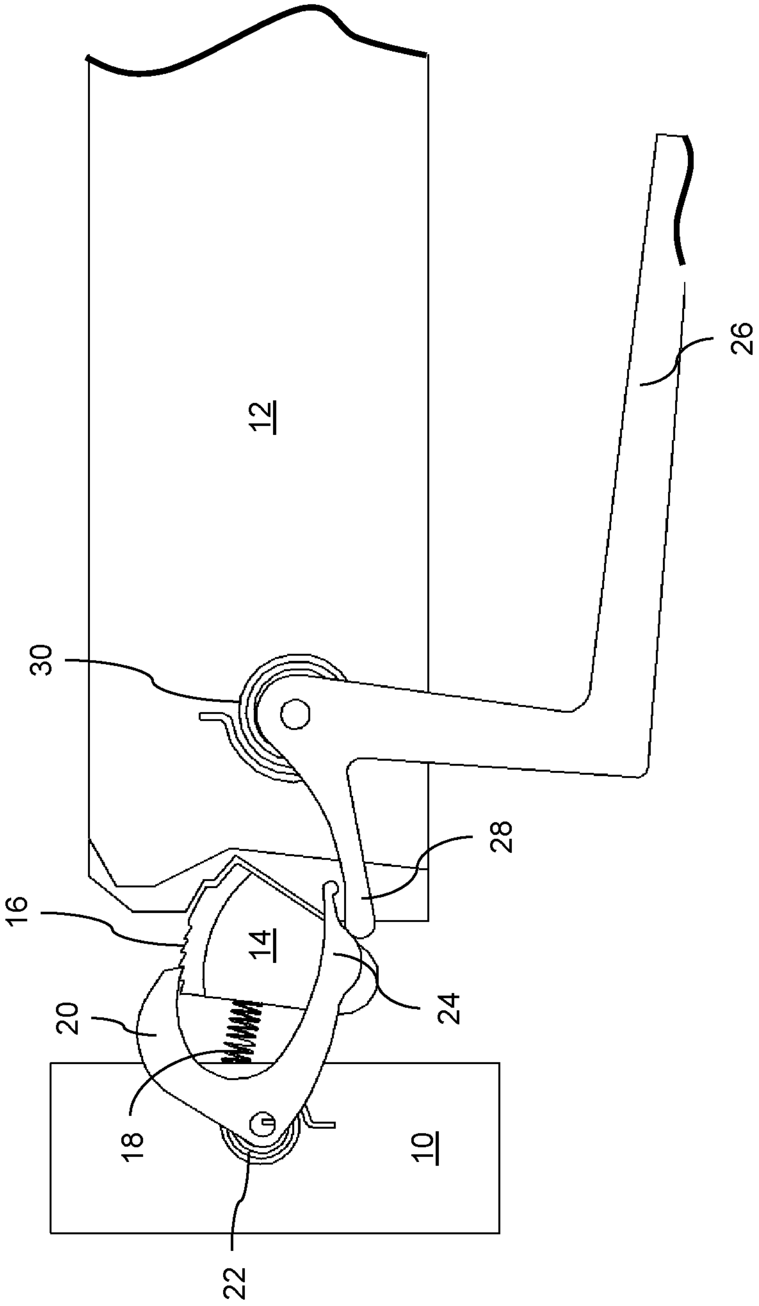
Figure 15C:
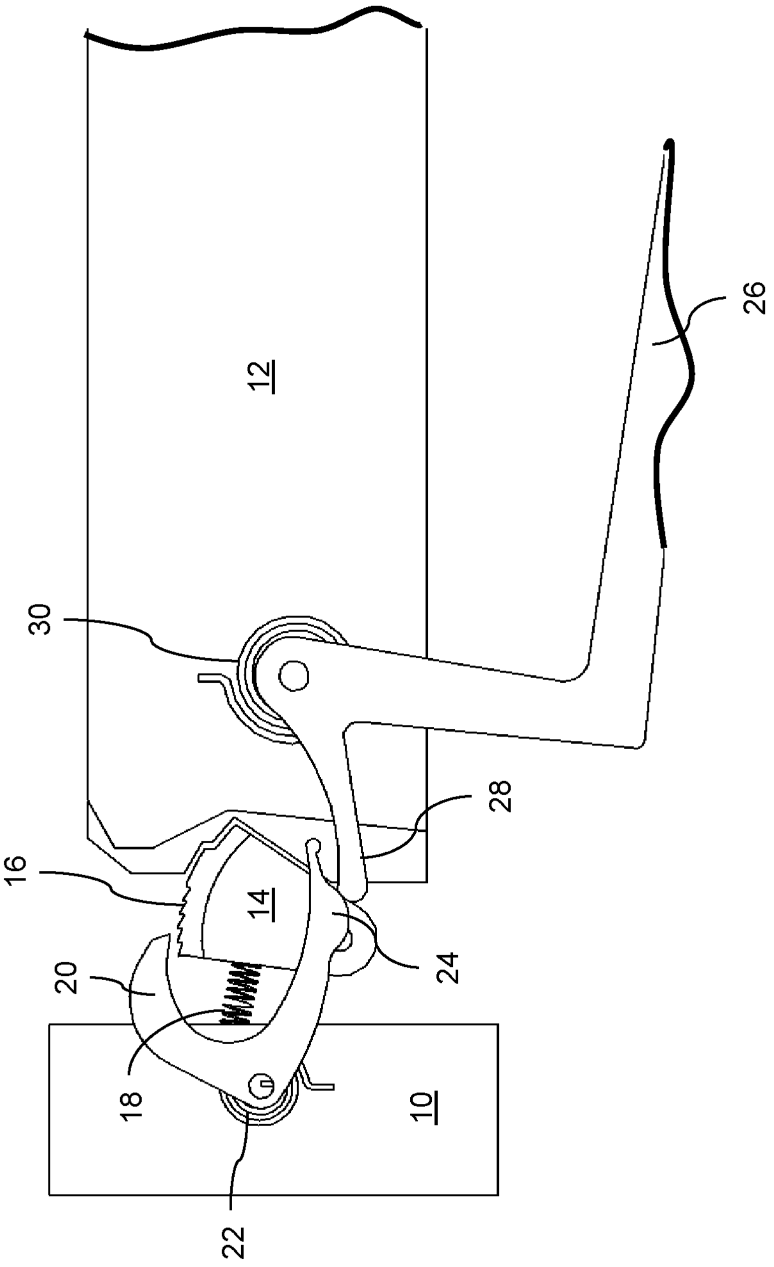
Figure 15D:
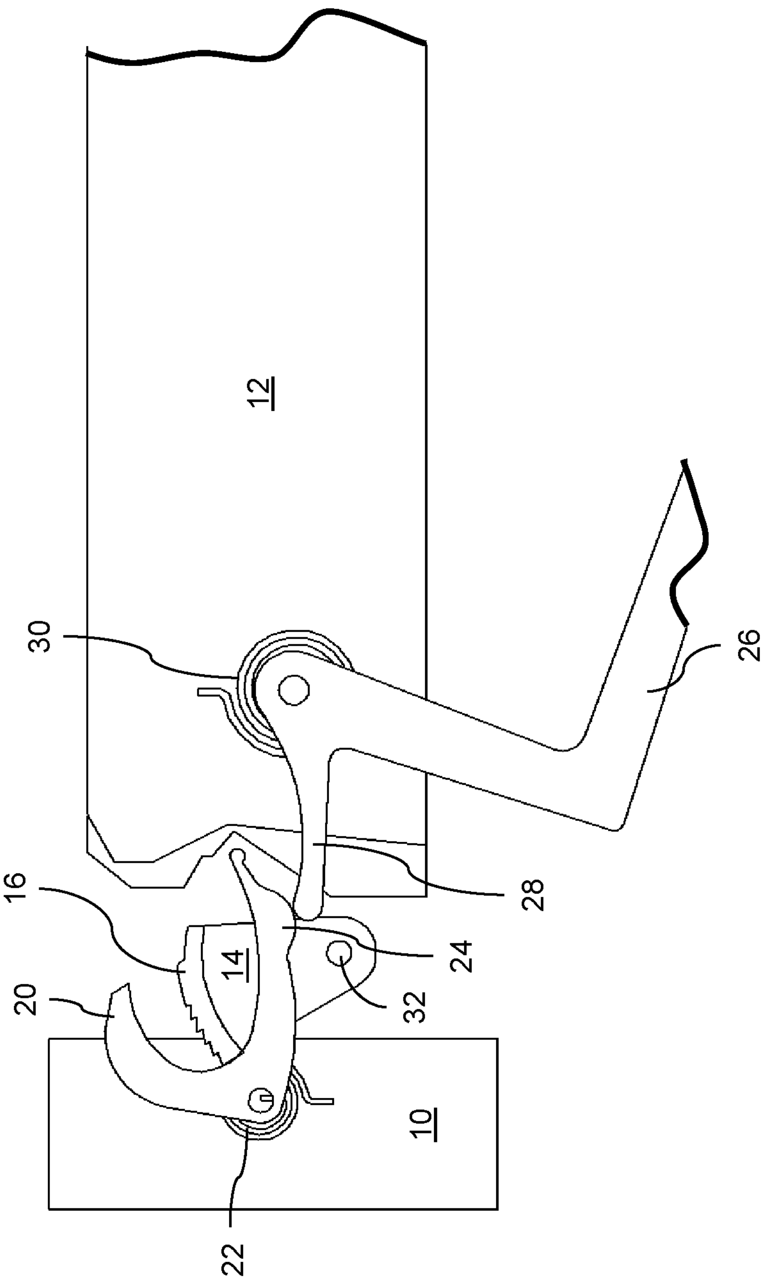
Figure 15E:
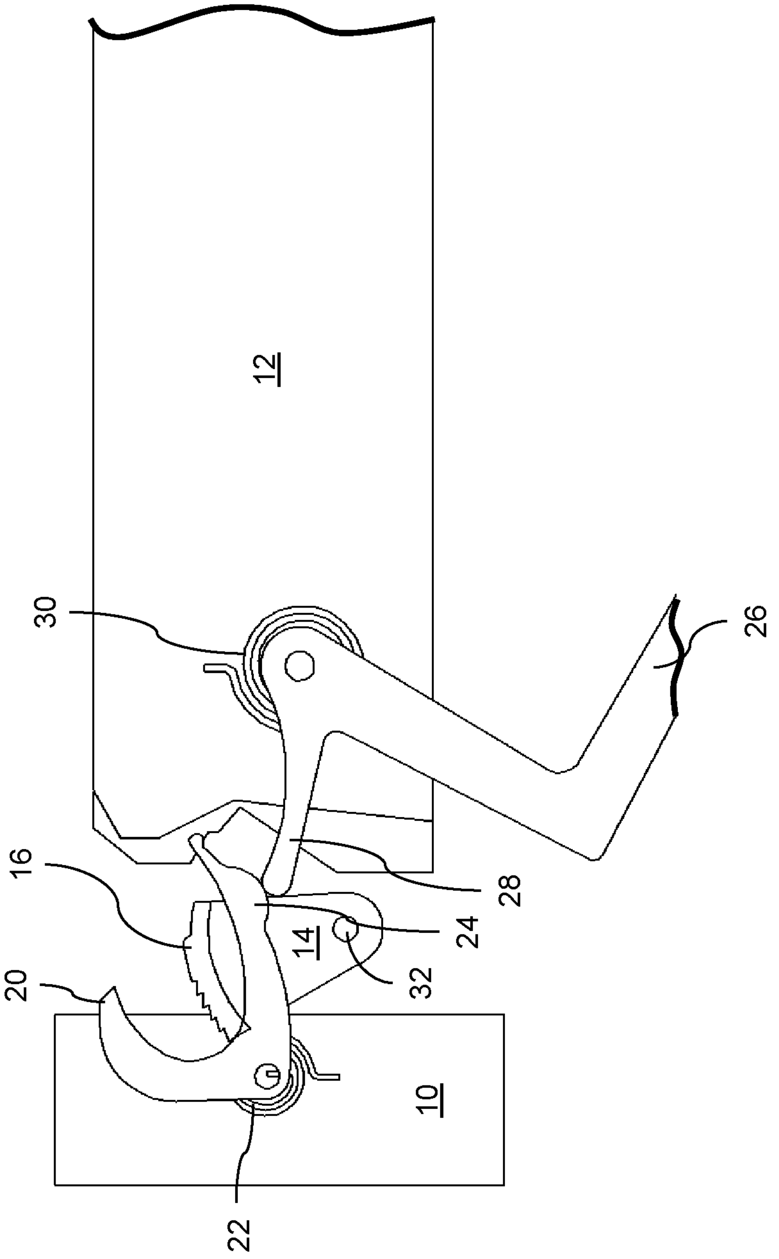
Figure 15F:
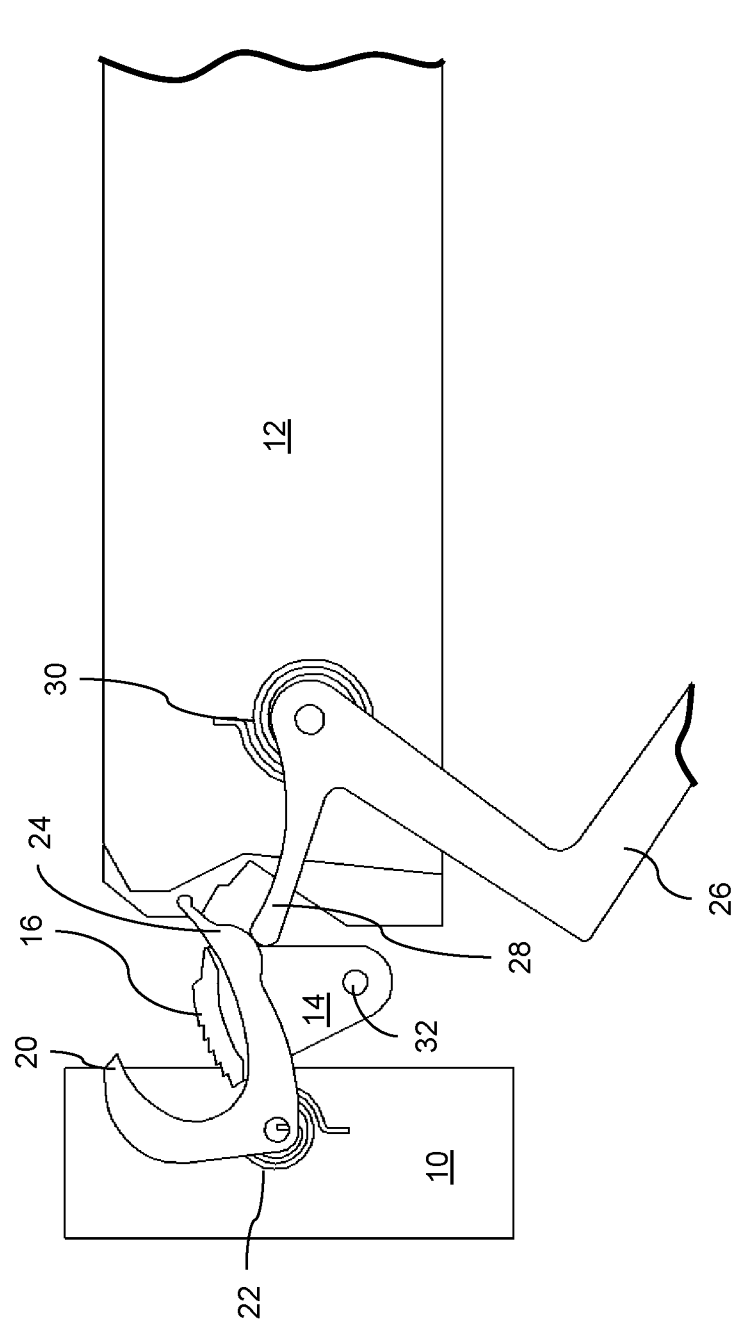
Figure 15G:
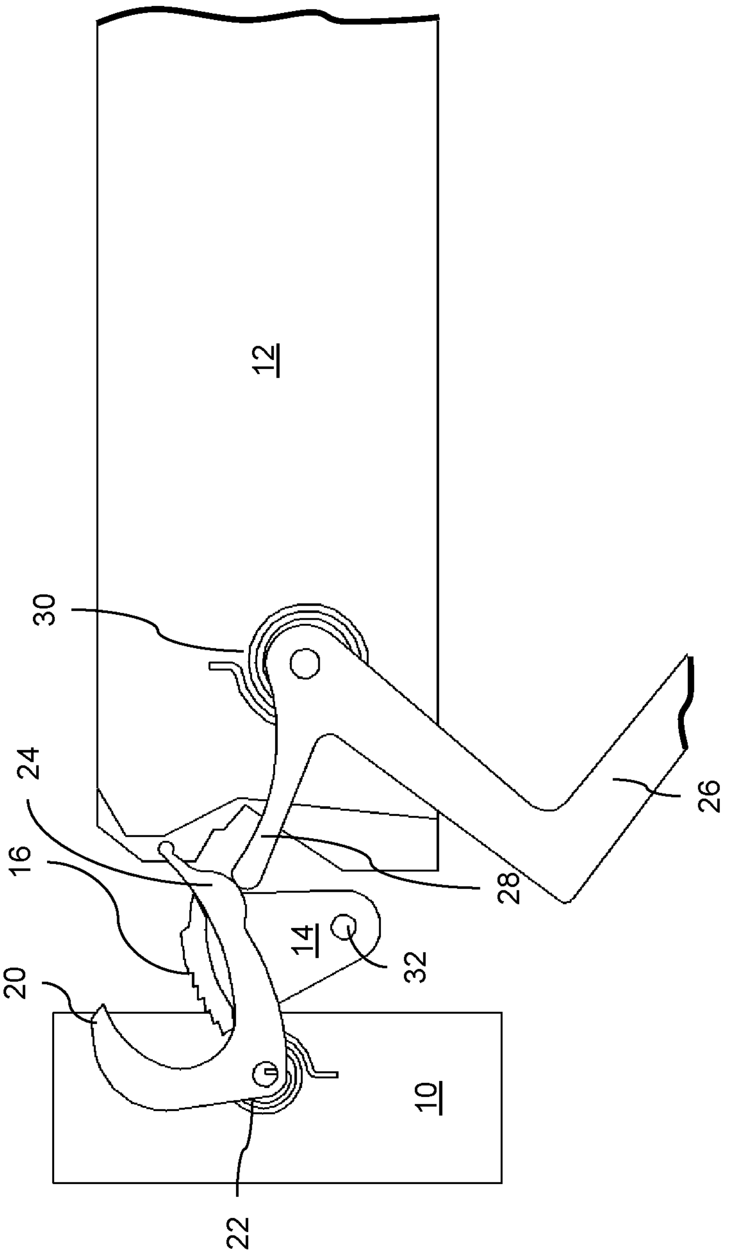
Figure 15H:
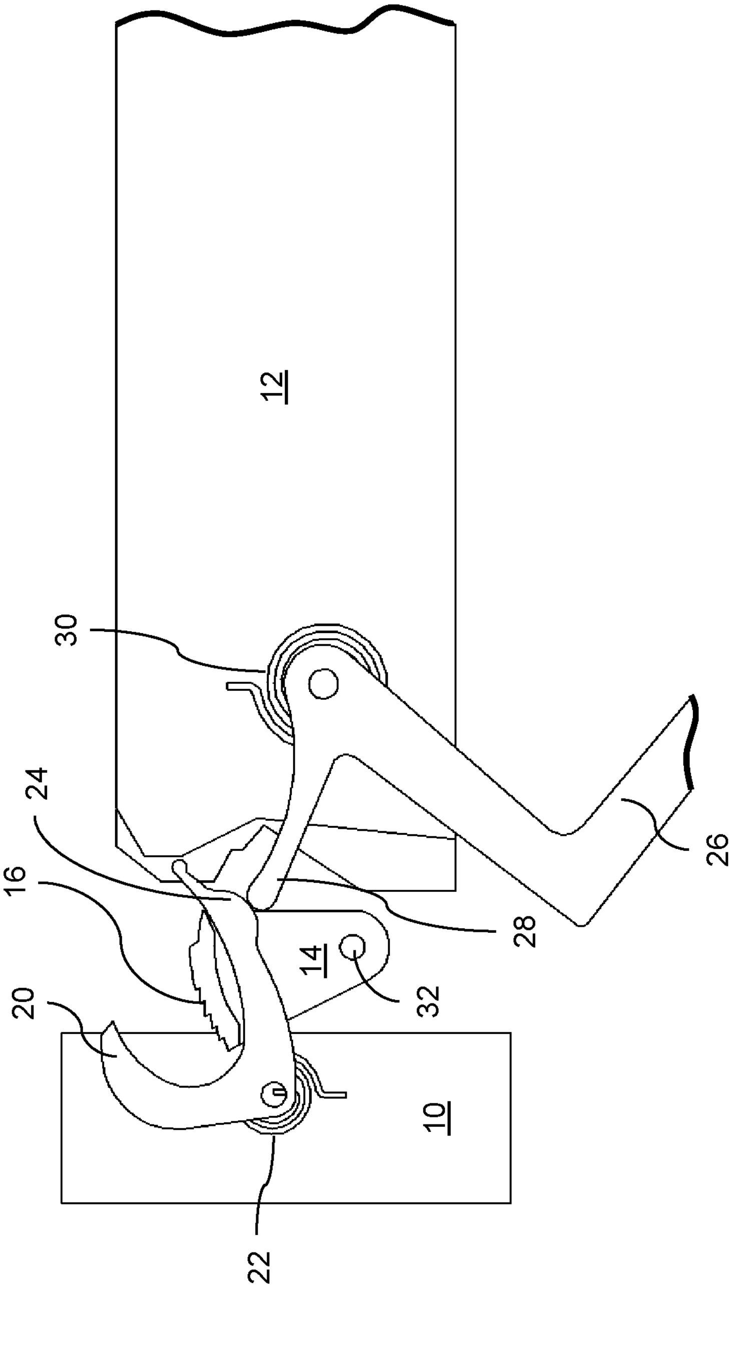
Figure 15I:
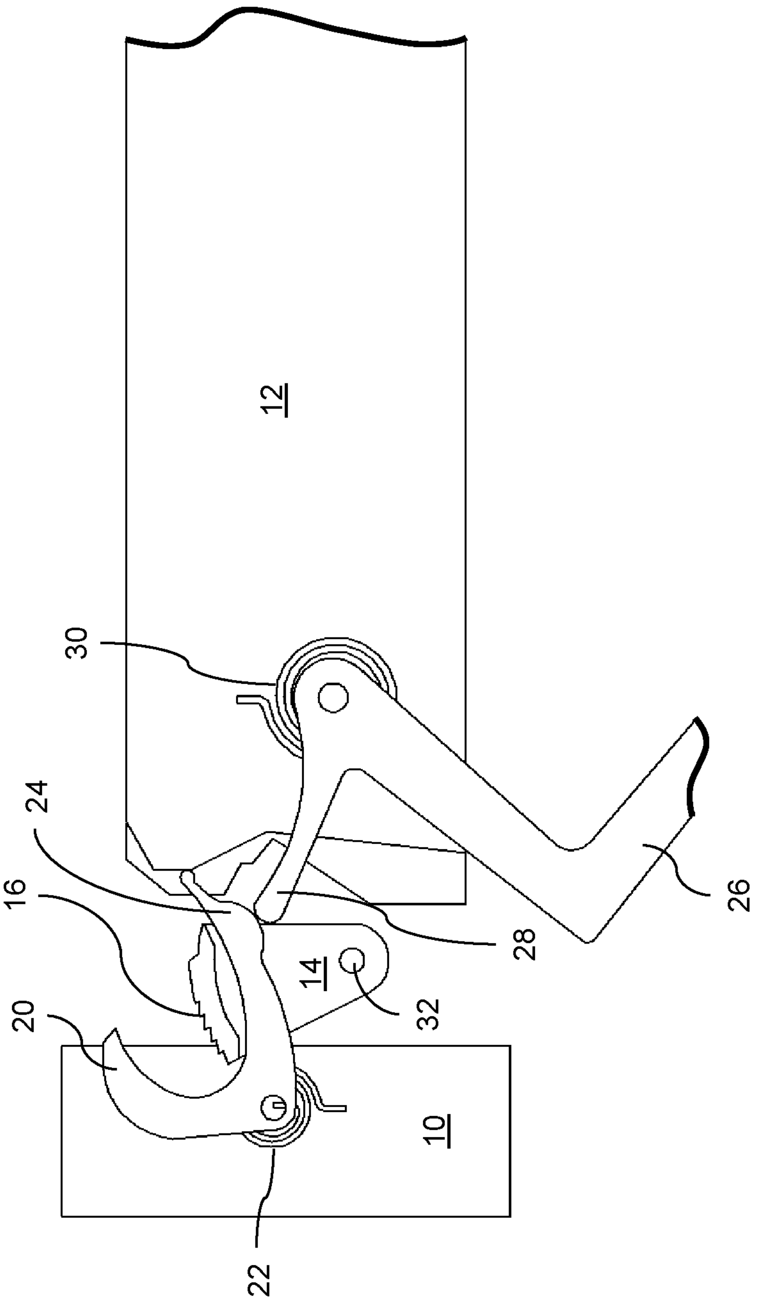
Figure 15J:
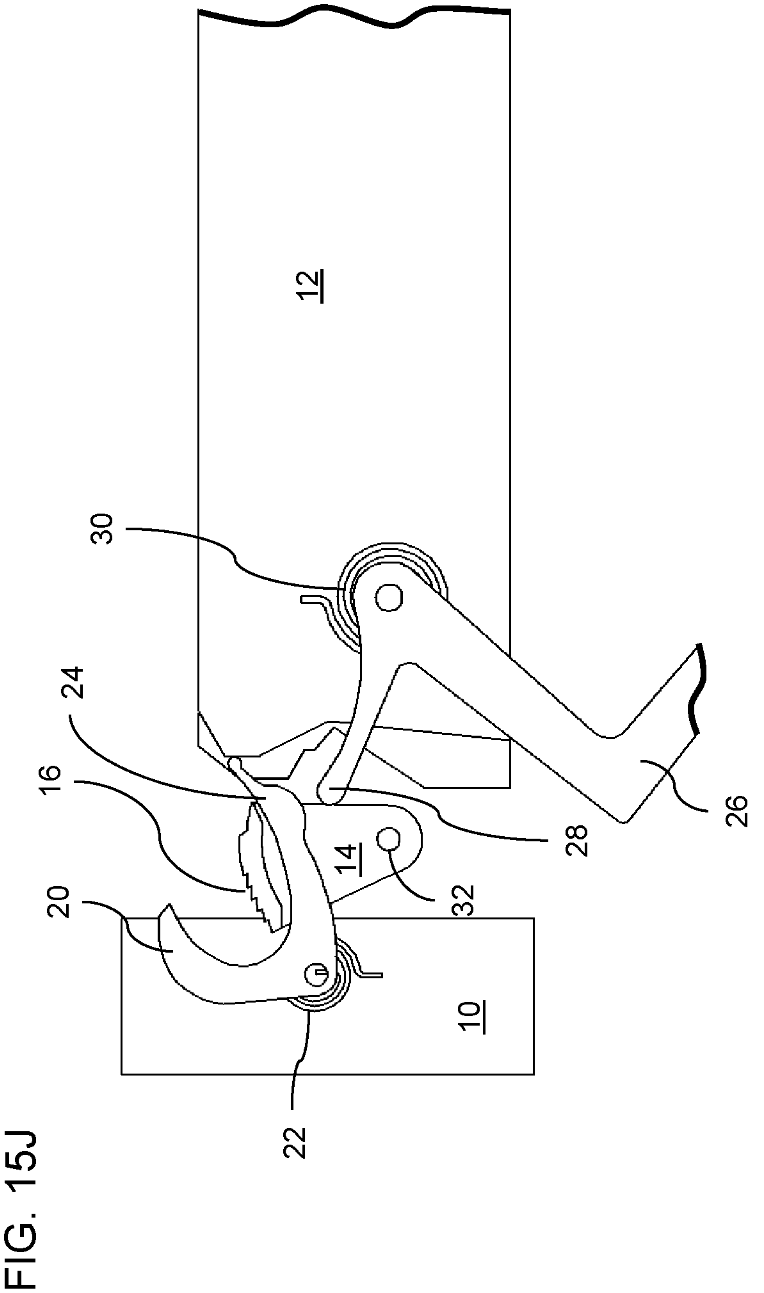
Figure 15K:
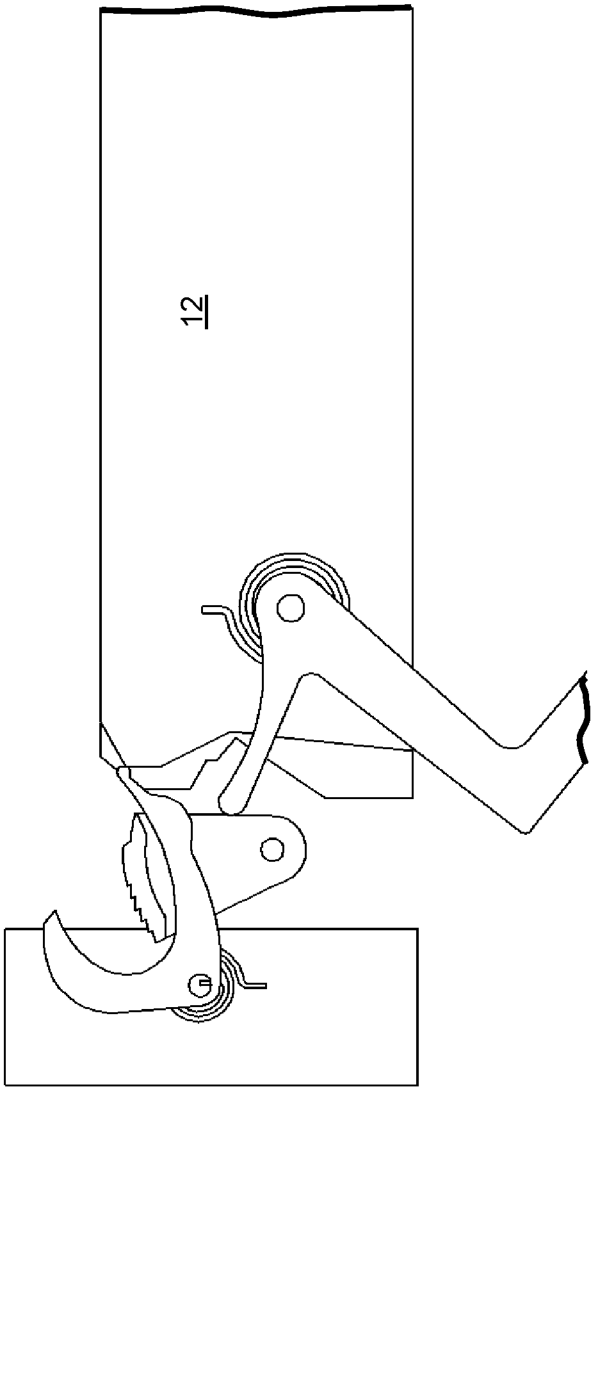
Figure 15L:
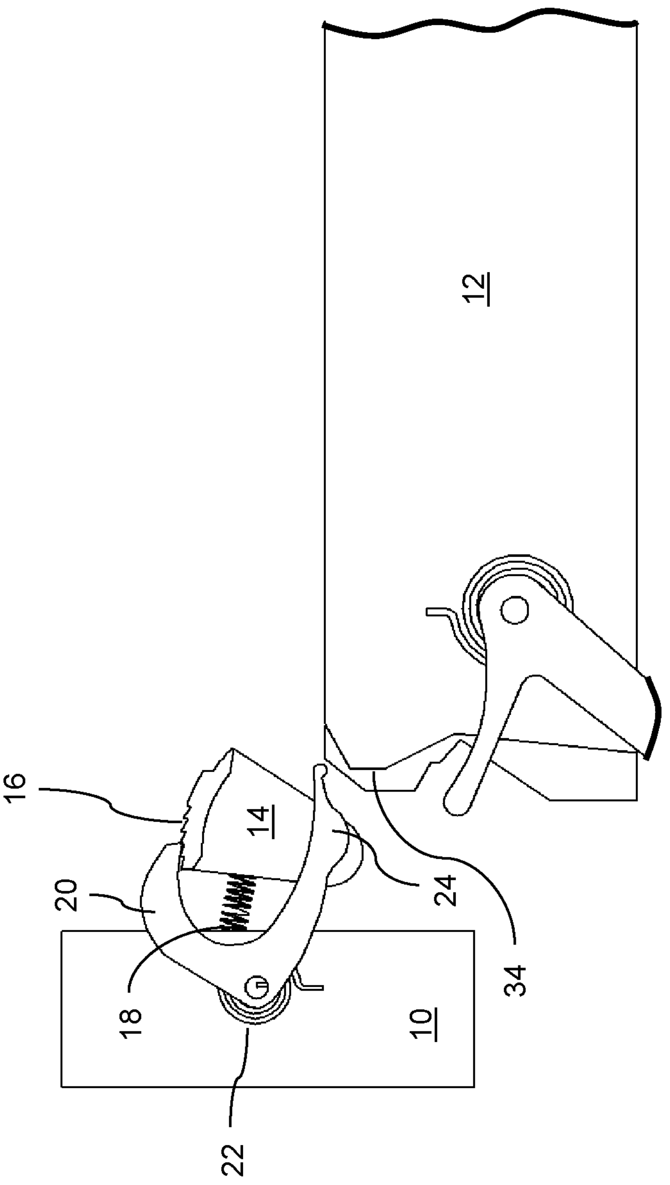
Figure 16A:
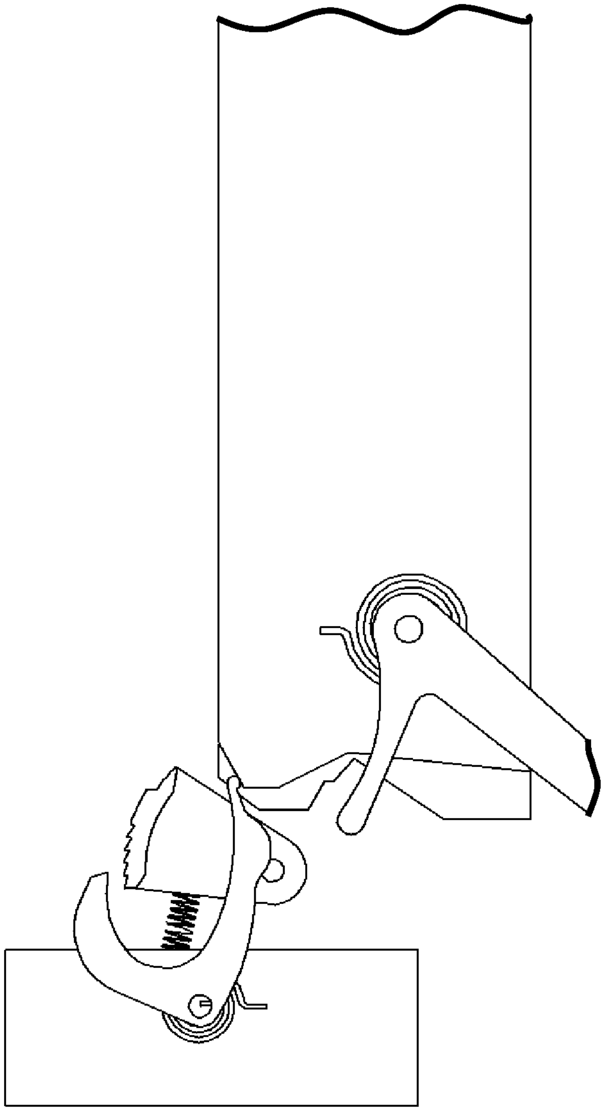
FIGS. 16A-16D are views similar to FIGS. 15A-15L illustrating part of a closing motion of the panel.
Figure 16B:
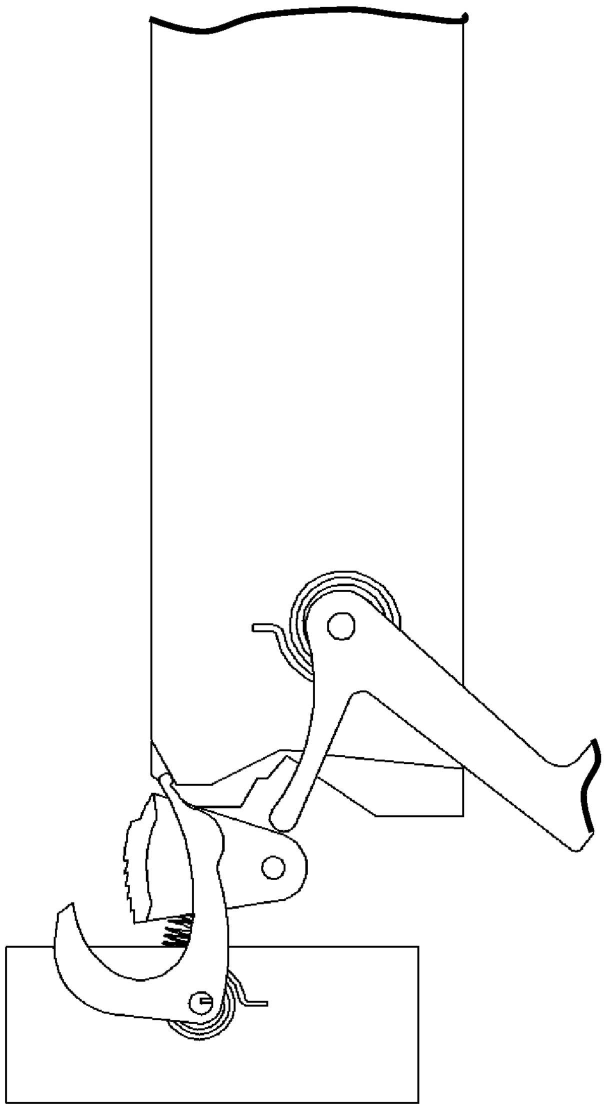
Figure 16C:
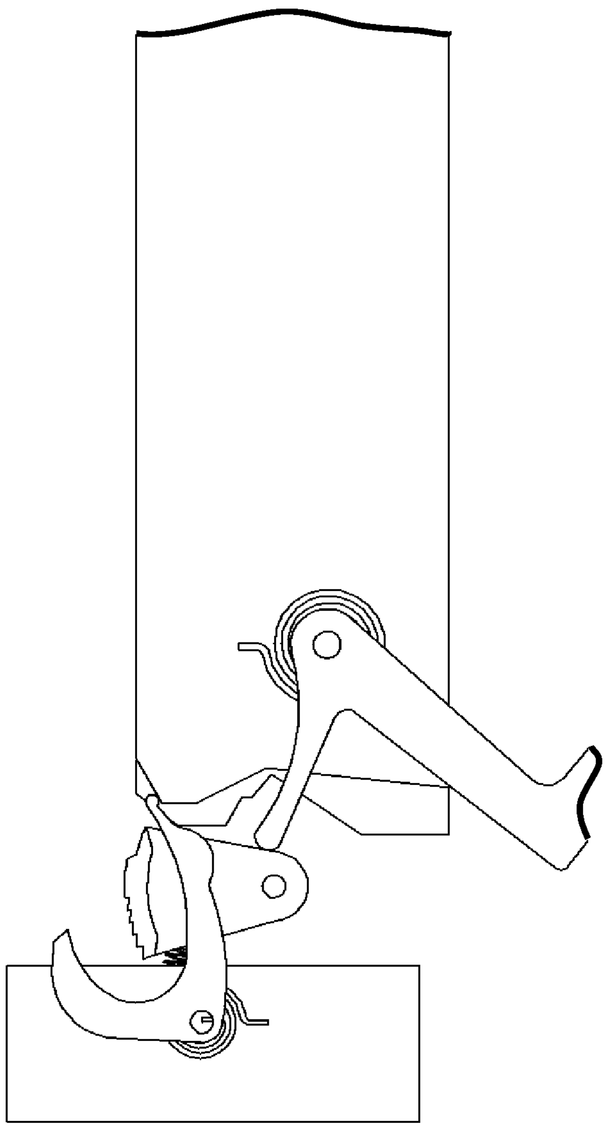
Figure 16D:
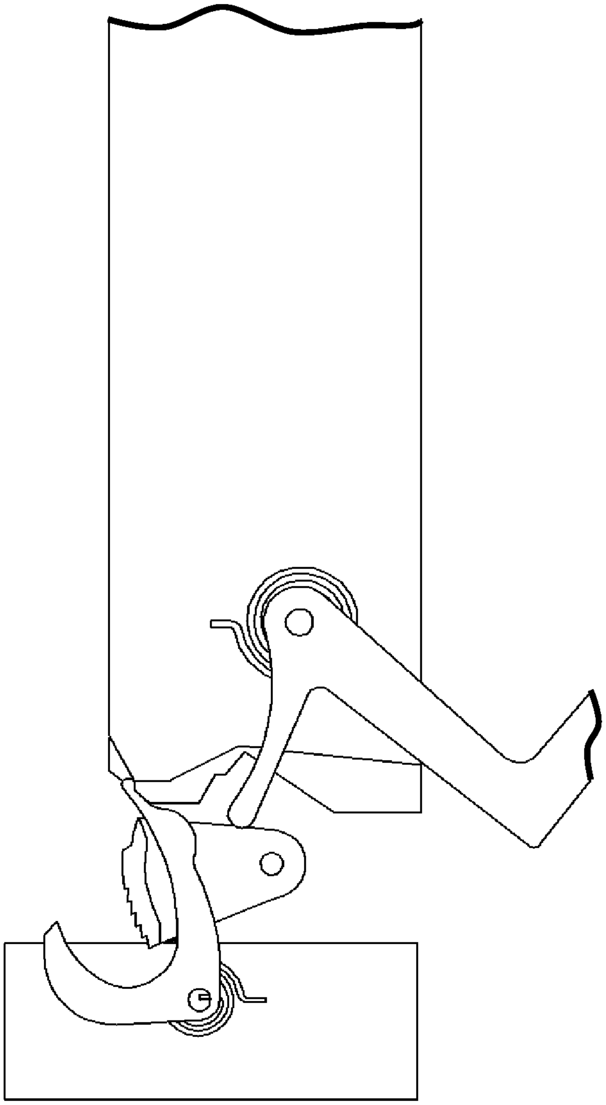
Figure 17:
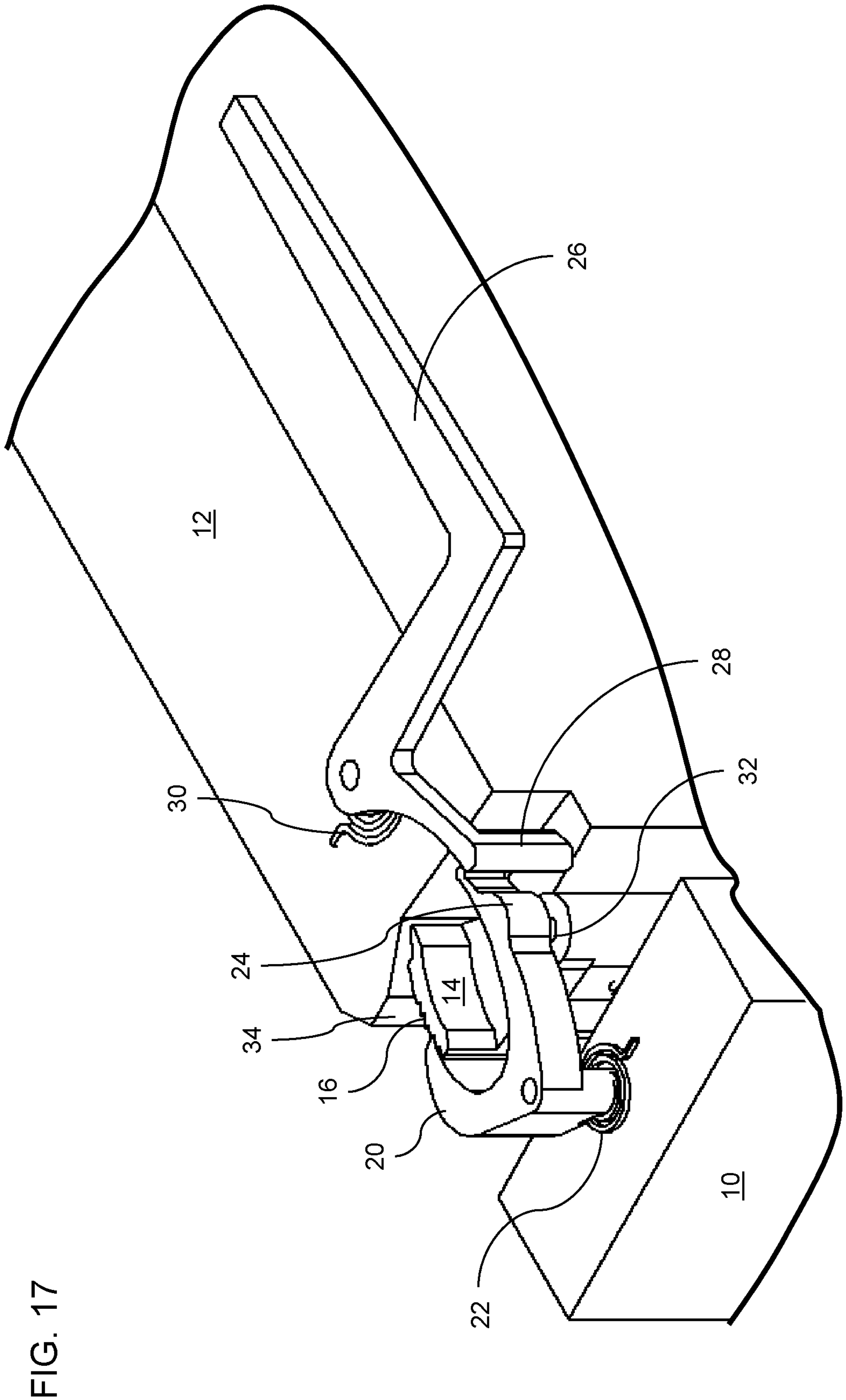
FIG. 17 is an isometric view of the ratchet-based lock mechanism of FIG. 15A.

A similar process if effected by a leading abutment surface 34 of the panel during closing/slamming of the panel, independent of the position of handle 26. While the panel is open, the lock mechanism normally returns under its resilient bias to the locked position of the locking element and the engaged state of the ratchet, as shown in FIG. 15L. As the leading edge 34 contacts shaped abutment surface 24, it displaces the ratchet pawl 20 to its disengaged position (FIG. 16A). Subsequent motion of the panel presses directly against the locking element 14, retracting it against its spring bias so as to allow the panel to pass to its closed position. A recess in the panel opposite shaped abutment surface 24 allows the ratchet to return to its engaged state so that, when the panel is fully closed, the locking element resiliently returns to its locking position and is retained by the ratchet configuration.

Door Ajar Mode

Referring now back to the synchronous displacement configuration implementations of the present invention, in certain circumstances, it is desired to not only unlock the panel but also to eject the panel from its fully-closed position, so that the panel is visibly ajar and readily seen to be unlocked. Circumstances where such a mode may be desirable include but are not limited to: showing guests that they are welcome and prompting them to enter; and various emergency situations requiring rapid evacuation of a building, or ease of access to a rescue crew. In many conventional systems, such functionality would require a dedicated actuator to eject the panel from its fully closed position, and possibly also a re-locking operation to prevent the panel from returning to its fully closed position.

In contrast, the "positive lock" actuating linkage of the present invention in combination with a manual or powered actuator, such as an electric motor, ensures that operation of the release mechanism also moves the actuating linkage sufficiently to displace the panel away from its fully closed position. The panel will remain displaced from its fully closed position for as long as the release mechanism is maintained in the releasing state, e.g., with a manual handle locked in the "release" position or until a return motion actuation signal is delivered to the actuating motor.

Where the release mechanism is part of a networked "smart home" or other networked control system, switching on and off the "emergency mode" is preferably remotely controllable, for example, by operating a suitable on-screen control on a networked electronic device belonging to an authorized user, such as via a smartphone APP. The hardware required to support such functionality typically includes an electrical controller wired to the actuator, where the controller is operated via wired or wireless networking communication through suitable networking components via a local area network (LAN) and/or wide area network (WAN) by a control system, which may provide a user interface directly, or via a mobile APP, to an authorized user. All details of the hardware and associated software required to implement the described functionality will be readily understood by a person having ordinary skill in the art, and will not be detailed here for the sake of brevity.

Intercom Mode

In some cases, it is desirable to allow temporary unrestricted access, such as for a short time period on arrival of a visitor or a courier delivery, while ensuring that the panel returns to a locked state if not opened within the designated time period. This functionality is referred to herein as an "intercom mode" since it is suitable for implementing access authorization in the case of an intercom-controlled entrance. However, this mode is not limited to use in the intercom context, and may be provided in a range of circumstances, and for a range of different time periods, when it is desirable to switch between temporary unlimited access and a controlled-access state. Two approaches are described herein for providing this functionality, each particularly suited to a different set of applications.

According to a first approach to this aspect of the present invention, intercom mode functionality may be provided without actually unlocking the lock mechanism. In this case, the mode is implemented by providing blanket authorization to unlock the lock mechanism when any person tries to initiate an opening process. In cases where opening is controlled by a biometric sensor, such as a fingerprint sensor, the intercom mode may be implemented by switching the authentication algorithm to temporarily actuate unlocking/opening on contact of any finger (or supply of whatever other biometric input is required according to the sensor type) without requiring a match with a pre-authorized individual. This approach also allows recording of biometric data of the unknown individual opening the door, which may be useful in certain security scenarios. Alternatively, a dedicated sensor may identify initiation of an opening process by use of a proximity sensor indicating a person approaching the door, or by a contact sensor on a handle of the door, or any other sensor arrangement that can indicate the presence of a person next to the door, or an attempt by a person to open the door. As long as the door has not been opened, or if it is opened and reclosed, the panel remains physically locked, although the response time of the opening mechanism is typically a fraction of a second, and particularly in the case of a touch-sensitive sensor on a door handle, may provide a user experience giving the impression of the door being unlocked and free to open. If no attempt is made during the "intercom release period" to open the door, the locking system will typically switch back to its normal authentication criteria, allowing only authorized entry.

According to an alternative approach to this aspect of the present invention, an additional mechanism may be provided to selectively disable the panel-ejection effect of the "positive lock" actuation linkage so that the locking mechanism can be unlocked without ejecting the panel, and most preferably allowing switching back to the locked state when desired. Two such mechanisms are illustrated in the attached drawings. FIGS. 18A-20D illustrate a first implementation of this feature according to which an axis of rotation of the "positive lock" actuating linkage is displaceable (motion from state of FIGS. 18A, 19A and 19B to the state of FIGS. 18B, 19C and 19D), thereby allowing the locking mechanism to be displaced from its locked state to its unlocked state without ejecting the panel from its locked position (FIG. 19E). The panel can then be opened manually (FIG. 19F). When the actuating linkage rotation axis is returned to its normal position, the normal actuating linkage functionality described above is restored, so that closing of the panel is effective to actuate the locking mechanism to lock the panel and engage the deadlock, all as described above.

Figure 19A:
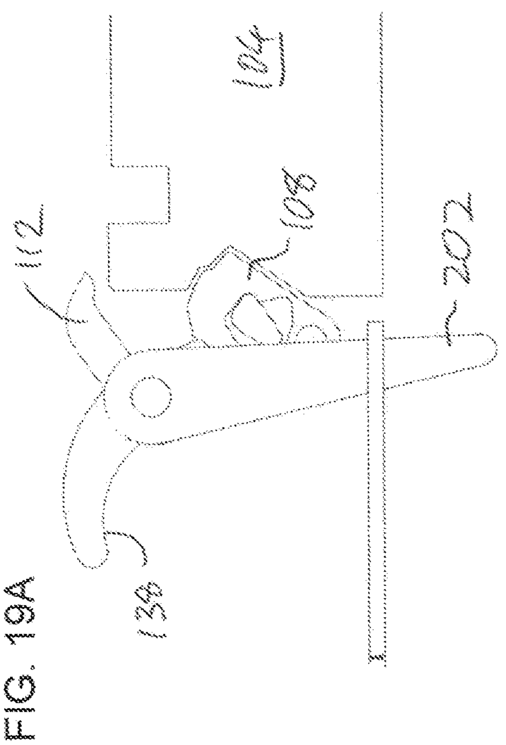
FIGS. 19A and 19B are horizontal cross-sectional views taken at a higher level and a lower level, respectively, through the locking configuration of FIG. 18A in the enabled state.
Figure 19B:
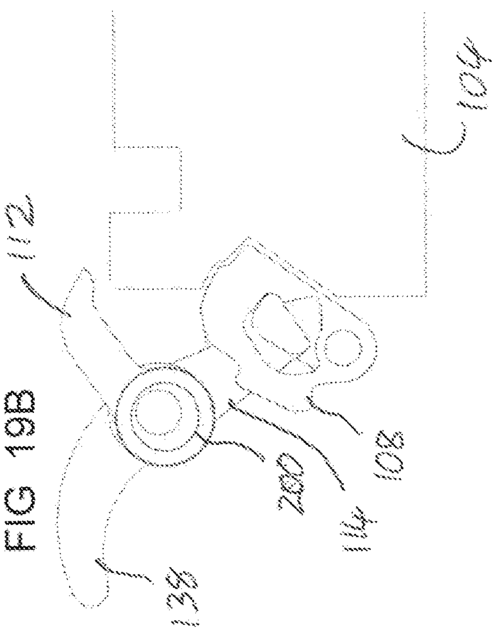
Figure 19C:
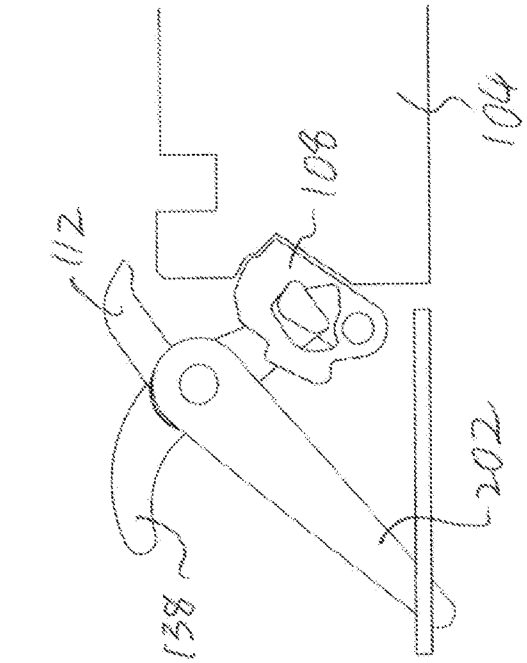
FIGS. 19C and 19D are horizontal cross-sectional views taken at a higher level and a lower level, respectively, through the locking configuration of FIG. 18A in the disabled state.
Figure 19D:
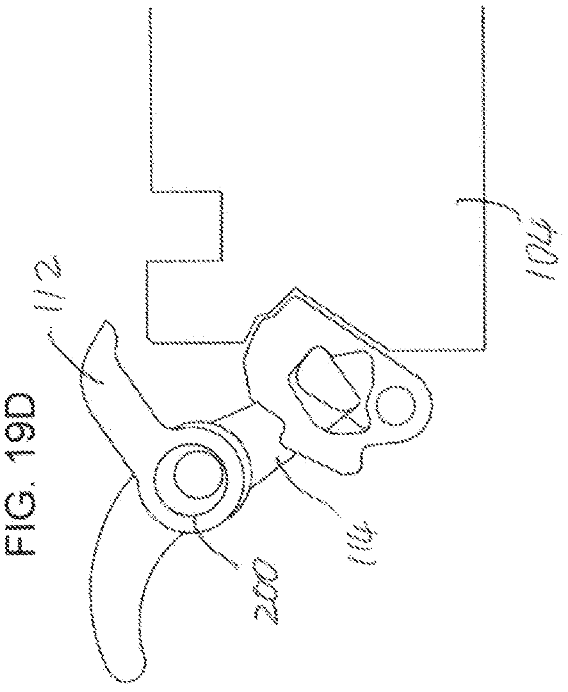

In the non-limiting example illustrated here, as best seen in the horizontal cross-sectional views of FIGS. 19B and 19D, displacement of the axis of rotation of the actuating linkage is here achieved by rotation of an eccentric intermediate axle portion 200 mounted eccentrically relative to the central axis of the actuation axle. Rotation of the eccentric intermediate axle portion is shown here controlled here by a lever 202, but this could clearly be done also be implemented using any form of linear or rotary actuator for manual or powered actuation, according to the design requirements of the implementation. When the actuation linkage rotation axis is returned to its original position, the panel is again ejected from the frame when unlocked, as was also illustrated above.

Figure 18B:
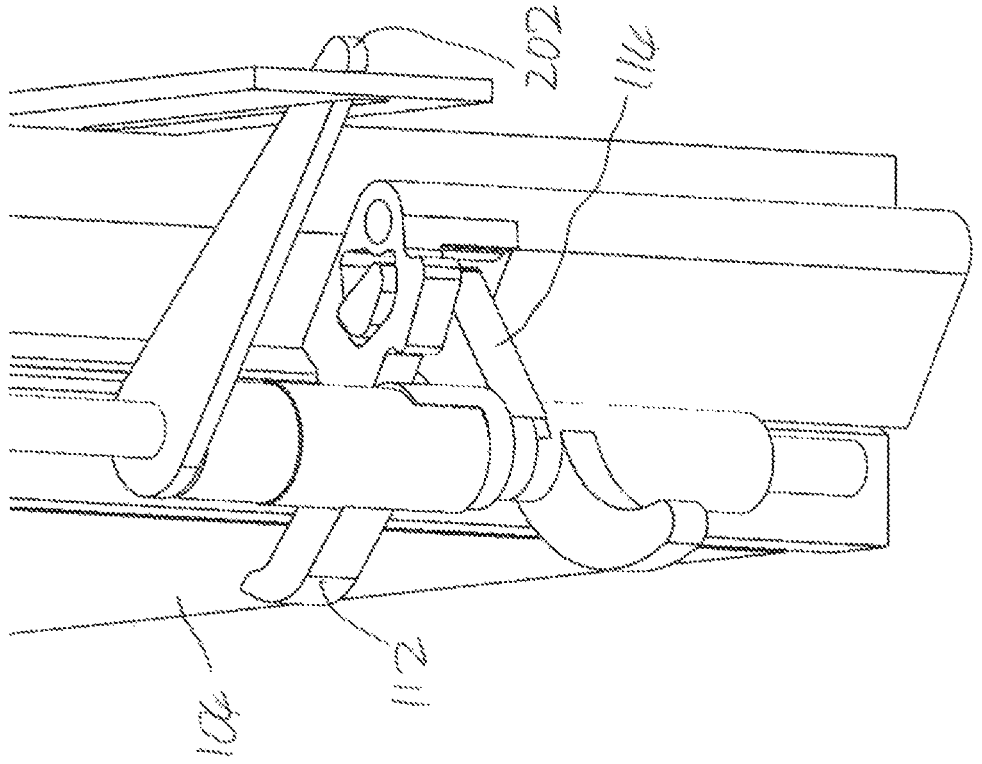
FIGS. 18A and 18B are isometric views of a modified version of the locking configuration of FIG. 2 illustrating a mechanism for disabling spatially-synchronized locking, shown in an enabled state and a disabled state, respectively.
Figure 18A:
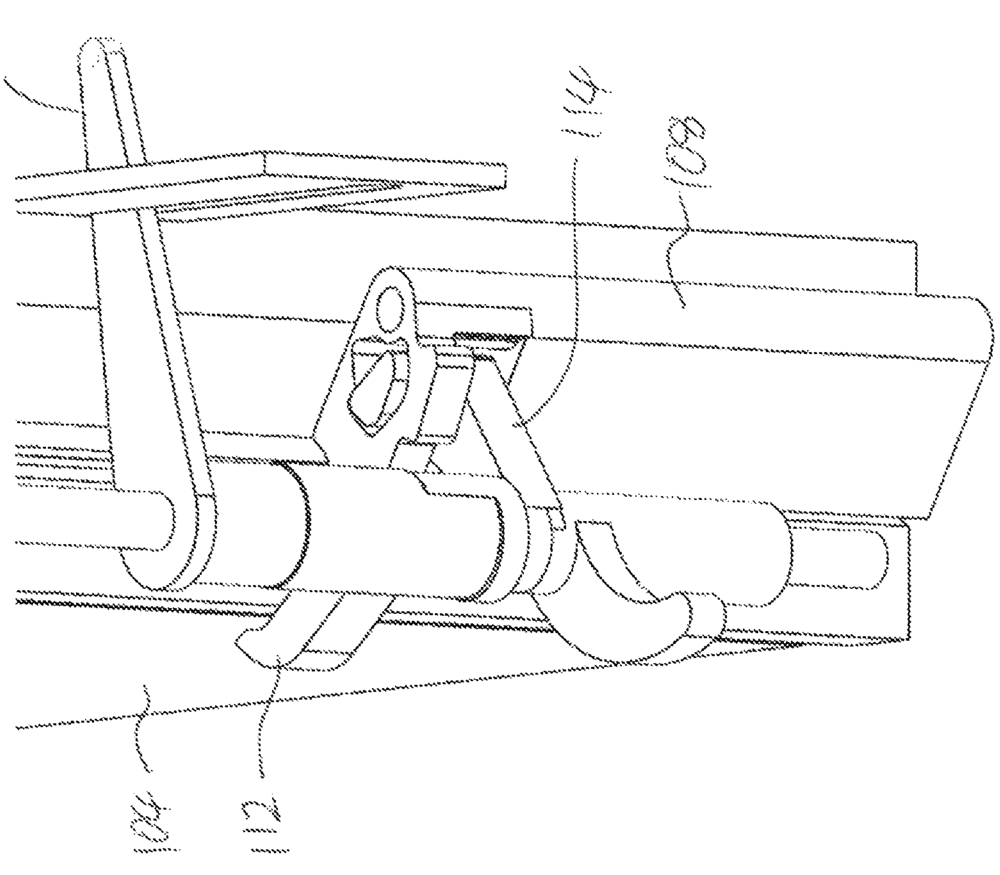
Figure 19E:
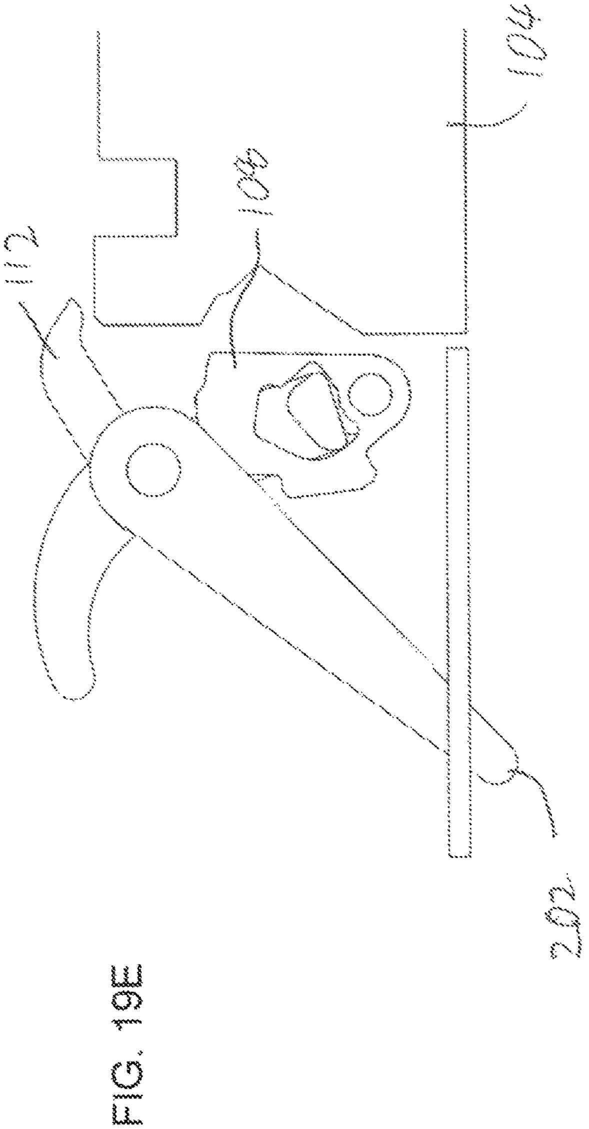
FIGS. 19E and 19F are views similar to FIG. 19C illustrating the locking mechanism being unlocked and the panel being opened, respectively.
Figure 19F:
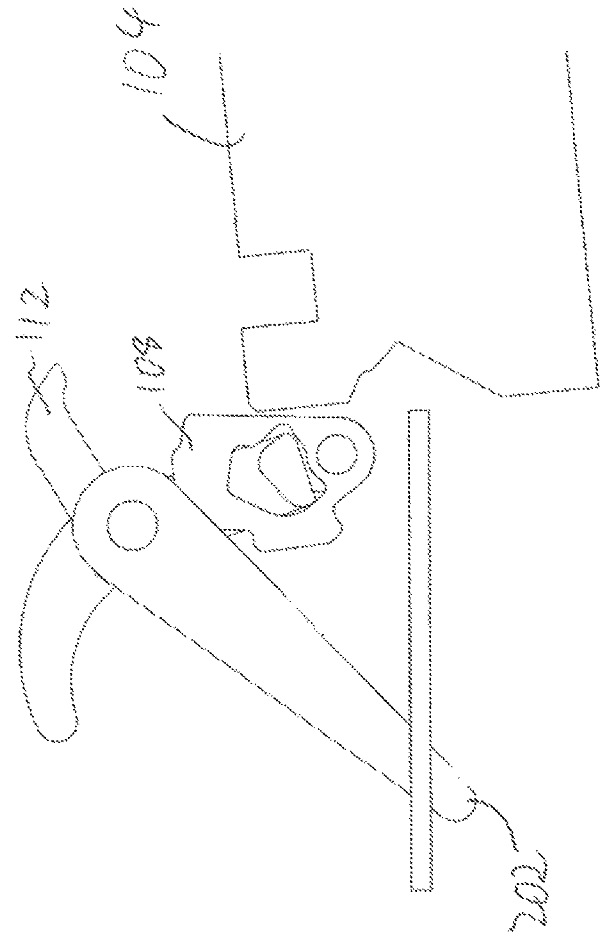
Figure 20B:
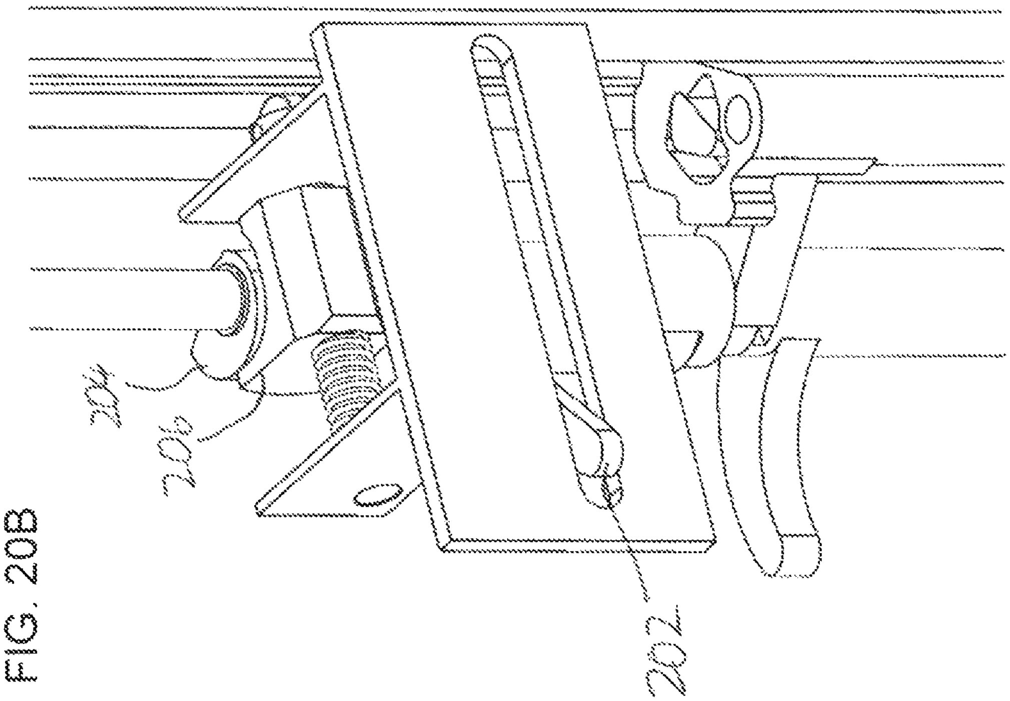
FIGS. 20A and 20B are isometric views of the locking configuration of FIG. 18A illustrating the states of a retractable retention arrangement in the enabled state and the disabled state, respectively.
Figure 20A:
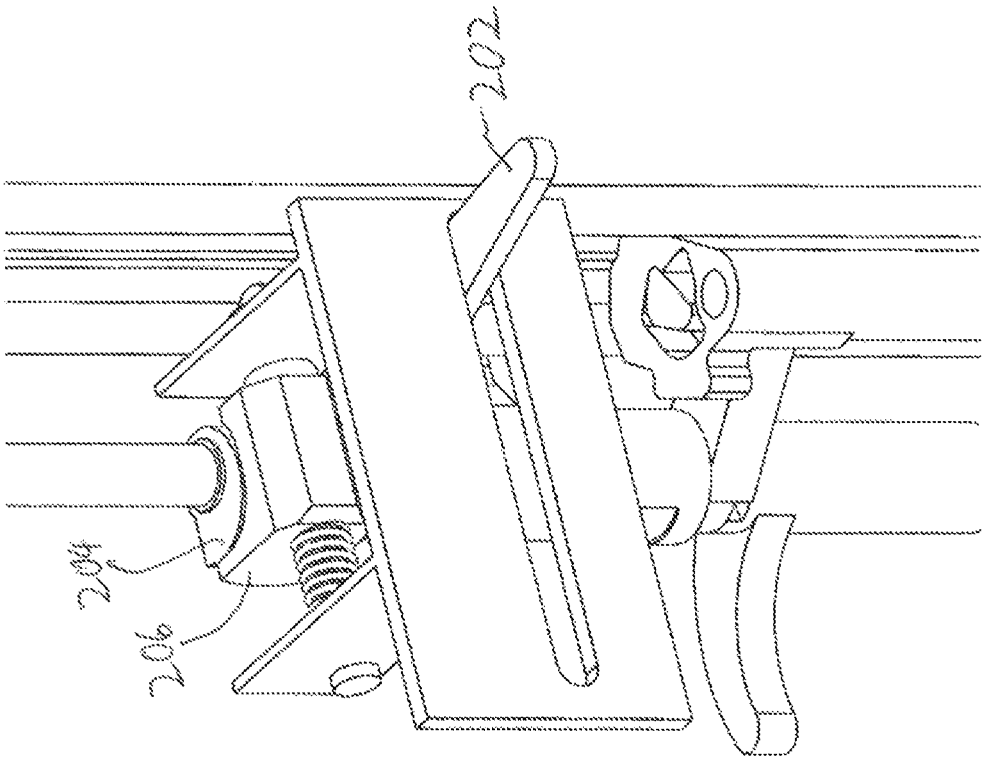
Figure 20D:
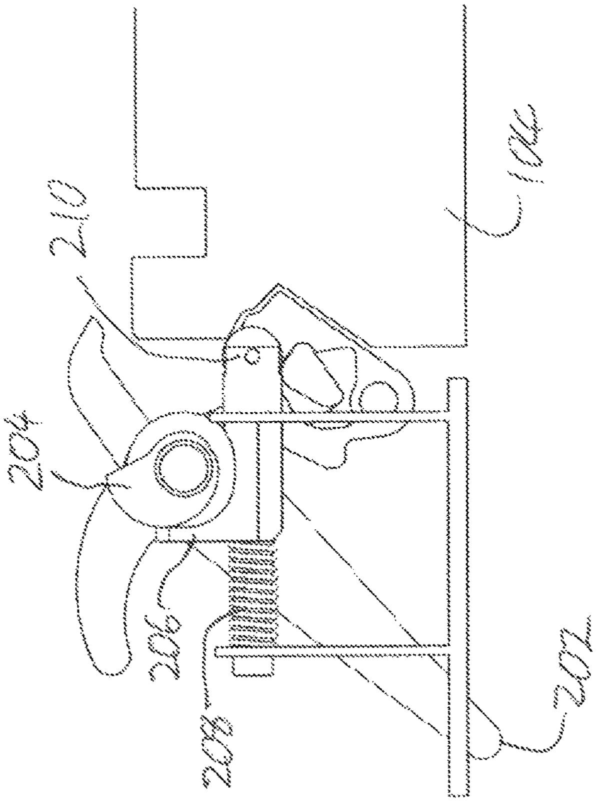
FIGS. 20C and 20D are plan views corresponding to FIGS. 20A and 20B, respectively.
Figure 20C:
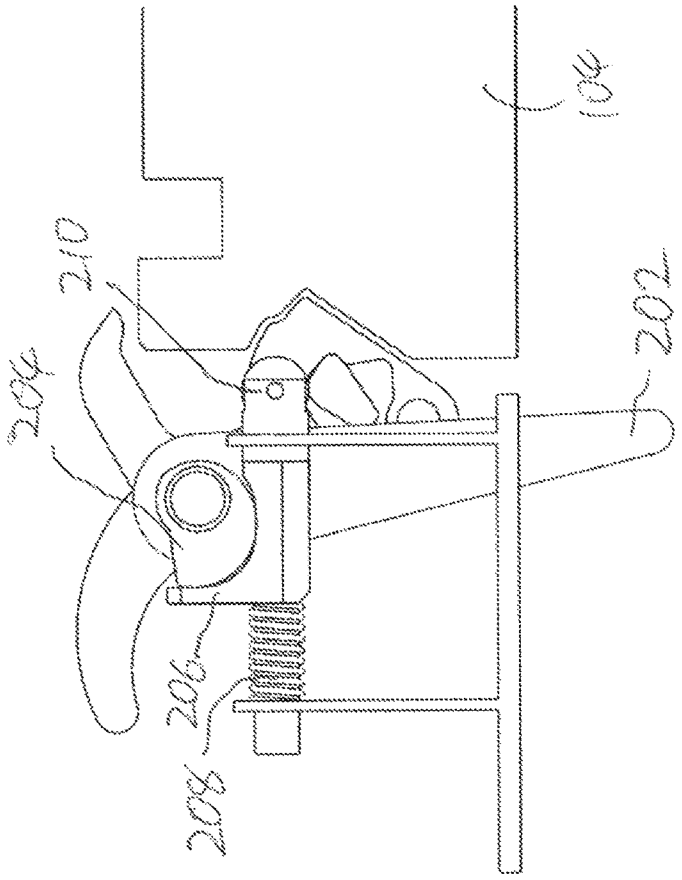

FIGS. 20A and 20B illustrate a further component that is preferably used together with the mechanism of FIGS. 18A-18B, namely, a retractable spring-loaded retaining mechanism, including a roller or rolling bearing 210 which selectively engages a recess in the side of the panel, or an outer edge of the panel, to retain the panel in its closed position when the locking mechanism is unlocked in an "intercom mode". In order to avoid any interference with the normal operation of the locking mechanism described above, the spring-loaded retaining mechanism is preferably retractable so that it can be withdrawn to a position not in contact with the panel. Most preferably, as shown here, the extension and retraction of the spring-loaded retaining mechanism is actuated by the same mechanism that changes the "positive lock" actuating linkage operation, such as the lever 202 illustrated above. Thus, the lever as shown here also operates a separate eccentric actuator 204 engaged in a recess of a block 206 that is slidingly mounted on a rod 208 along which the roller assembly slides. In the retracted position of FIGS. 20A and 20C, the block is pushed back along the rod so as to compress the spring and retract the roller 210 out of contact with the panel. When the mechanism is operated to disable the ejection of the panel from the frame, the block is also released so as to advance under bias of the spring, bringing the roller 210 into engagement with the panel 104 (FIGS. 20B and 20D).

An alternative implementation for a mechanical implementation of an "intercom mode" is illustrated here with reference to FIGS. 21A-23B. In this case, the hinge axis of the lever 112 is not displaced. Instead, a mechanism is provided to displace the lever 112 axially (vertically) between a first position (FIG. 21A) in which the linkage operates as previously described and a second position (FIG. 22A) in which the linkage is brought into facing relation with a corresponding recess 212 in the panel such that motion of the linkage does not eject the panel from the frame. The axial motion is preferably performed while maintaining the unidirectional driving engagement between the actuator linkage and the deadlock arm.

Figure 21C:
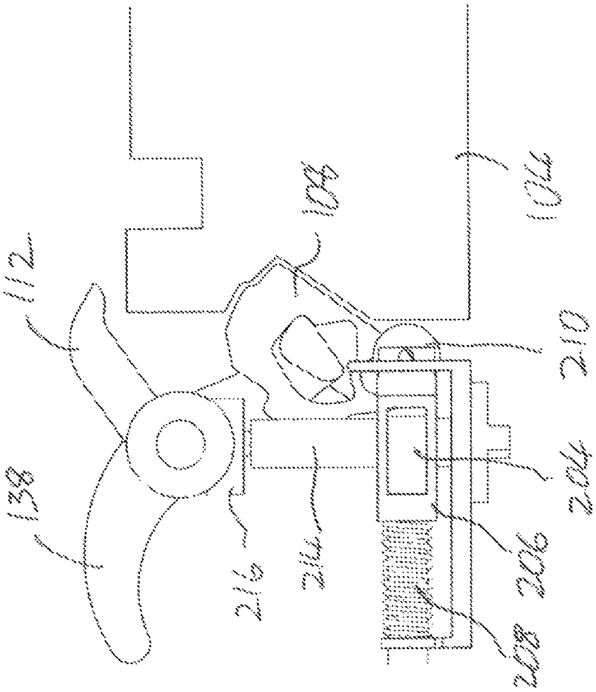
FIGS. 21A-21C are first and second isometric views and a plan view, respectively, of an alternative modified version of the locking configuration of FIG. 2 illustrating a mechanism for disabling spatially-synchronized locking, shown in an enabled state.
Figure 21B:
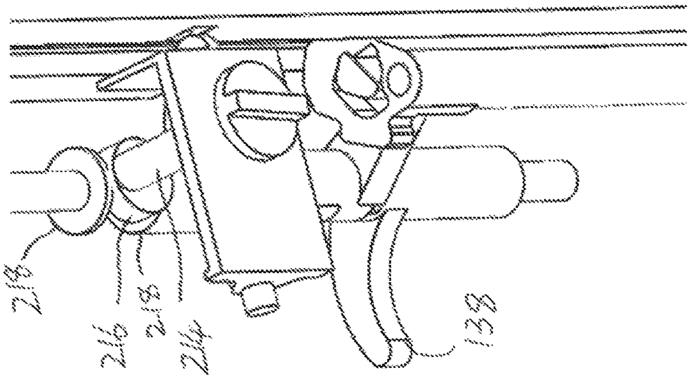
Figure 21A:
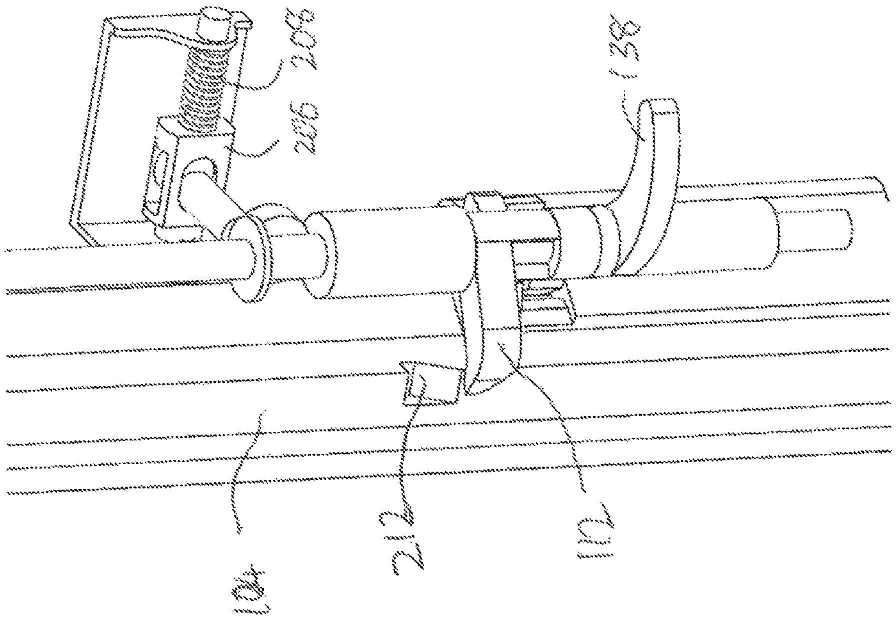
Figure 22C:
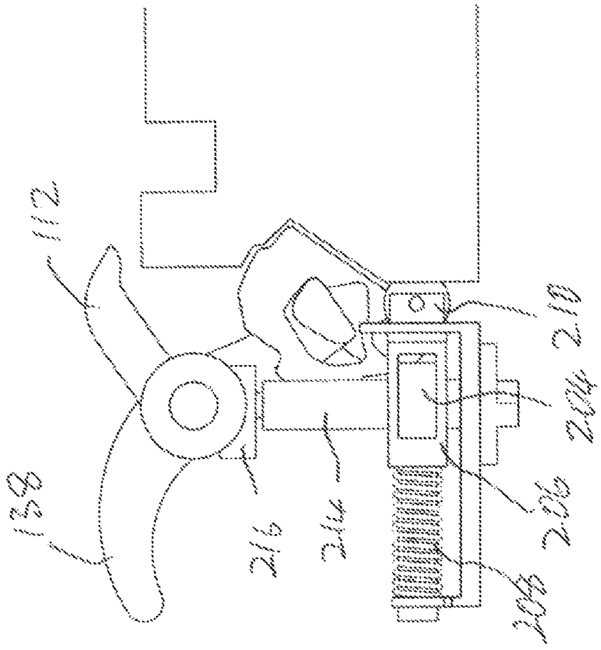
FIGS. 22A-22C are views similar to FIGS. 21A-21C, respectively, shown in a disabled state.
Figure 22B:
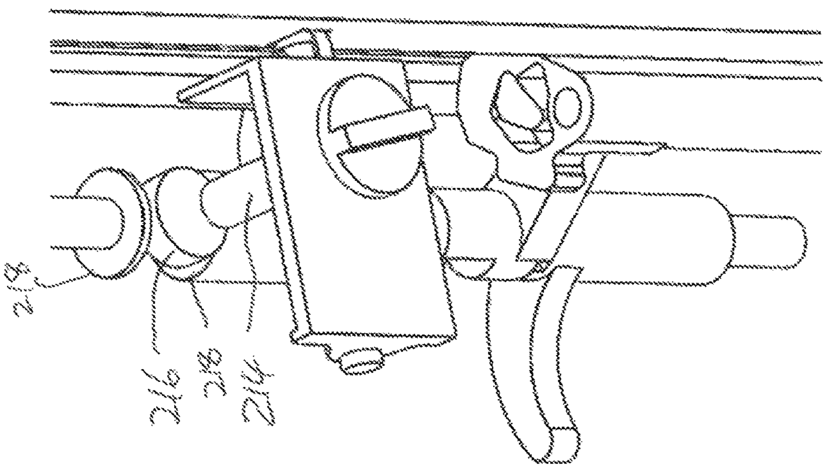
Figure 22A:
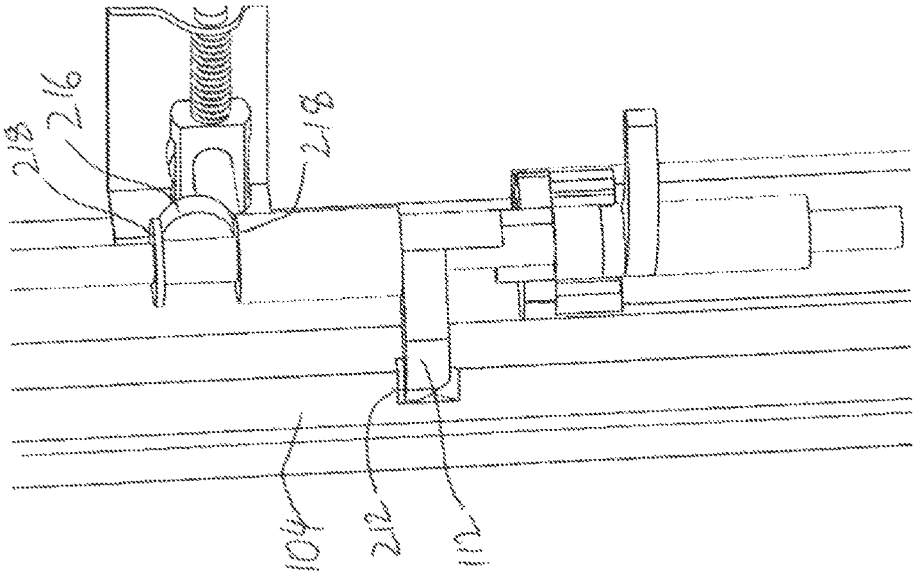
Figure 23B:
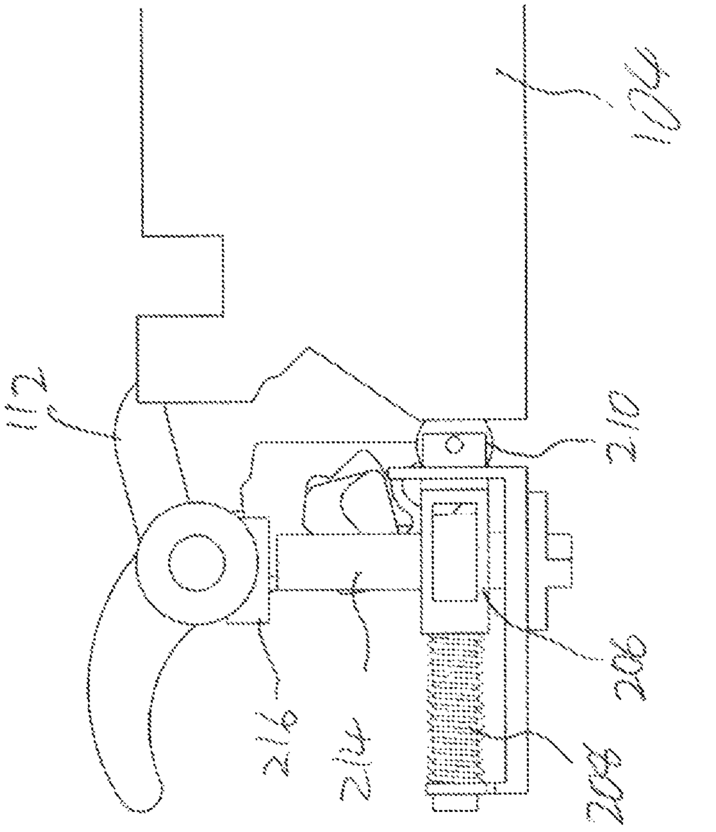
FIGS. 23A and 23B are views similar to FIGS. 22A and 22C, respectively, with the locking mechanism unlocked.
Figure 23A:
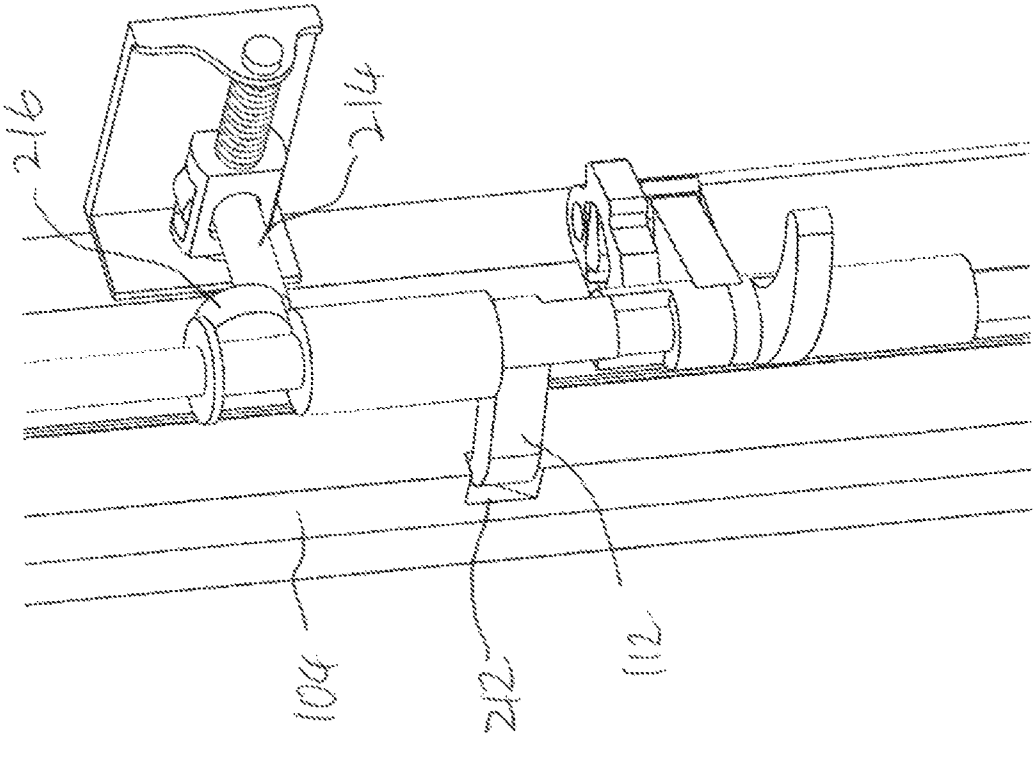
Figure 24:
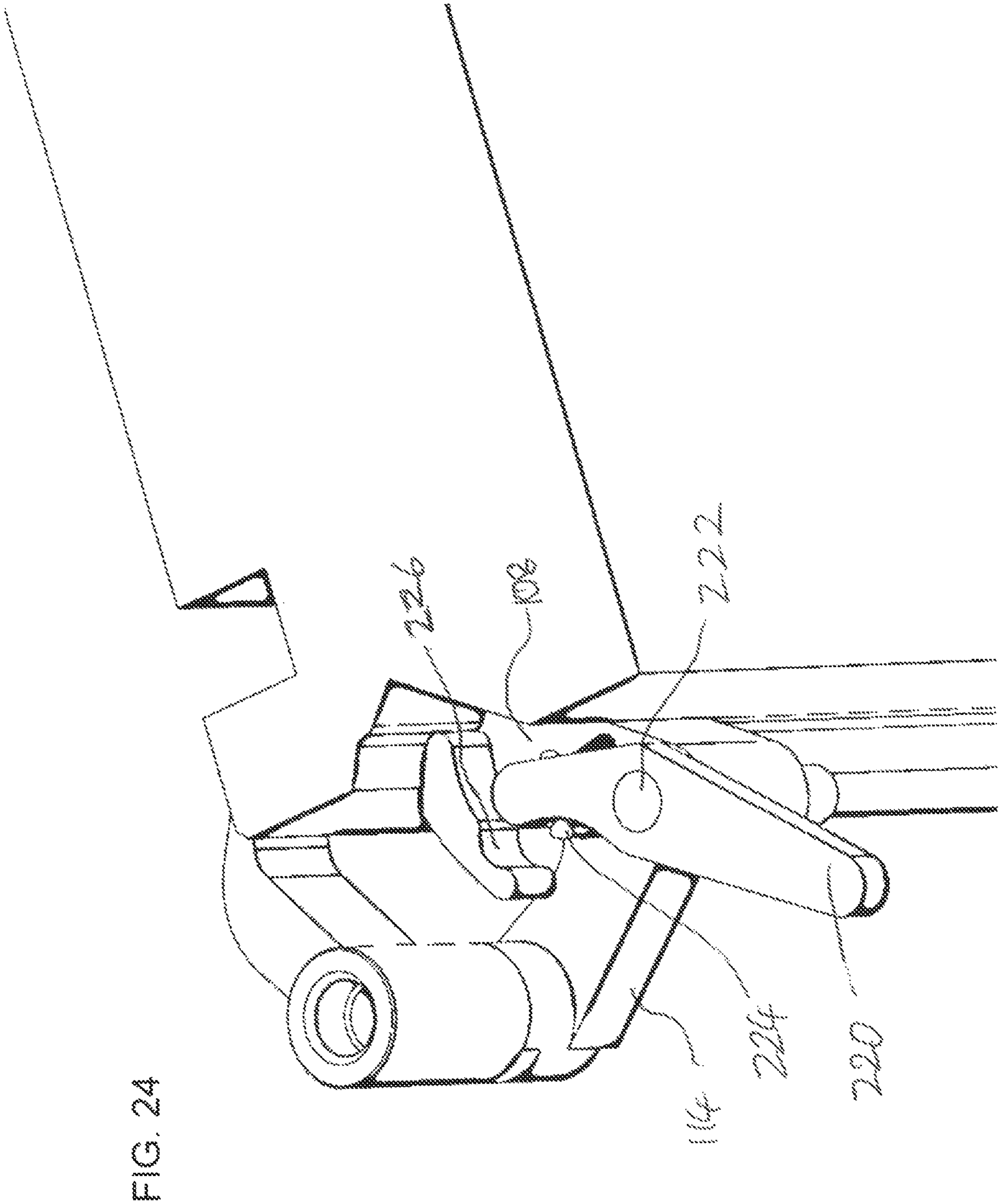
FIG. 24 is an isometric view illustrating a modified version of the locking configuration of FIG. 2 provided with an emergency release lever for unlocking the mechanism.

A non-limiting example of a mechanism for actuating the axial motion of the actuator linkage is best seen in FIGS. 21A-21B and 22A-22B, in which a rotating rod 214 carries an eccentric disk 216 which is engaged between two flanges 218 associated with the "positive lock" actuating lever 112. FIGS. 21A-21C show the fully lowered position, in which the linkage abuts a surface of the panel to provide the actuating linkage functionality described previously. As the rod is turned through 180°, the eccentric disk 216 pushes upwards on the upper flange 218, moving the actuating linkage towards its fully raised position, as shown in FIGS. 22A-22C, where the abutment portion of the actuating linkage is brought into facing relation with the corresponding recess in the panel. Subsequent operation of the unlocking mechanism, as per an unlocking actuation from an intercom or mechanical actuation of a handle or key cylinder, moves the deadlock and locking element to their unlocked positions as described above. The recess 212 in panel 104 allows this motion to be completed without ejecting the panel from the frame, as illustrated in FIGS. 23A and 23B.

Here too, the mechanism is preferably combined with a retaining mechanism, similar to that described above, actuated by an eccentric actuator 204, also mounted on pin 214, with a spring-loaded roller or rolling bearing 210 brought into engagement with a recess or edge of the panel in the inactive state of the actuating linkage. The preferred but non-limiting exemplary mechanism shown here is again based on an eccentric actuator 204 mounted on the same rotating rod as operates the actuating linkage motion.

Actuation of the mechanism is illustrated here schematically with a manual knob that rotates the rotating rod, but can clearly be implemented using additional or alternative forms of actuation. Particularly where remotely actuated switching between modes is required, a powered actuator (not shown) is preferably deployed in driving relation to the mechanism for selectively displacing the actuating linkage between its operative and inoperative positions.

In certain cases, it may be desired to implement the recess 212 in the panel and the abutment region of the actuating lever 112 with complementary inclined surfaces, as shown. This may provide useful functionality in a number of scenarios. For example, where motion of the spring-loaded retaining mechanism is timed relative to the displacement of the actuating linkage so that the retaining mechanism operates through most of the motion, and where a relatively strong spring loading is used, the inclined surfaces of the actuating linkage and the recess are preferably sufficient to generate rotation of the actuating linkage as it returns to its active position, thereby returning the locking mechanism to its locked state when the intercom mode is deactivated.

External Unlocking Tool

Figure 25A:
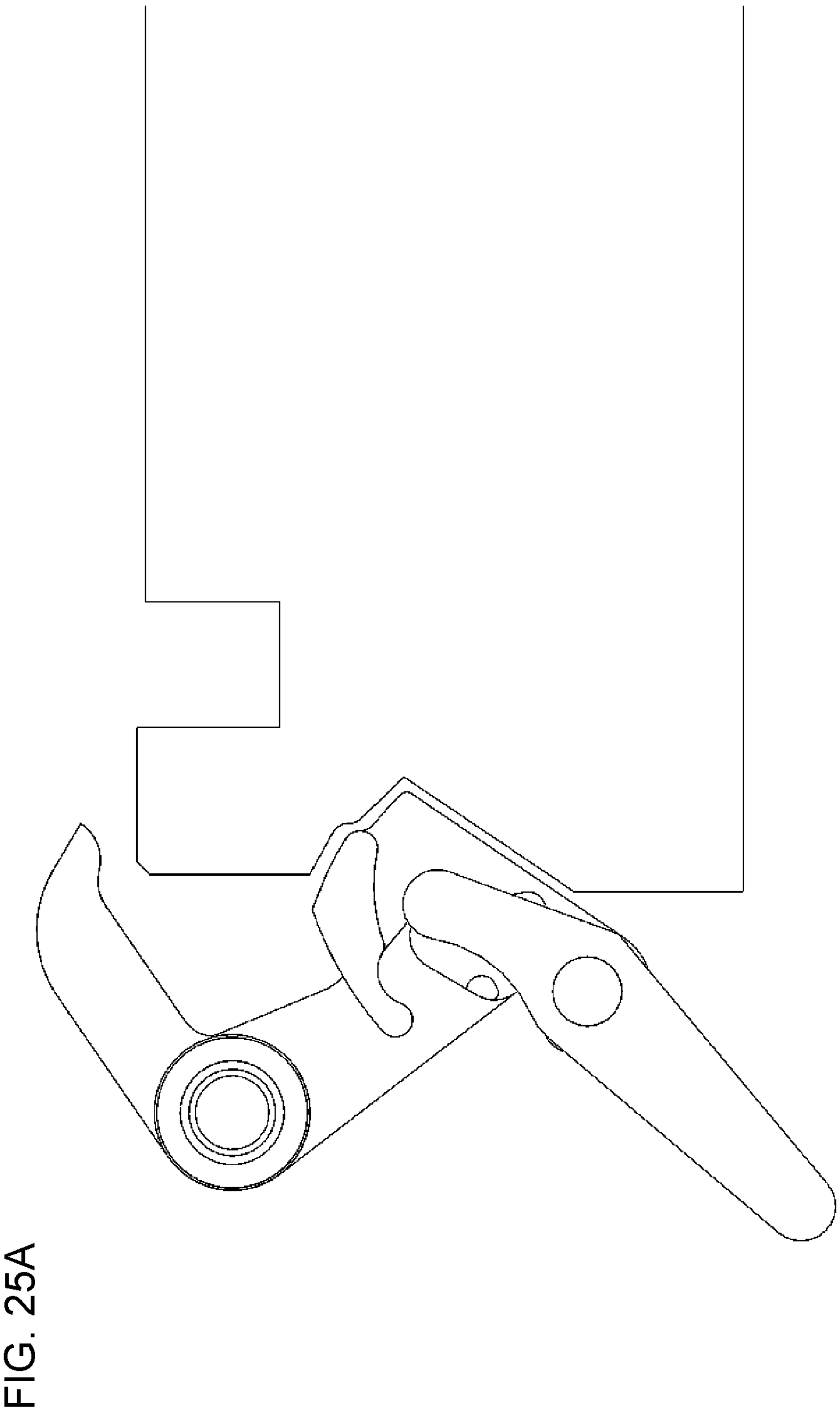
FIGS. 25A-25H are a series of plan views of the configuration of FIG. 24 illustrating a sequence of operation of the emergency release lever.
Figure 25C:
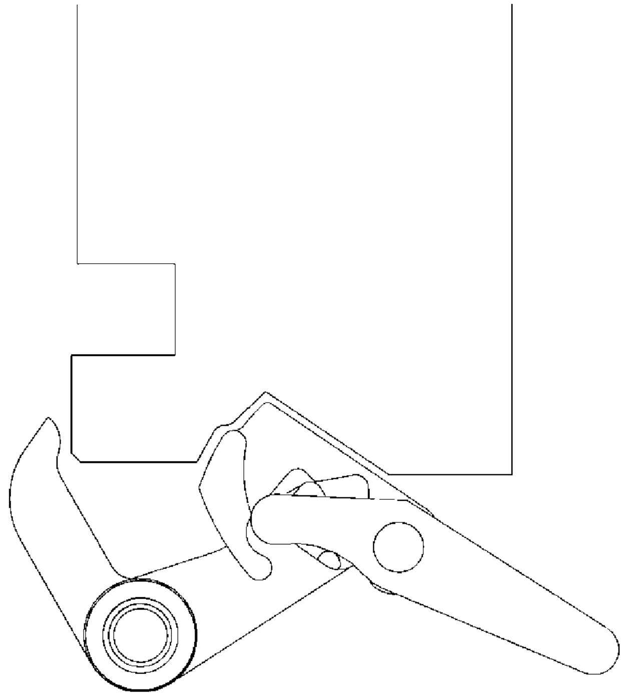
Figure 25B:
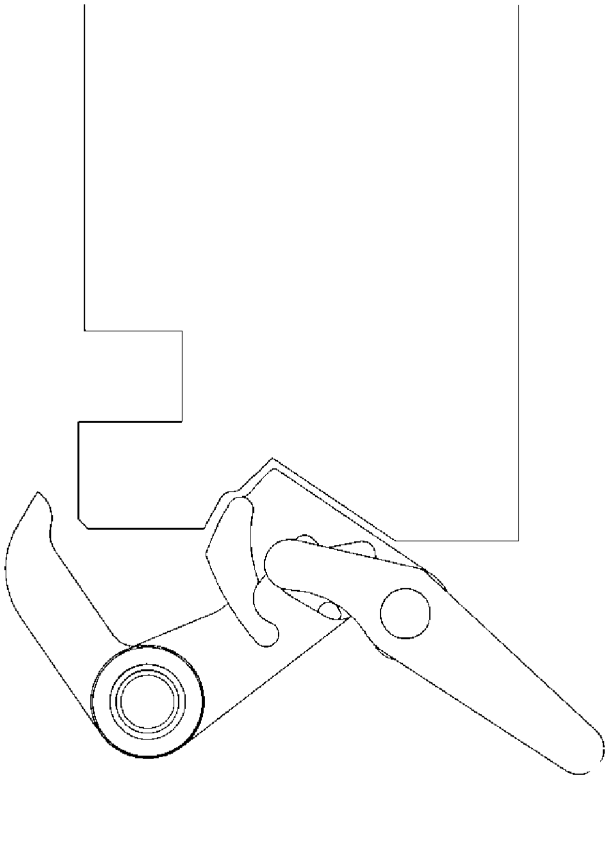
Figure 25E:
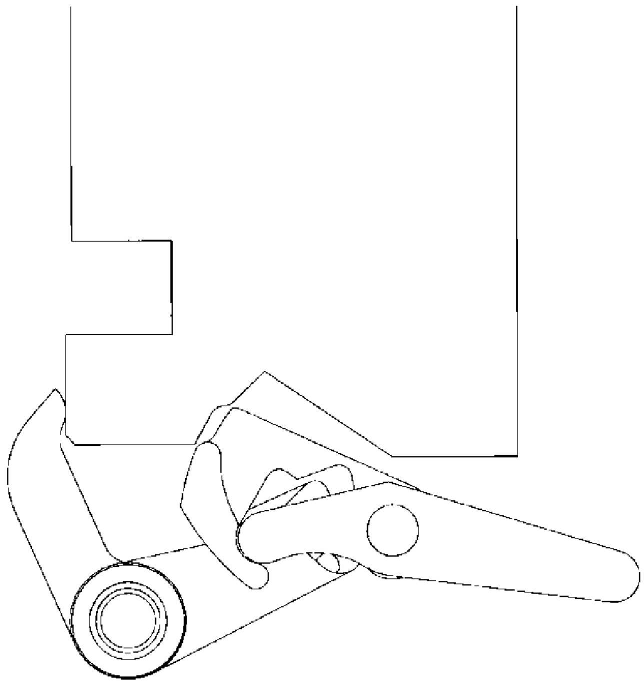
Figure 25D:
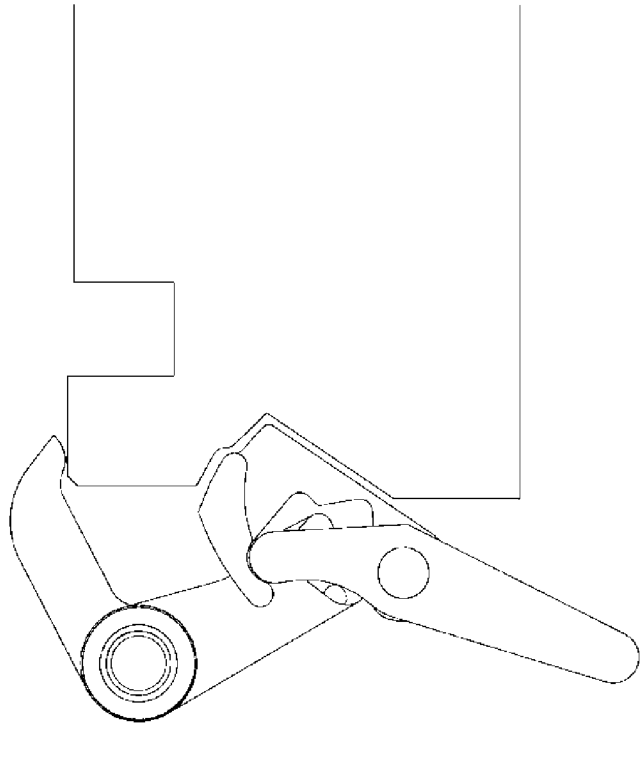
Figure 25G:
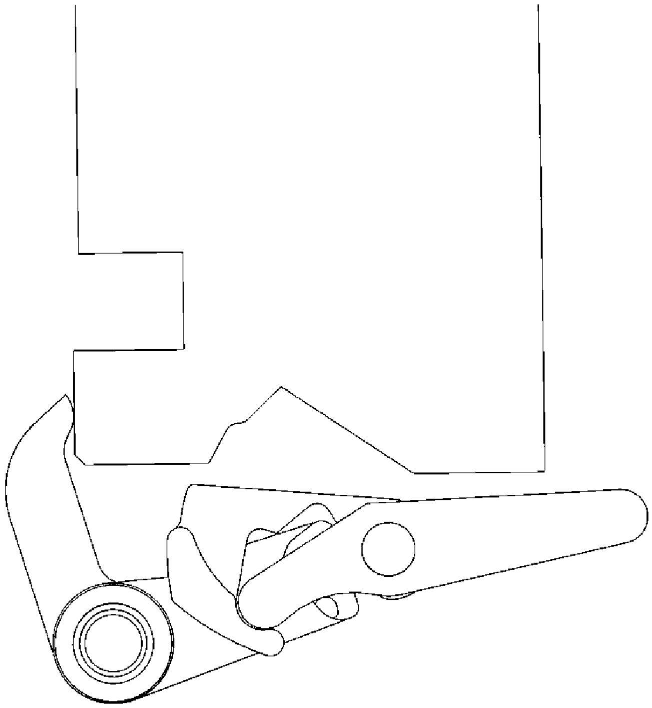
Figure 25F:
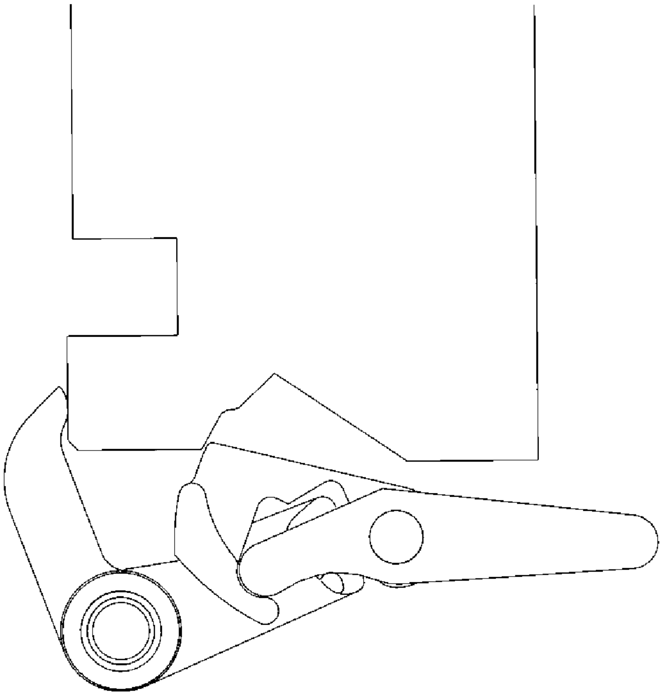
Figure 25H:
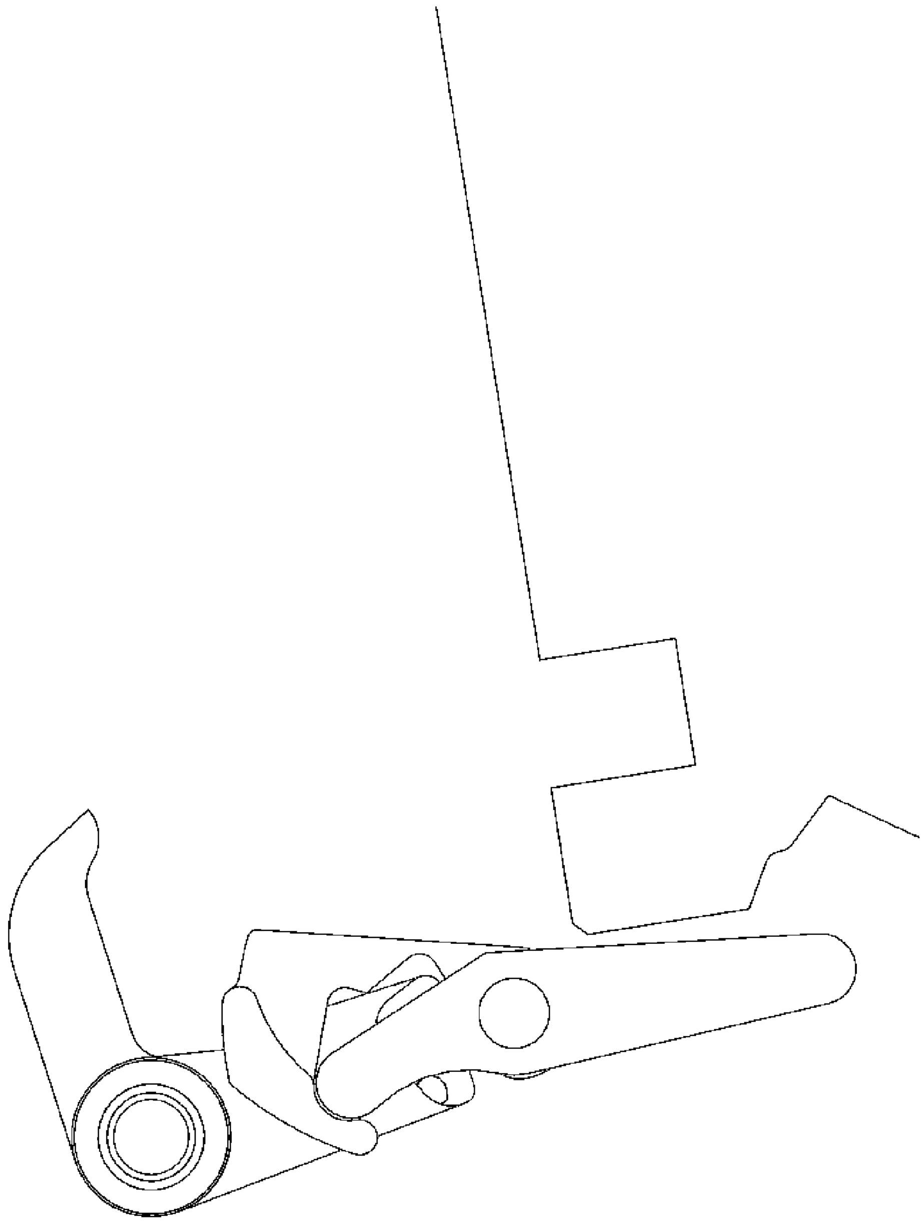

In all of the embodiments illustrated thus far, all inputs for unlocking of the locking mechanism of the present invention are passed through the common actuation axle (rod 136 rotating on axis 116), as described above. In certain cases, it may be desirable to provide an alternative, high torque mechanism for freeing the locking mechanism, for example in case of malfunction. The mechanism may be a permanent feature located on the inside of a door or window, or may in some cases be implemented with a removable lever (tool) which can be made available either to the user or to service personnel, depending on the circumstances. One possible implementation of such a mechanism is illustrated in FIGS. 24 and 25A-25H. The structure is best seen in the isometric view of FIG. 24. In this case, a lever 220 is mounted (or mountable, in the case of a removable tool) on a pivot 222 so that displacement of the projecting end of the lever first engages a region of the deadlock actuator arm 114 (shown here as a projecting pin 224) so as to disengage the deadlock (motion of FIGS. 26A-26D). The pivot of the lever may advantageously be the pivot axis of the locking element itself. Optionally, in the case of the deadlock engaged in a closed slot of the locking element as described above, further force applied via the deadlock may also serve to retract the locking element. In an alternative implementation illustrated here, the lever arm itself engages an abutment surface 226 of the locking element, and then applies torque directly to the locking element, causing it to retract to an unlocked state (sequence of FIGS. 25D-25G), thus allowing opening of the panel (FIG. 25H). In the return motion, on closing of the panel, contact of the panel with the actuating linkage is effective to return the mechanism to the locked and deadlocked state, all as described above.

It will be appreciated that the above descriptions are intended only to serve as examples, and that many other embodiments are possible within the scope of the present invention as defined in the appended claims.

What is claimed is:

1. An apparatus comprising:

(a) an opening bounded on one side by a strike jamb;

(b) a panel mounted relative to said opening so as to be displaceable between an open position in which said panel is separated from said strike jamb to leave said opening open and a closed position in which said panel closes at least part of said opening;

(c) a locking element associated with said strike jamb or said panel and displaceable between a locked position in which said locking element locks the panel against opening, and an unlocked position in which said locking element allows opening of the panel;

(d) a synchronous displacement mechanism associated with said locking element, said synchronous displacement mechanism being displaced by at least part of a closing motion of said panel from said open position towards said closed position, said displacement of said synchronous displacement mechanism forcing said locking element into said locked position, wherein the apparatus has a deadlock state which prevents displacement of said locking element towards said unlocked position, said displacement of said synchronous displacement mechanism additionally forcing the apparatus into said deadlock state, and wherein said synchronous displacement mechanism comprises: a lever deployed to be displaced by relative motion of said panel and said strike jamb during said closing motion; and an actuating linkage mechanically associated with said lever so as to be displaced by relative motion of said panel and said strike jamb during a terminal portion of said closing motion, and wherein a first range of displacement of said actuating linkage displaces said locking element to said locked position, and a further displacement of said actuating linkage beyond said first range achieves said deadlock state.

2. The apparatus of claim 1, wherein said synchronous displacement mechanism is configured to displace said locking element during said closing motion of said panel so as to pass an intermediate engagement position prior to said panel reaching said closed position in which said locking element is effective to obstruct displacement of said panel back towards said open position.

3. The apparatus of claim 2, wherein said locking element and said surfaces of said panel and said strike jamb are configured such that, when said locking element passes said intermediate engagement position, forces directed to displace the panel towards the open position cause said locking element to mechanically interact with said strike jamb and said panel so as to achieve geometrical or frictional locking between said panel and said strike jamb.

4. The apparatus of claim 1, wherein said synchronous displacement mechanism is configured to complete displacement of said locking element to said locked position when said panel reaches a first position during said closing motion of said panel, and wherein a further motion of said synchronous displacement mechanism towards said deadlock state occurs during a further part of said closing motion beyond said first position.

5. The apparatus of claim 4, further comprising a displaceable spacer, and wherein said synchronous displacement mechanism is further configured to displace said displaceable spacer during said further part of said closing motion so that said displaceable spacer is interposed between surfaces of said panel and said strike jamb to prevent said panel from returning to said first position.

6. The apparatus of claim 4, further comprising a resilient biasing element associated with said strike jamb or said panel and deployed to be elastically deformed by said further part of said closing motion so that said resilient biasing element biases said panel to return towards said first position.

7. The apparatus of claim 1, wherein said synchronous displacement mechanism includes a bistable spring configuration biasing said synchronous displacement mechanism to assume either a releasing state or said deadlock state, said bistable spring configuration having an intermediate tipping point, said synchronous displacement mechanism being configured to move during said closing motion of said panel beyond said intermediate tipping point no later than when said panel reaches said closed position.

8. The apparatus of claim 1, wherein said actuating linkage comprises an actuator arm, and wherein said actuator arm and said lever are pivotally mounted about a common pivot axis.

9. The apparatus of claim 8, wherein said actuator arm has an actuator surface deployed for engaging a contact surface of said locking element such that, when said actuator arm pivots, said actuator surface bears on said contact surface so as to displace said locking element towards said locked position.

10. The apparatus of claim 9, wherein said actuator surface and said contact surface are configured to define a contact profile having a cutoff beyond which further pivoting of said actuator arm occurs without further motion of said locking element and achieves said deadlock state.

11. The apparatus of claim 10, wherein said contact surface has a smooth portion terminating at a corner, said corner defining said cutoff.

12. The apparatus of claim 8, further comprising a release mechanism mechanically associated with said actuator arm such that operation of said release mechanism is effective to displace said actuator arm to disengage said deadlock state.

13. The apparatus of claim 12, wherein said actuator arm has a supplementary actuating surface deployed for contacting a supplementary contact surface of said locking element such that a reverse pivoting motion of said actuator arm is effective to displace said locking element towards said unlocked state.

14. The apparatus of claim 13, wherein said actuating surface and said supplementary actuating surface of said actuator arm are provided by surfaces of a projection of said actuator arm, and wherein said contact surface and said supplementary contact surface are provided by edges of a shaped slot associated with said locking element, said projection being engaged within said shaped slot.

15. The apparatus of claim 12, wherein said release mechanism is mechanically linked to said actuator arm via a unidirectional linkage such that operation of said release mechanism is effective to displace said actuator arm to disengage said deadlock state while a reverse motion of said release mechanism can occur without motion of said actuator arm.

16. The apparatus of claim 15, wherein said lever, said actuator arm and said release mechanism are all pivotally mounted so as to be pivotable about a common pivot axis.

17. The apparatus of claim 16, wherein said locking element is pivotally mounted so as to be pivotable about a locking element axis, said locking element axis being parallel to said common pivot axis.

18. The apparatus of claim 16, wherein said release mechanism further comprises a plurality of input arms projecting from said common pivot axis, each of said input arms being associated with a corresponding manually or electrically operated lock-releaser deployed to displace the corresponding input arm so as to operate said release mechanism.

19. The apparatus of claim 8, wherein said actuating linkage further comprises a connecting link pivotally interconnected with said actuator arm and with said locking element, said actuator arm and said connecting link assuming an over-center locking configuration in said deadlock state.

20. The apparatus of claim 1, wherein said locking element and said surfaces of said panel and said strike jamb are configured such that, when said locking element assumes said locked position, forces directed to displace the panel towards the open position cause said locking element to mechanically interact with said strike jamb and said panel so as to achieve geometrical or frictional locking between said panel and said strike jamb.

21. An apparatus comprising:
(a) an opening bounded on one side by a strike jamb;
(b) a panel mounted relative to said opening so as to be displaceable between an open position in which said panel is separated from said strike jamb to leave said opening open and a closed position in which said panel closes at least part of said opening;
(c) a plurality of locking elements associated with said strike jamb or said panel, each of said locking elements being displaceable between a locked position in which said locking element locks the panel against opening, and an unlocked position in which said locking element is positioned so as not to obstruct motion of the panel to the open position;
(d) a synchronous displacement mechanism associated with said locking elements, said synchronous displacement mechanism being displaced by at least part of a closing motion of said panel from said open position towards said closed position, said displacement of said synchronous displacement mechanism forcing each of said locking elements into said locked position, wherein said synchronous displacement mechanism further comprises a release mechanism mechanically linked to each of said locking elements via a unidirectional linkage such that operation of said release mechanism is effective to displace all of said plurality of locking elements from said locked position to said unlocked position, while direct displacement of one of said locking elements from said locked position to said unlocked position does not displace another of said plurality of locking elements away from said locked position.

22. An apparatus comprising:
(a) an opening bounded on one side by a strike jamb;
(b) a panel mounted relative to said opening so as to be displaceable between an open position in which said panel is separated from said strike jamb to leave said opening open and a closed position in which said panel closes at least part of said opening;
(c) a locking element associated with said strike jamb or said panel and displaceable between a locked position in which said locking element locks the panel against opening, and an unlocked position in which said locking element allows opening of the panel;
(d) a synchronous displacement mechanism associated with said locking element, said synchronous displacement mechanism being displaced by at least part of a closing motion of said panel from said open position towards said closed position, said displacement of said synchronous displacement mechanism forcing said locking element into said locked position, wherein said synchronous displacement mechanism is configured to complete displacement of said locking element to said locked position when said panel reaches a first position during said closing motion of said panel, and wherein a further motion of said panel beyond said first position forces a further motion of said synchronous displacement mechanism without further motion of said locking element.

23. The apparatus of claim 22, wherein said further motion of said synchronous displacement mechanism generates a deadlock state that prevents displacement of said locking element towards said unlocked position.

24. An apparatus comprising:

(a) an opening bounded on one side by a strike jamb;

(b) a panel mounted relative to said opening so as to be displaceable between an open position in which said panel is separated from said strike jamb to leave said opening open and a closed position in which said panel closes at least part of said opening;

(c) a locking element associated with said strike jamb or said panel and displaceable between a locked position in which said locking element locks the panel against opening, and an unlocked position in which said locking element allows opening of the panel; and (d) a synchronous displacement mechanism associated with said locking element, said synchronous displacement mechanism comprising:

(i) an actuating linkage including an actuator arm, said actuating linkage being associated with said locking element for displacing said locking element between said locked position and said unlocked position, and (ii) a lever deployed to be displaced by relative motion of said panel and said strike jamb during said closing motion, wherein said lever and said actuator arm are pivotable about a common pivot axis, displacement of said lever by said closing motion causing pivotal motion of said actuator arm in a first direction so as to force said locking element into said locked position, said synchronous displacement mechanism further comprising a release mechanism mechanically linked to said actuator arm and actuatable so as to cause pivotal motion of said actuator arm about said common pivot axis in a second direction opposite to said first direction, thereby displacing said locking element to said unlocked position.

* * * * *